(12) United States Patent
Chen et al.

(10) Patent No.: US 11,870,366 B2
(45) Date of Patent: Jan. 9, 2024

(54) SYSTEM AND METHOD FOR POWER CONVERTER INTERFACING WITH MULTIPLE SERIES-STACKED VOLTAGE DOMAINS

(71) Applicants: The Trustees of Princeton University, Princeton, NJ (US); UC Berkeley, Berkeley, CA (US)

(72) Inventors: Minjie Chen, Princeton, NJ (US); Robert Pilawa-Podgurski, Berkeley, CA (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 288 days.

(21) Appl. No.: 17/432,793

(22) PCT Filed: Dec. 20, 2019

(86) PCT No.: PCT/US2019/067772
§ 371 (c)(1),
(2) Date: Aug. 20, 2021

(87) PCT Pub. No.: WO2020/171886
PCT Pub. Date: Aug. 27, 2020

(65) Prior Publication Data
US 2022/0045628 A1 Feb. 10, 2022

Related U.S. Application Data

(60) Provisional application No. 62/809,279, filed on Feb. 22, 2019.

(51) Int. Cl.
*H02J 7/00* (2006.01)
*H02M 7/5387* (2007.01)
(Continued)

(52) U.S. Cl.
CPC ......... *H02M 7/5387* (2013.01); *H02J 7/0013* (2013.01); *H02J 7/0014* (2013.01);
(Continued)

(58) Field of Classification Search
CPC .......... H02J 7/0013; H02J 7/0014; H02J 5/00; H02J 7/0016; H02J 7/0018; H02J 7/0019
See application file for complete search history.

(56) References Cited

U.S. PATENT DOCUMENTS

| 5,479,093 A | 12/1995 | Brainard |
| 9,116,692 B1 | 8/2015 | Krein et al. |

(Continued)

FOREIGN PATENT DOCUMENTS

| WO | 2017174799 A1 | 10/2017 |
| WO | 2018051603 A1 | 3/2018 |

OTHER PUBLICATIONS

International Search Report and Written Opinion for corresponding PCT Application No. PCT/US2019/067772, dated Apr. 1, 2020.
(Continued)

*Primary Examiner* — Gary L Laxton
(74) *Attorney, Agent, or Firm* — Meagher Emanuel Laks Goldberg & Liao, LLP

(57) ABSTRACT

According to various embodiments, a power conversion circuit is disclosed. The power conversion circuit includes at least one DC bus. The power conversion circuit further includes a plurality of DC-AC conversion units coupled to the DC bus and configured to convert a DC voltage into an AC voltage. The power conversion circuit also includes a multi-winding transformer comprising a magnetic core and a plurality of windings, where each DC-AC conversion unit is coupled to a corresponding winding of the multi-winding transformer.

44 Claims, 54 Drawing Sheets

(51) Int. Cl.
  *H02M 1/00* (2006.01)
  *H02M 7/493* (2007.01)
(52) U.S. Cl.
  CPC ......... *H02J 7/0016* (2013.01); *H02M 1/0083* (2021.05); *H02M 7/493* (2013.01); *H02M 1/0074* (2021.05); *H02M 1/0077* (2021.05)

(56) References Cited

U.S. PATENT DOCUMENTS

| | | | |
|---|---|---|---|
| 2013/0099746 A1* | 4/2013 | Nork | H01M 10/425 320/118 |
| 2014/0306662 A1* | 10/2014 | Kim | H02J 7/0016 320/118 |
| 2015/0016159 A1 | 1/2015 | Deboy | |
| 2016/0190943 A1 | 6/2016 | Chen et al. | |
| 2017/0025867 A1* | 1/2017 | Wang | H02J 7/007182 |
| 2018/0102644 A1 | 4/2018 | Perreault et al. | |
| 2018/0175719 A1 | 6/2018 | Ying et al. | |
| 2019/0058408 A1 | 2/2019 | Hao et al. | |

OTHER PUBLICATIONS

P. Wang, Y. Chen, J. Yuan, R. C. N. Pilawa-Podgurski and M. Chen, "Differential Power Processing for Ultra-Efficient Data Storage," IEEE Transactions on Power Electronics, vol. 36, No. 4, pp. 4269-4286, Apr. 2021.
M. Liu, Y. Chen, Y. Elasser and M. Chen, "Dual Frequency Hierarchical Multilayer Battery Balancer Architecture," IEEE Transactions on Power Electronics, vol. 36, No. 3, pp. 3099-3110, Mar. 2021.
Stillwell and R. C. N. Pilawa-Podgurski, "A resonant switched-capacitor converter with GaN transistors for series-stacked processors with 99.8% power delivery efficiency," 2015 IEEE Energy Conversion Congress and Exposition (ECCE), Montreal, QC, 2015, pp. 563-570.
Chang et al., "Capacitor-Less Photovoltaic Cell-Level Power Balancing using Diffusion Chrge Redistribution", IEEE Transactions On Power Electronics, vol. 30, No. 2, Feb. 2015.
Lee et al., "Online Embedded Impedance Measurement Using High-Power Battery Charger", IEEE Transactions on Industry Applications, Vo. 51, No. 1, Jan./Feb. 2015.
Howey et al., "Online Measurement of Battery Impedance Using Motor Controller Excitation", IEEE Transactions on Vehicular Technology, VI. 63, No. 6, Jul. 2014.
Koch et al., "Electrochemical Impedance Spectroscopy for Online Battery Monitoring—Power Electronics Control", 16th European Conference on Power Electronics and Applications, EPE-ECCE Europe 2014.
Candan et al., "A Series-Stacked Power Delivery Architecture With Isolated Differential Power Conversion for Data Centers," in IEEE Transactions on Power Electronics, vol. 31, No. 5, pp. 3690-3703, May 2016.
Candan et al., "Hot-Swapping Analysis and Implementation of Series-Stacked Server Power Delivery Architectures," in IEEE Transactions on Power Electronics, vol. 32, No. 10, pp. 8071-8088, Oct. 2017.
Huang et al., "An Online Battert Impedance Measurement Method Using DC-DC Power Converter Control", IEEE Transactions on Industrial Electronics, Vo. 61, No. 11, Nov. 2014.
Pilawa-Podgurski et al., "Submodule Integrated Distributed Maxium Power Point Tracking for Solar Photovoltaic Application", IEEE Transactions on Power Electronics, vol. 28, No. 6, Jun. 2013.
Wang et al., "Towards Power FPGA: Architecture, Modeling and Control of Multiport Power Converters," 2018 IEEE 19th Workshop on Control and Modeling for Power Electronics (COMPEL), Padua, 2018.
Shenoy et al., "Differential Power Processing for DC Systems," in IEEE Transactions on Power Electronics, vol. 28, No. 4, pp. 1795-1806, Apr. 2013.
Jiang et al., "Switched Tank Covers", IEEE Transactions on Power Electronics, vol. 34, No. 6, Jun. 2019.
Stauth et al., "Resonant Switch-Capacitor Converters for Submodule Distributed Photovoltaic Power Management", ISSS Transactions On Power Electronics, Vo. 28, No. 3, Mar. 2013.
Din et al., "A Scalable Active Battery Management System With Embedded Real-Time Electrochemical Impedance Spectroscopy", IEEE ransactions on Power Electronics, vol. 32, No. 7, Jul. 2017.
Ye et al., "The Cascade Resonant Converter: A hybrid Switched-Capacitor Topology With High Power Density and Efficiency", IEEE Transactions on Electronics, vol. 35, N 5, May 2020.

\* cited by examiner

Comparison of a Few DPP Topologies

| Topology | Load-to-Load DPP | Switched-Capacitor DPP | DC-Coupled DPP (half-bridge) | MAC-DPP (half-bridge) |
|---|---|---|---|---|
| Switch count | 2N-2 | 2N | 4N | 2N |
| Switch voltage stress | $2V_{load}$ | $V_{load}$ | $V_{load}$ or $V_{bus}$ | $V_{load}$ |
| Magnetic components | N-1 inductors | N-1 inductors | N two-winding transformers | one multi-winding transformer |
| Power conversion stages | multiple stages | multiple stages | two "dc-ac-dc" stages | one "dc-ac-dc" stage |
| Port-to-port isolation | non-isolated | non-isolated | galvanic-isolated | galvanic-isolated |
| Publication | [5] | [6], [7] | [8] | This work |

FIG. 10(e)

Required Mutual Inductance for a 10 W Rated Power

| $P_{12}$ | $\theta_{12}$ | $I_1$ | $I_2$ | w | $L_{12}$ |
|---|---|---|---|---|---|
| 10 W | 90° | 1 A | 1 A | 13.56 MHz | 230 nH |

The Four-Port MWC Transformer Parameters

| n | w | g | $L_{12}$ | $L_{13}$ | $L_{14}$ |
|---|---|---|---|---|---|
| 3 | 0.75 mm | 0.25 mm | 321 nH | 307 nH | 298 nH |

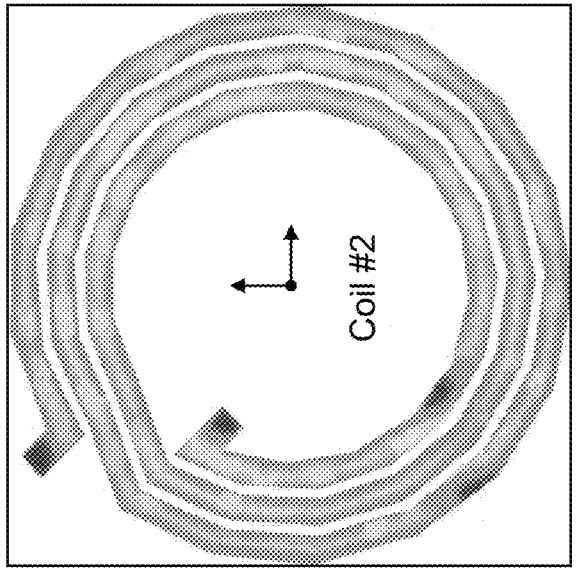
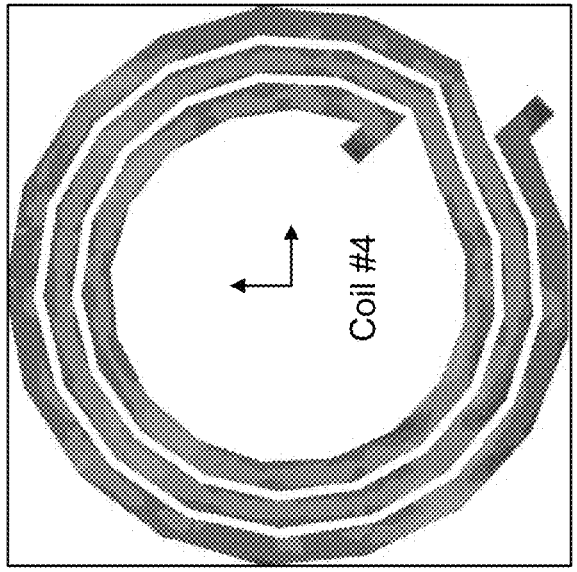
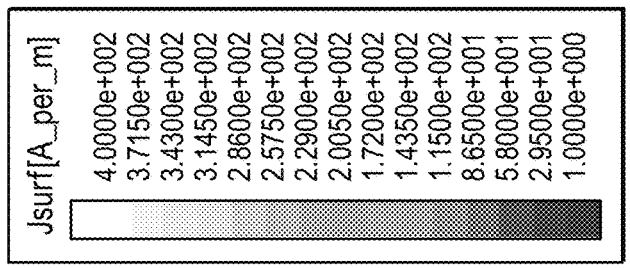
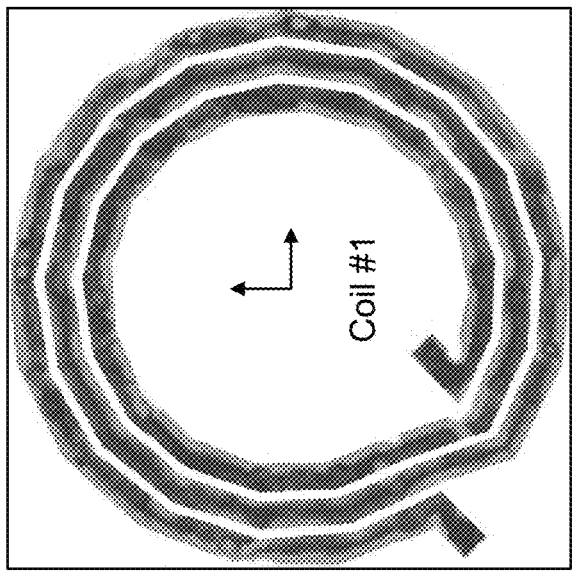
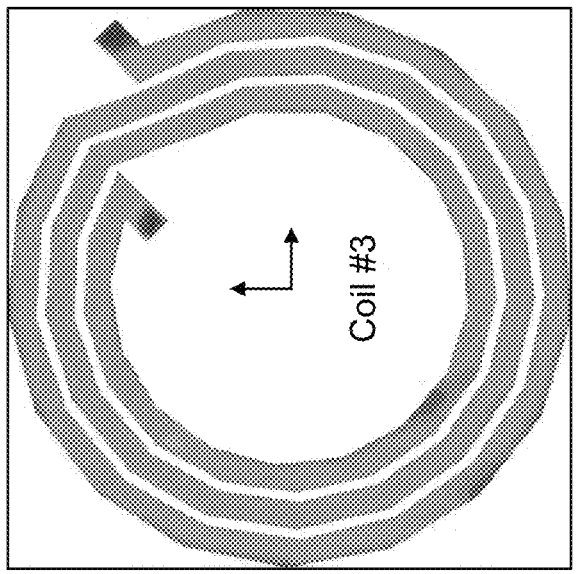
FIG. 34

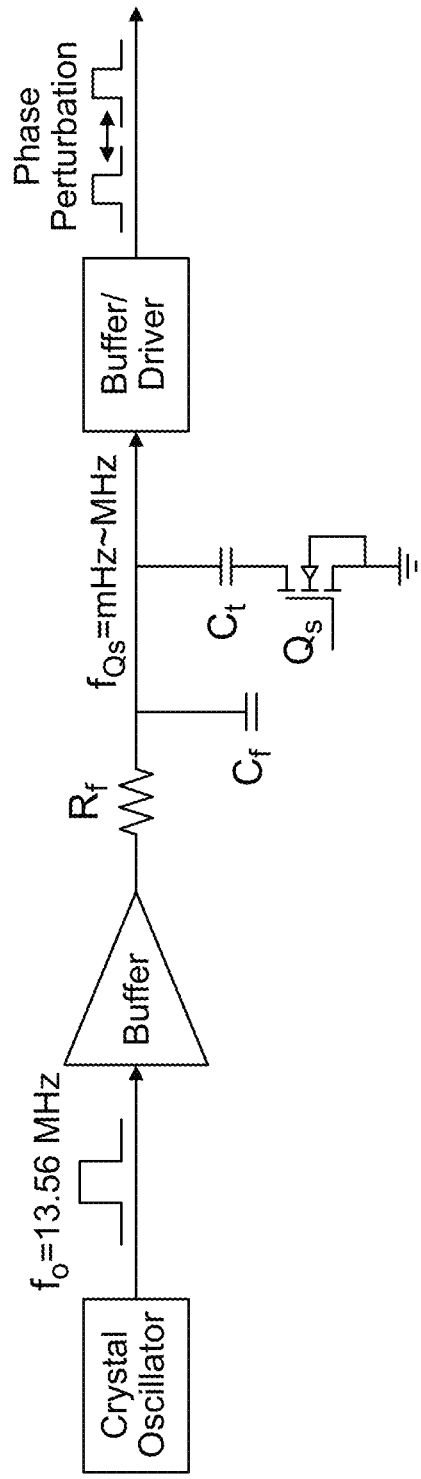

FIG. 36

| Overview and Comparison with Existing Online EIS Works | | | | | | |
|---|---|---|---|---|---|---|
| Publication | [6] | [7] | [9] | [10] | [11] | This Work |
| Cell Level Perturbation | No | No | No | No | Yes | Yes |
| Test Cell Capacity | 2.6Ah | N/A | 3Ah | 2.3Ah | 3.4Ah | 3.4Ah/3Ah/2.4Ah |
| Perturbation Source | Load | Battery Charger | Battery Charger | Motor Controller | Active Balancer | Active Balancer |
| Perturbation Type | Sinusoid | Sinusoid | Sawtooth | Noise/Multisine | Sinusoid | Sinusoid/Pulse |
| Perturbation Current | 72-750 mA | 1 mA | 2 A | 130 mA | 160 mA | 20-200 mA |
| Perturbation Bandwidth | 10 kHz | 100 kHz | 5kHz | 2 kHz | 8 kHz | 50 kHz |

FIG. 37

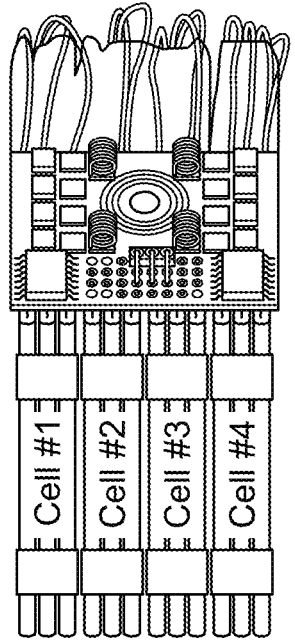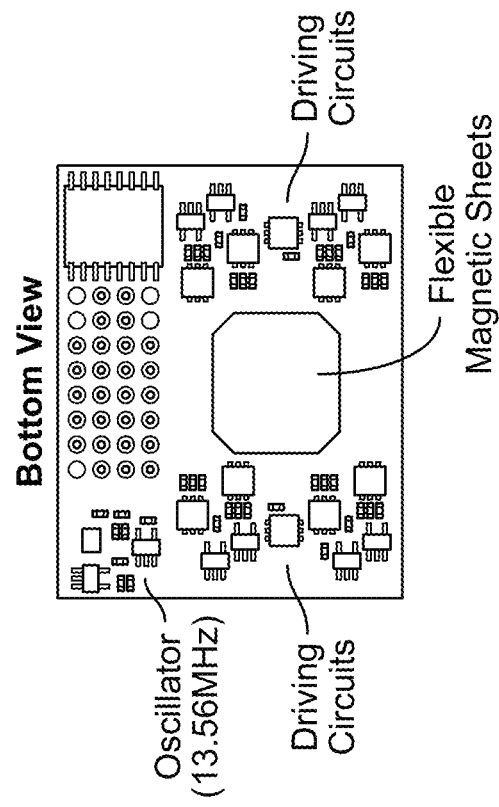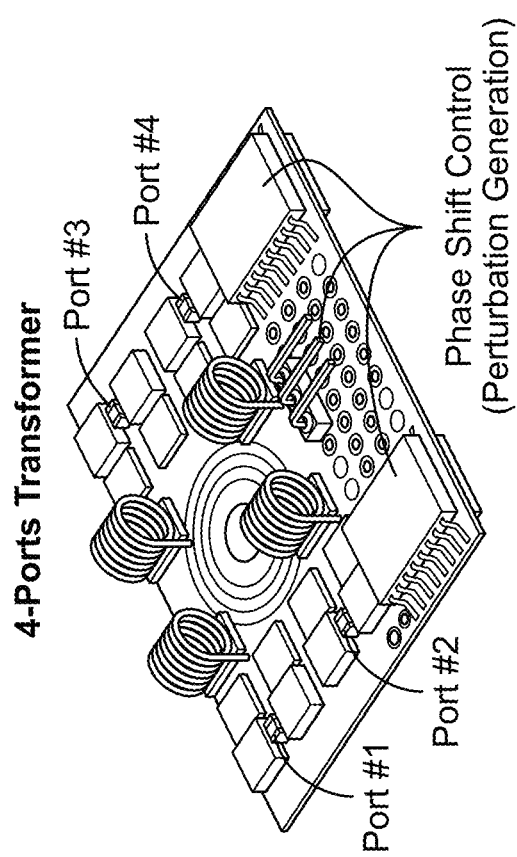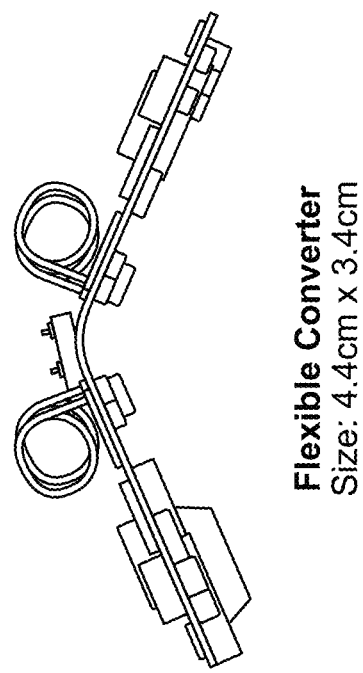
FIG. 38

Parameters of the Four-Port MWC Battery Balancer
| $L_1$ | $L_2$ | $L_3$ | $L_4$ | $L_{12}$ | $L_{23}$ |
|---|---|---|---|---|---|
| 271 nH | 262 nH | 267 nH | 275 nH | 243 nH | 242 nH |
| $L_{34}$ | $L_{13}$ | $L_{24}$ | $L_{14}$ | $L_r$ | $C_r$ |
|---|---|---|---|---|---|
| 243 nH | 239 nH | 240 nH | 235 nH | 110 nH | 1200 pF |
*FIG. 39*
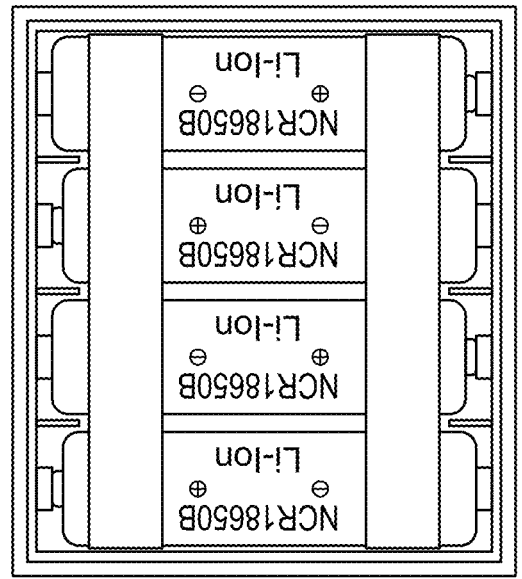
*FIG. 40(c)*
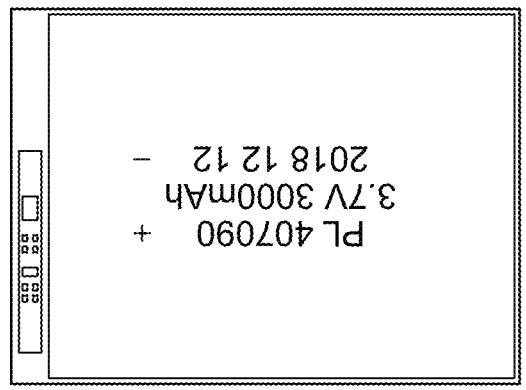
*FIG. 40(b)*
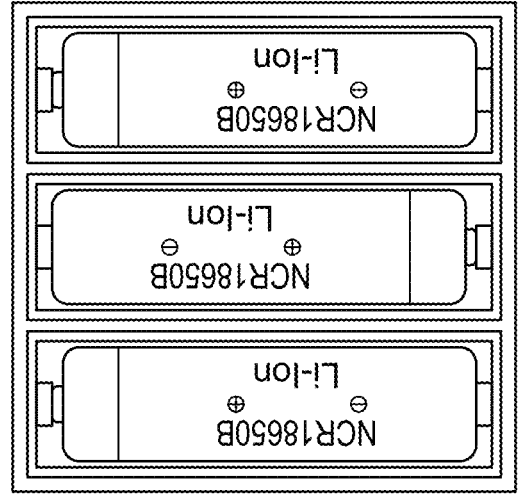
*FIG. 40(a)*

SYSTEM AND METHOD FOR POWER CONVERTER INTERFACING WITH MULTIPLE SERIES-STACKED VOLTAGE DOMAINS

CROSS-REFERENCE TO RELATED APPLICATIONS

This application claims priority to provisional application 62/809,279, filed Feb. 22, 2019, which is herein incorporated by reference in its entirety.

STATEMENT REGARDING FEDERALLY SPONSORED RESEARCH OR DEVELOPMENT

This invention was made with government support under Grant #DE-AR0000906, awarded by the Department of Energy, Advanced Research Projects Agency-Energy (ARPA-E). The government has certain rights in the invention.

FIELD OF THE INVENTION

The present invention relates generally to power conversion and, more particularly, to a power converter system including a multi-winding transformer that interfaces with many series-connected voltage domains.

BACKGROUND OF THE INVENTION

Modular energy systems, such as data centers, energy storage systems, and solar farms as examples, include numerous modular power electronics cells configured as interconnected energy systems with sophisticated power flow. For instance, solar panels need maximum power point tracking and bypassing circuits, battery cells need voltage monitoring and state-of-charge (SOC) balancing, and data centers need uninterruptable power supplies (UPS) and point-of-load converters. These power electronics regulate the voltage, modulate the power, and perform advanced power management functions. As such, high performance power conversion architectures are needed to improve the efficiency and power density of these energy systems.

A conventional way of designing a power conversion architecture for these systems is to create one or more DC buses as the DC-link and connect each individual device to the DC-link through a DC-DC converter. Therefore, each device needs its own DC-DC converter and each DC-DC converter is designed for full voltage rating and power rating. However, these numerous DC-DC converters are usually bulky and inefficient.

As such, there is a need for a novel, compact, and ultra-efficient power delivery architecture for modular energy systems.

SUMMARY OF THE INVENTION

According to various embodiments, a power conversion circuit is disclosed. The power conversion circuit includes at least one DC bus. The power conversion circuit further includes a plurality of DC-AC conversion units coupled to the DC bus and configured to convert a DC voltage into an AC voltage. The power conversion circuit also includes a multi-winding transformer comprising a magnetic core and a plurality of windings, where each DC-AC conversion unit is coupled to a corresponding winding of the multi-winding transformer.

According to various embodiments, a method for operating a power conversion circuit, where the circuit includes a plurality of DC-AC conversion units each coupled to a corresponding winding of a multi-winding transformer, is disclosed. The method includes measuring a voltage of one or more intermediate nodes between the DC-AC conversion units and adjusting a gate signal of switches of the DC-AC conversion units to regulate the voltage of the intermediate nodes.

According to various embodiments, a power conversion circuit is disclosed. The power conversion circuit includes a DC bus. The power conversion circuit further includes a plurality of DC-AC conversion units coupled to the DC bus and configured to convert a DC voltage into an AC voltage. The power conversion circuit also includes a multi-winding transformer including a magnetic core and a plurality of windings, where each DC-AC conversion unit is coupled to a corresponding winding of the multi-winding transformer. The power conversion circuit further includes a controller configured to measure a voltage of one or more intermediate nodes between the DC-AC conversion units and adjust a gate signal of switches of the DC-AC conversion units to regulate the voltage of the intermediate nodes.

According to various embodiments, a multi-input multi-output (MIMO) power conversion circuit is disclosed. The MIMO power conversion circuit includes a plurality of DC buses configured as a plurality of input/output ports. The MIMO power conversion circuit further includes a plurality of DC-AC conversion units coupled to each DC bus and configured to convert a DC voltage into an AC voltage. The MIMO power conversion circuit also includes a multi-port wireless-coupled transformer including a magnetic core and a plurality of ports, where each DC-AC conversion unit is coupled to a corresponding port of the multi-port wireless-coupled transformer.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 10(*b*) depicts a switched capacitor DPP;

FIG. 10(*c*) depicts a DC-coupled DPP;

FIG. 10(*d*) depicts a MAC-DPP according to an embodiment of the present invention;

FIG. 10(*e*) depicts a table comparison of DPP topologies according to an embodiment of the present invention;

FIG. 16(*b*) depicts a prototype 300 W 10-port MAC-DPP converter according to an embodiment of the present invention;

FIG. 25(*b*) depicts a thermal image of the MAC-DPP prototype hot-swapping with 25° C. ambient temperature according to an embodiment of the present invention;

FIG. 27(*b*) depicts a switched capacitor battery balancer topology;

FIG. 27(*c*) depicts a DC-coupled battery balancer topology;

FIG. 27(*d*) depicts a multi-port wireless-coupled (MWC) battery balancer according to an embodiment of the present invention;

FIG. 29(*b*) depicts simulated waveforms of the inductor circulating current of the CM Class-D inverters according to an embodiment of the present invention;

FIG. 34 depicts a current distribution on the four coils of the MHz MWC transformer according to an embodiment of the present invention;

FIG. 36 depicts a high frequency phase perturbation circuit for EIS according to an embodiment of the present invention;

FIG. 37 depicts a table of an overview and comparison of EIS works according to an embodiment of the present invention;

FIG. 38 depicts a prototype four port 13.56 MHz MWC battery balancer with multi-port phase-shift control and online electrochemical impedance spectroscopy according to an embodiment of the present invention;

FIG. 39 depicts a table of parameters of the four-port MWC battery balancer according to an embodiment of the present invention;

FIG. 40(*a*) depicts a 11.1 V lithium ion battery pack for EIS measurement according to an embodiment of the present invention;

FIG. 40(*b*) depicts a 11.1 V lithium polymer battery pack for EIS measurement according to an embodiment of the present invention;

FIG. 40(c) depicts a 9.6 V AA-NIMH battery pack for EIS measurement according to an embodiment of the present invention;

DETAILED DESCRIPTION OF THE INVENTION

Figure 1:
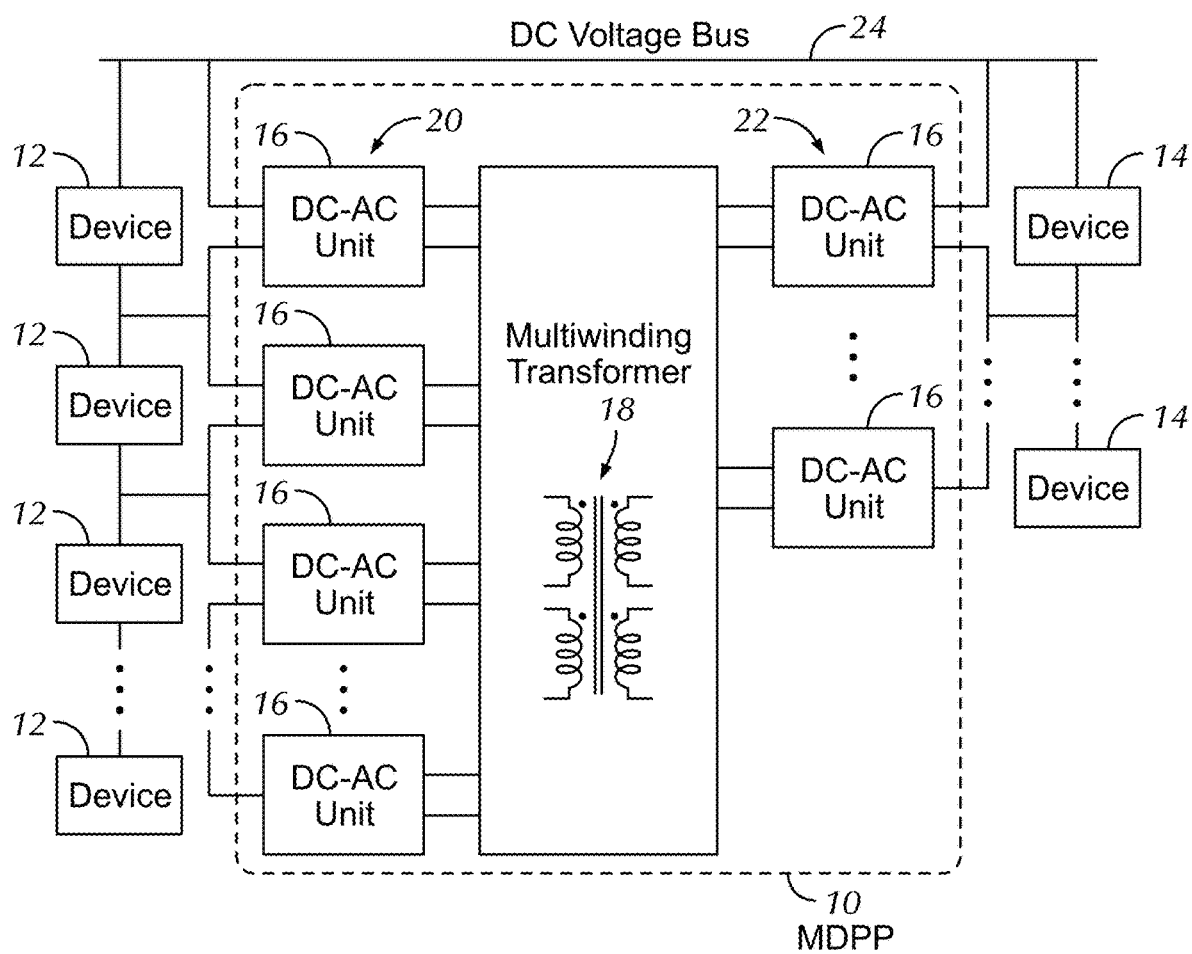
FIG. 1 depicts a schematic diagram of a multiport differential power processor (MDPP) including many DC-AC units and a multi-winding transformer according to an embodiment of the present invention.

According to various embodiments, disclosed herein is a family of circuits and systems, generally referred to as a multiport differential power processor (MDPP), that can perform sophisticated energy processing functions for many series stacked voltage domains. The MDPP includes a plurality of DC-AC power conversion units that are connected in series and a multi-winding transformer. The DC side of each DC-AC unit is connected to one voltage domain. The AC side of each DC-AC unit is connected to one winding of the multi-winding transformer. The multi-winding transformer is coupled to many DC-AC units. The MDPP is particularly useful in sophisticated energy systems with many series-tied units including photo-voltaic modules in solar energy systems, batteries in energy storage systems, processor cores, and servers and power supplies in data centers. The key principle of this architecture is to reduce the power conversion stress and improve the energy efficiency and power density of power electronics in these systems.

Further disclosed herein is an ultra-efficient series-stacked hard-disk-drive (HDD) data storage server with a multiport ac-coupled differential power processing (MAC-DPP) architecture. A large number of HDDs are connected in series and AC-coupled through a multi-winding transformer with a single flux linkage. The MAC-DPP architecture offers very low power conversion stress, can achieve extremely high efficiency, and can reduce the magnetic size and the component count. A hybrid time-sharing and distributed phase-shift control strategy is developed to modulate the AC-coupled multi-input-multi-output (MIMO) power flow. A 10-port MAC-DPP prototype was designed to support a 300 W data storage system with 10 series-stacked voltage domains. The MAC-DPP converter was tested with a 50-HDD 12 TB testbench, which can maintain normal operation of the server against the worst hot-swapping scenario. The 300 W MAC-DPP prototype can achieve 99.7% peak system efficiency and over 100 W/in$^3$ power density.

Further disclosed herein is a multi-MHz multi-port-wireless-coupled (MWC) battery balancer with the capability of performing high frequency electrochemical impedance spectroscopy (EIS) to monitor the battery state-of-charge (SOC) and state-of-health (SOH). The disclosed MHz MWC architecture performs EIS measurement as well as battery balancing without using extra EIS perturbation circuitry. The battery balancer operates at 13.56 MHz and can perform precise EIS measurement up to 500 kHz. The high switching frequency also eliminates the magnetic core, allowing the utilization of flexible PCB air core magnetics to miniaturize the size of the battery balancer. A 13.56 MHz MWC battery balancer with a four-port air core flexible PCB transformer is built and tested with Lithium-ion, Lithium-polymer and, AA-NIMH battery packs. The experimental results matched well with commercial EIS equipment and validated the effectiveness of the MWC battery balancer.

Power Converters Interfacing with Multiple Series Stacked Voltage Domains

FIG. 1 depicts a block diagram of a MDPP architecture 10 interfacing with two strings of series-stacked devices 12 and 14. The architecture 10 comprises multiple DC-AC conversion units 16 and a single multi-winding transformer 18. The transformer 18 includes a magnetic core and a plurality of windings, where the number of DC-AC conversion units 16 equals the number of windings on the transformer 18. The windings of the transformer may have identical turns. It is to be noted any number of DC-AC conversion units 16 can be included and the numbers of DC-AC conversion units used in this embodiment and the following embodiments are not intended to be limiting. The DC-AC conversion units 16 are configured to interface with any voltage number, particularly 5 V or 12 V. A first group 20 of the DC-AC conversion units 16 are connected in series as a string. A second group 22 of the DC-AC conversion units 16 are connected in series as another string. The two strings are both connected to a common DC voltage bus 24. All DC-AC conversion units 16 are coupled to the single multi-winding transformer 18.

Figure 2:
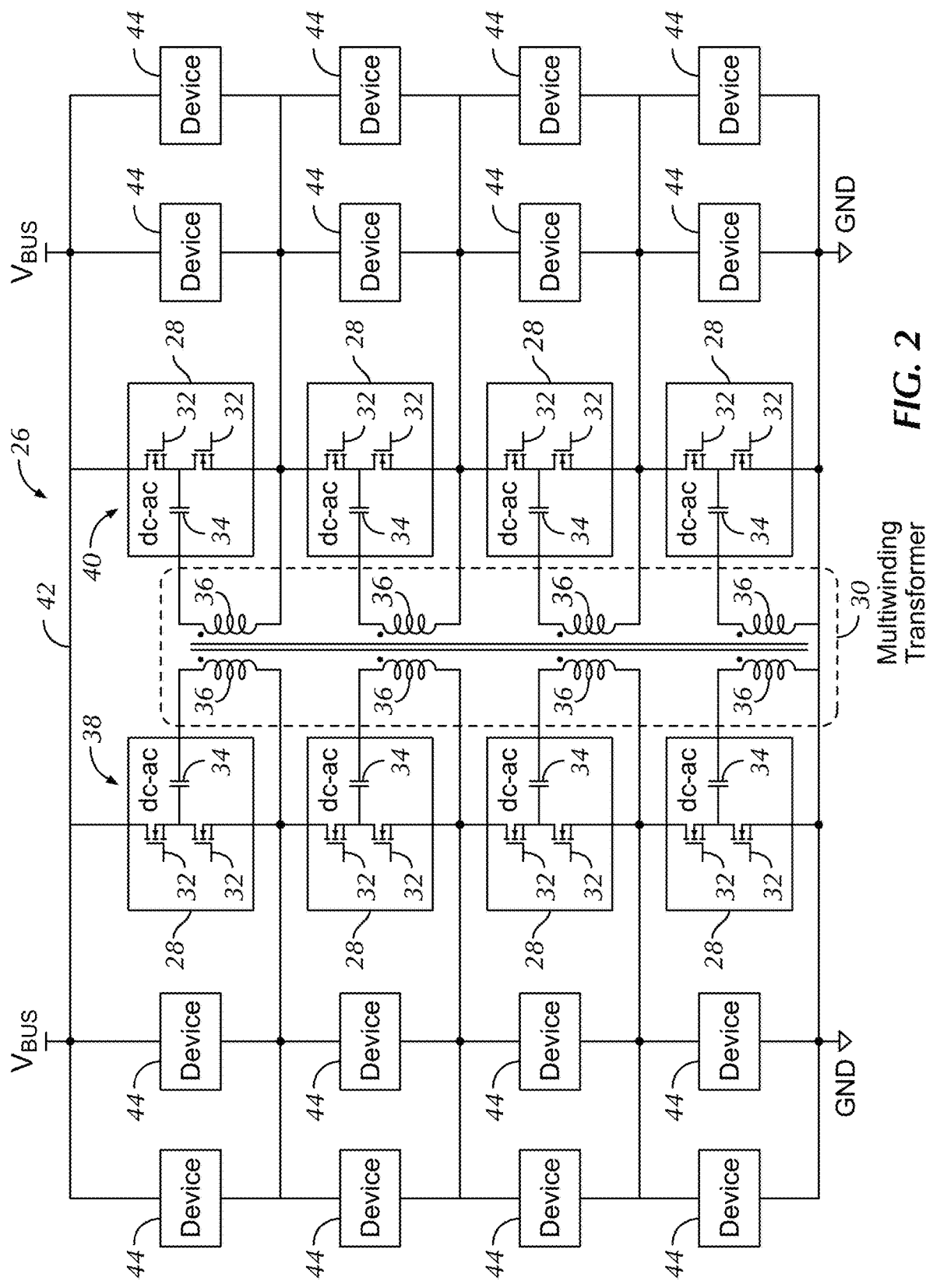
FIG. 2 depicts a schematic diagram of a MDPP system including eight DC-AC units and one eight-winding transformer according to an embodiment of the present invention.

FIG. 2 depicts a schematic of an example embodiment of an MDPP architecture 26. This system 26 has eight DC-AC conversion units 28 and one eight-winding transformer 30. Each DC-AC conversion unit 28 is implemented as a half bridge inverter with two switches 32 and one capacitor 34 and operates at about 50% duty ratio. Each DC-AC conversion unit 28 is coupled to a corresponding winding 36 of the transformer 30. Four DC-AC conversion units 28 are connected in series as a first string 38, and the other four DC-AC conversion units 28 are connected in series as a second string 40. The two strings 38 and 40 are both coupled to a common DC voltage bus 42. Each DC-AC conversion unit 28 supplies power to two devices 44 connected in parallel. Any number of additional devices can be added in parallel. Here, the entire system 26 supplies power to sixteen devices 44.

Figure 3:
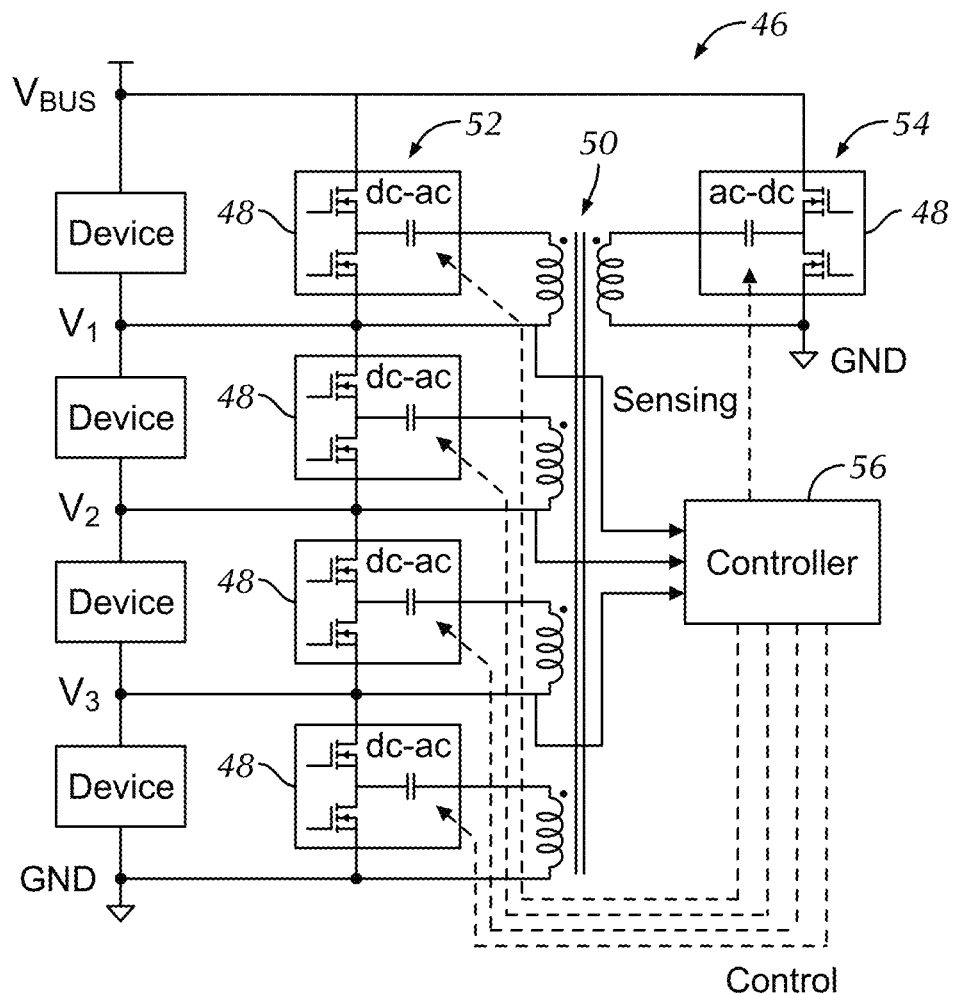
FIG. 3 depicts a schematic diagram of sensing and control circuitry of a MDPP system including five DC-AC units and a five-winding transformer according to an embodiment of the present invention.

FIG. 3 depicts a schematic of an example MDPP system 46 including sensing and control circuitry. This MDPP system 46 includes five DC-AC conversion units 48 and a five-winding transformer 50. Four DC-AC conversion units 48 are connected in series as a string 52. The remaining DC-AC conversion unit 48 is standalone 54. All five DC-AC conversion units 48 are coupled to a corresponding winding of the five-winding transformer 50. The voltage of the three intermediate nodes between the four DC-AC conversion units 48, $V_1$, $V_2$, $V_3$, are measured by a controller 56. Depending on the application, either all nodes need to be measured or only some of the nodes need to be measured. Based on the measured voltage, the controller 56 adjusts the gate signal of all the switches of the DC-AC conversion units 48 to regulate $V_1$, $V_2$, and $V_3$. Depending on the application, the DC bus voltage may be evenly divided by the DC-AC conversion units 48, i.e., $V_2=2V_3$, $V_1=3V_3$, and $V_{BUS}=4V_3$. In other applications, $V_1$, $V_2$, and $V_3$ may be arbitrarily selected. The operation of the standalone DC-AC conversion unit 48 may or may not be correlated. The DC-AC conversion units 48 may be operated at the same frequency or may be phase shifted against each other.

Figure 4:
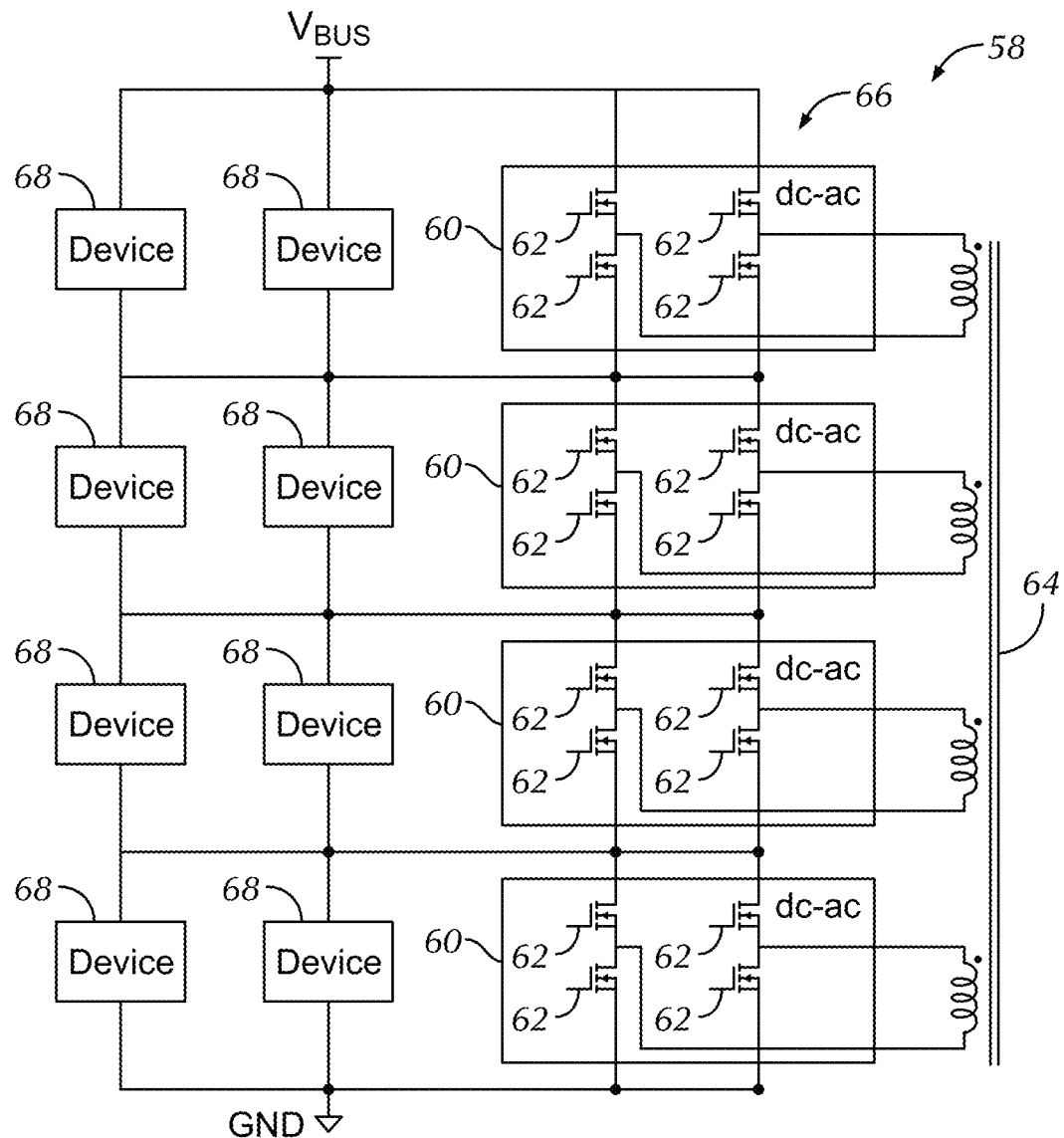
FIG. 4 depicts a schematic diagram of a MDPP system including DC-AC units implemented as full-bridge inverters according to an embodiment of the present invention.

FIG. 4 depicts a schematic of an example MDPP architecture 58 including DC-AC conversion units 60 implemented as full bridge inverters. This system 58 includes four DC-AC conversion units 60. Each DC-AC conversion unit 60 includes four switches 62 and is connected to a corresponding winding of a four-winding transformer 64. This example system has a single string 66 of DC-AC conversion units 60. Each DC-AC conversion unit 60 is connected in parallel with two devices 68. Any number of additional devices can be added in parallel.

Figure 5:
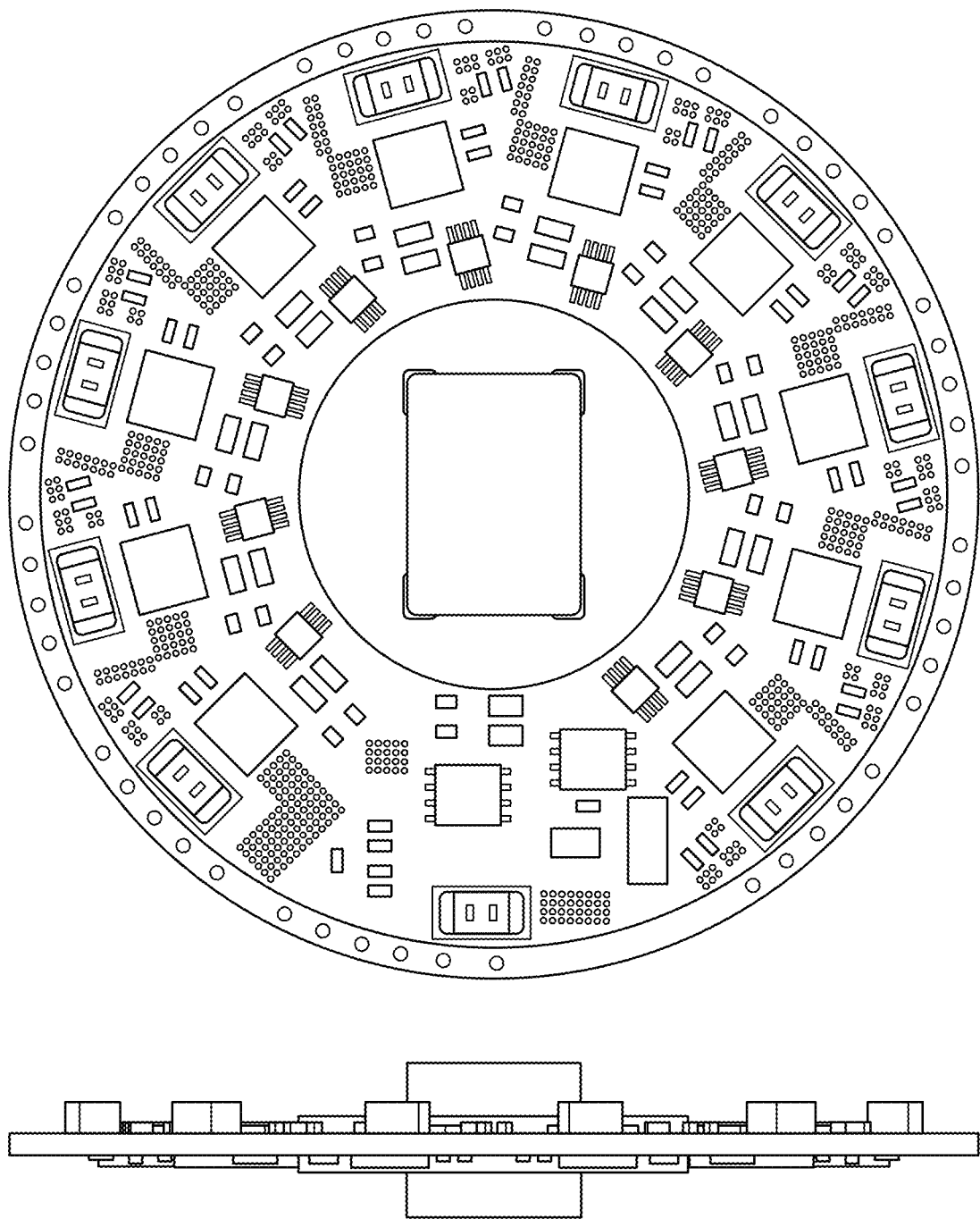
FIG. 5 depicts a prototype MDPP system including ten DC-AC ports and one ten-winding transformer according to an embodiment of the present invention.

One way to design the multi-winding transformer in a MDPP system is to implement it as a printed-circuit-board (PCB) embedded transformer. A PCB embedded transformer offers high repeatability and well-controlled parasitics with sophisticated winding patterns. The PCB may have a plurality of layers of conductors where each layer may be a single turn layer. FIG. 5 depicts an example design which includes eleven DC-AC ports and one PCB transformer. The PCB transformer has ten windings implemented on three separate printed circuit boards.

Figure 6:
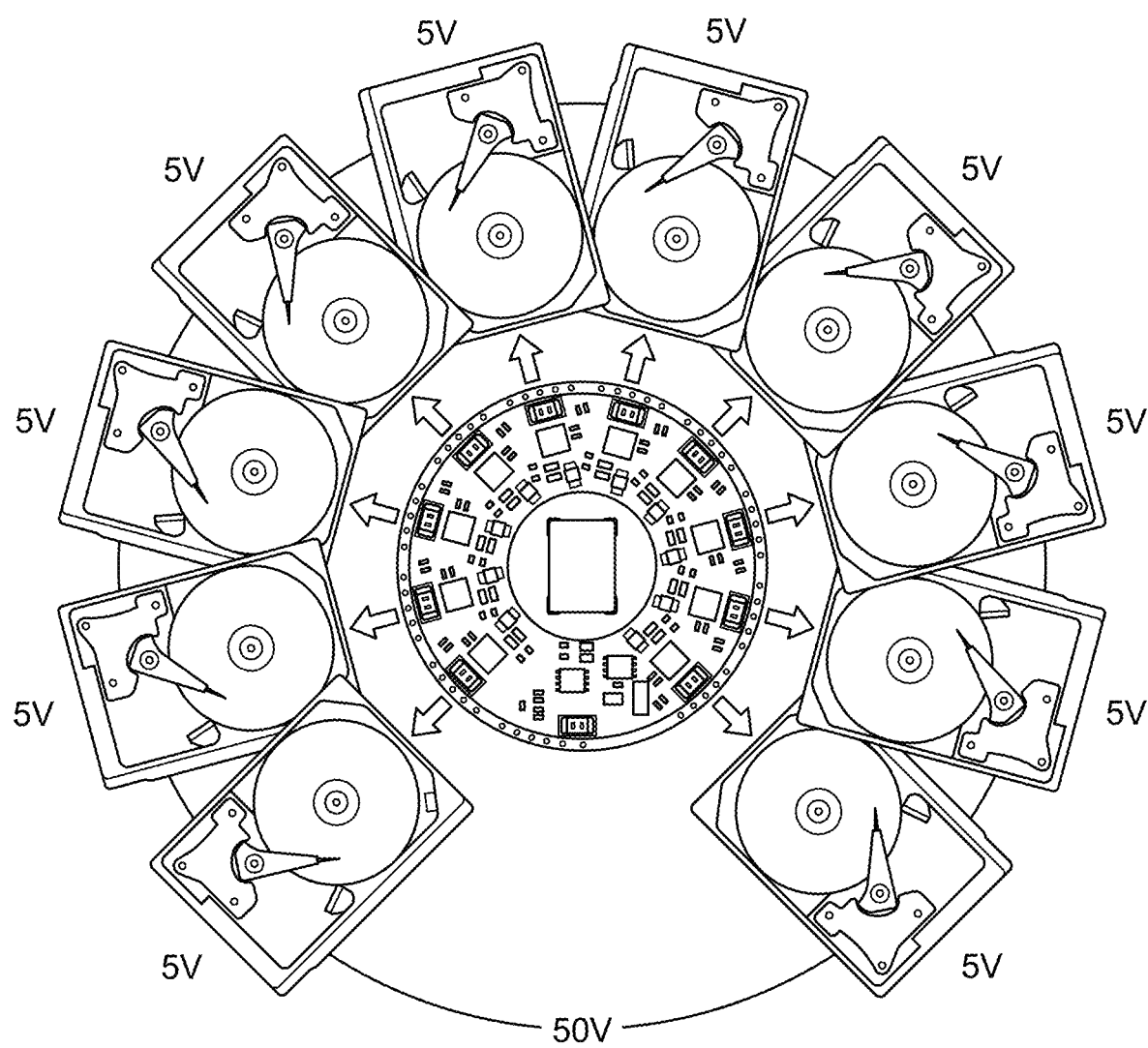
FIG. 6 depicts ten series stacked hard drives connected to the prototype MDPP system according to an embodiment of the present invention.

This example system is designed to power sixty 2.5-inch hard drives. Each hard drive consumes 5 W of power. Six hard drives are connected in parallel as one group and this system includes ten groups. The total power rating is 300 W. The system is connected to a 50 V DC voltage bus and has eleven series stacked DC-AC conversion units. Ten of the DC-AC conversion units are connected to hard drives. Each DC-AC conversion unit blocks 5V. One DC-AC conversion unit is connected to the 50 V voltage bus as a standalone string. The example system is designed such that it can maintain 5 V for all ten DC-AC units with differential power across many voltage domains. FIG. 6 illustrates the example configuration of this system including ten series stacked voltage domains and a multi-winding transformer. The converter interfaces with the ten ports and the DC voltage bus.

Figure 7:
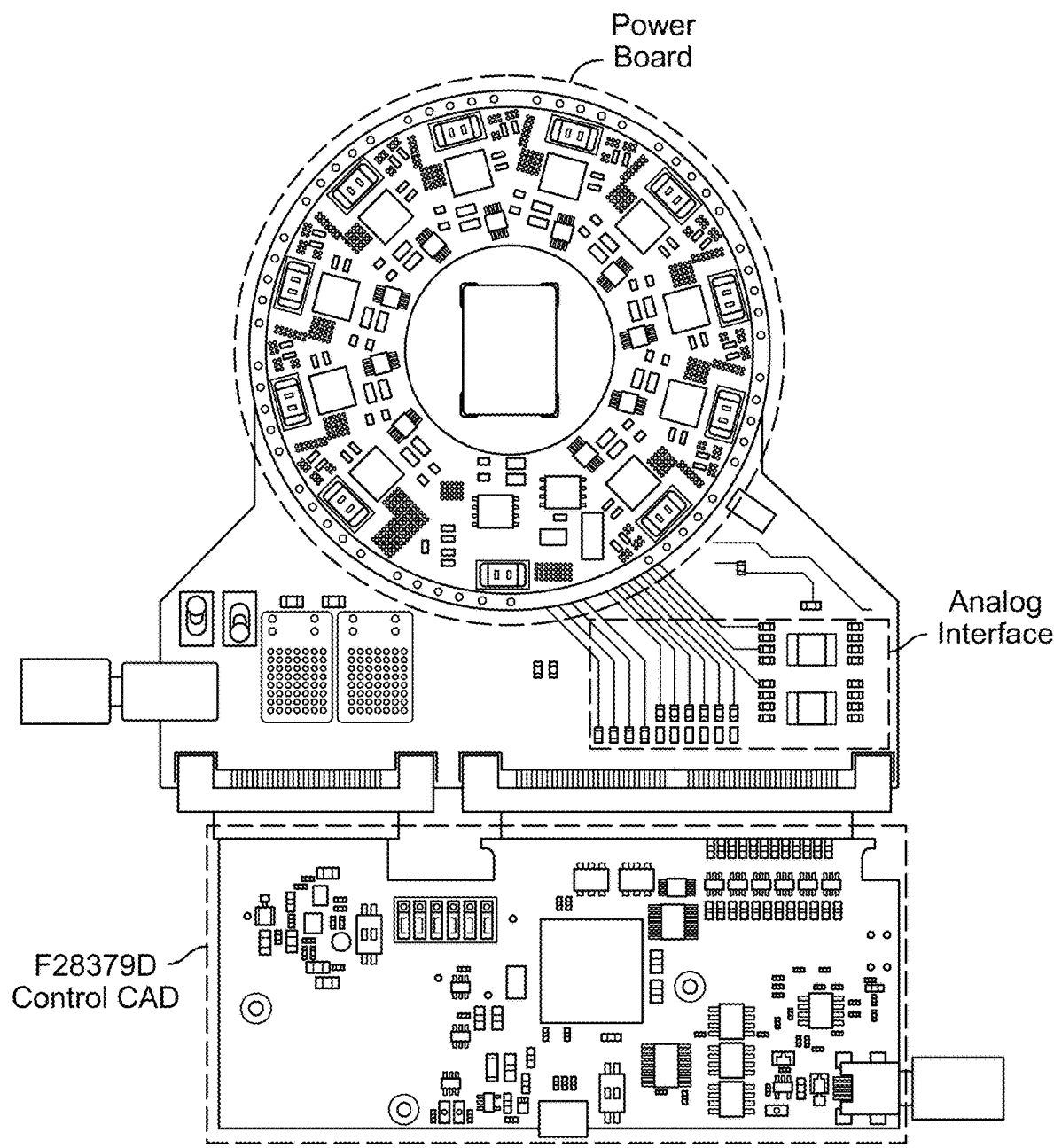
FIG. 7 depicts a full MDPP prototype including a power board, an analog interface, and a control card according to an embodiment of the present invention.
Figure 8:
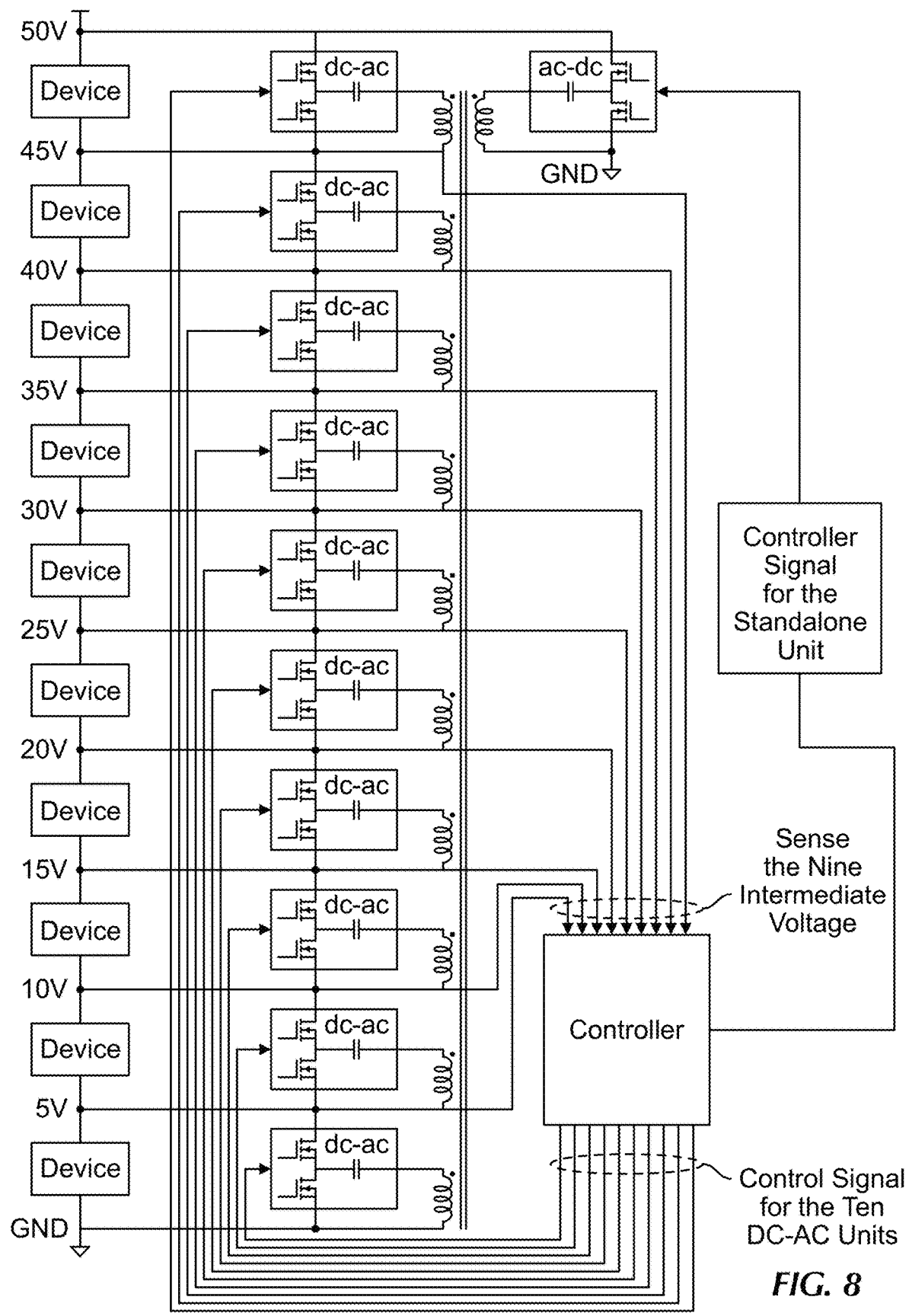
FIG. 8 depicts a schematic diagram of the full MDPP prototype including ten series-stacked DC-AC units, one standalone unit, and an eleven winding transformer according to an embodiment of the present invention.

FIGS. 7 and 8 show the full MDPP system and its schematic, respectively, including both the power stage and the control stage. The power stage processes power and the control stage generates the control signals for the ten DC-AC conversion units to regulate the voltage and the power flow. It also controls the standalone unit which functions as a buffer to enhance the system stability.

Hard Disk Drive Storage Server with Multiport AC-Coupled Differential Power Processing (MAC-DPP) Architecture Due to the ever-increasing generation of data and computing demands in emerging applications (e.g., artificial intelligence and cloud computing), the scale of data centers and their power consumption increase dramatically. Data centers currently contribute about 2% of U.S. total electricity consumption and are still rapidly growing. To maximize the computing power per unit volume and reduce the energy consumption, power converters for data centers need to be compact and efficient.

Data centers nowadays are still using a power delivery architecture that is based on the designs developed for single server scenarios—each server is connected to an AC voltage bus through an AC-DC PFC converter. Due to the low DC supply voltage need of IT equipment (e.g., 1.8 V-12 V for CPUs, RAMs, and HDDs), power supplies in servers usually employ many cascaded power conversion stages, only to limit the overall system performance. In a cascaded multi-stage architecture, the overall system efficiency tends to be low, as the full load power is processed at each stage. Moreover, due to the high voltage conversion ratio as needed, these power electronics designs are usually bulky and inefficient.

A recent trend in data center power architecture is to deliver DC power to each of the racks. A DC voltage bus is created and the uninterruptible power supply (UPS) is placed on the rack level. The DC power distribution scheme contributes to reduced power conversion stages and improved power delivery efficiency. Compared to the 12 V intermediate bus architecture, delivering power at 48 V-54 V DC bus can reduce the power delivery loss and can leverage the existing telecom power ecosystem. To transfer power from the DC voltage bus to low voltage IT equipment, this power architecture employs numerous DC-DC converters with a variety of output voltage levels for different applications. In data storage servers, since the HDDs or SSDs are highly modular with uniform voltage ratings (5 V or 12 V), there are opportunities to connect a large number of HDDs or SSDs in series to realize voltage step down. Since the vast majority of power is directly delivered to the loads and only a small amount of power difference is processed by the power converter (i.e., through differential power processing), the power conversion stress can be significantly reduced, improving the system efficiency and power density.

Figure 9:
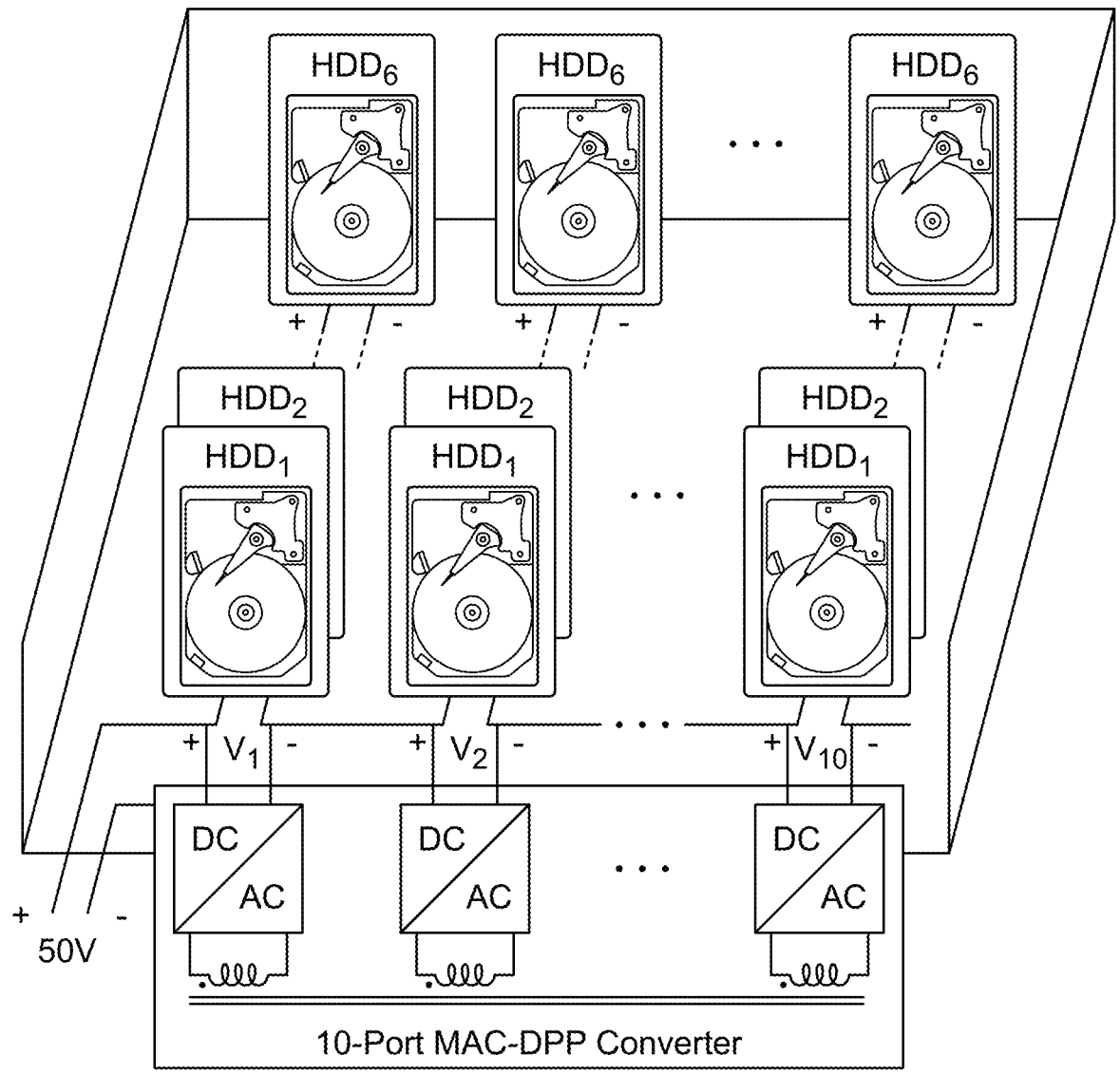
FIG. 9 depicts a 300 W 60 HDD storage server with a 10-port MAC-DPP converter according to an embodiment of the present invention.

Therefore, disclosed herein is an ultra-efficient series-stacked data storage system with a multiport AC-coupled differential power processing (MAC-DPP) architecture. The key concept is illustrated in FIG. 9. A 300 W 10-port MAC-DPP converter is designed to support 60 HDDs which are configured into 10 series-stacked voltage domains (6 HDDs×10). High-speed data transfer across different voltage domains is achieved with data transfer solutions such as but not limited to SAS and SATA. A hybrid time-sharing and distributed phase-shift control strategy is utilized to modulate the differential power flow and regulate the voltage of each domain, which can maintain the normal operation of the storage server against the worst-case hot-swapping scenario.

Figure 10A:
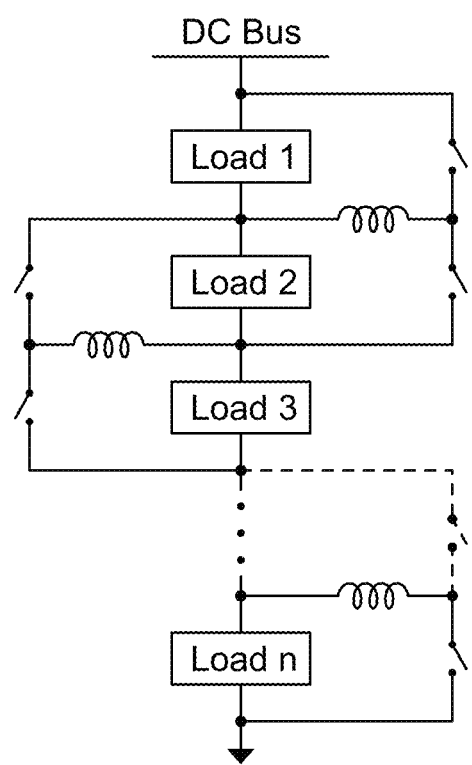
FIG. 10(*a*) depicts a load to load DPP.
Figure 10B:
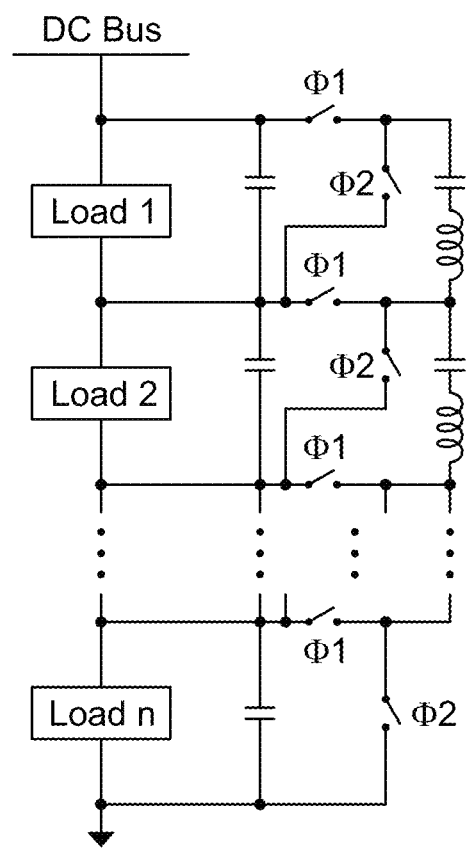

Many DPP converter topologies have been proposed. FIGS. 10(a)-(e) compare the proposed MAC-DPP architecture against many existing DPP solutions. As shown in FIG. 10(a), a load-to-load DPP architecture uses a bidirectional buck-boost circuit to process the differential power between two neighboring loads. Compared to a load-to-bus structure, the load-to-load DPP converter has lower switch voltage stress ($2V_{load}$), enabling it to utilize switches with lower voltage rating and operate at higher frequencies with smaller passive component size. However, the differential power that needs to be delivered between two non-adjacent loads has to go through multiple power conversion stages. This creates higher power conversion losses and limits the system dynamic performance, making it hard to be extended to a large number of ports or applied to the cases of highly-dynamic loads. FIG. 10(b) shows a resonant ladder switched-capacitor (SC) DPP topology. The ladder SC-DPP converter can achieve higher efficiency and higher power density. However, this solution is another embodiment of the load-to-load DPP architecture, and it can only process the differential power between two neighboring loads in one switching cycle.

Figure 10C:
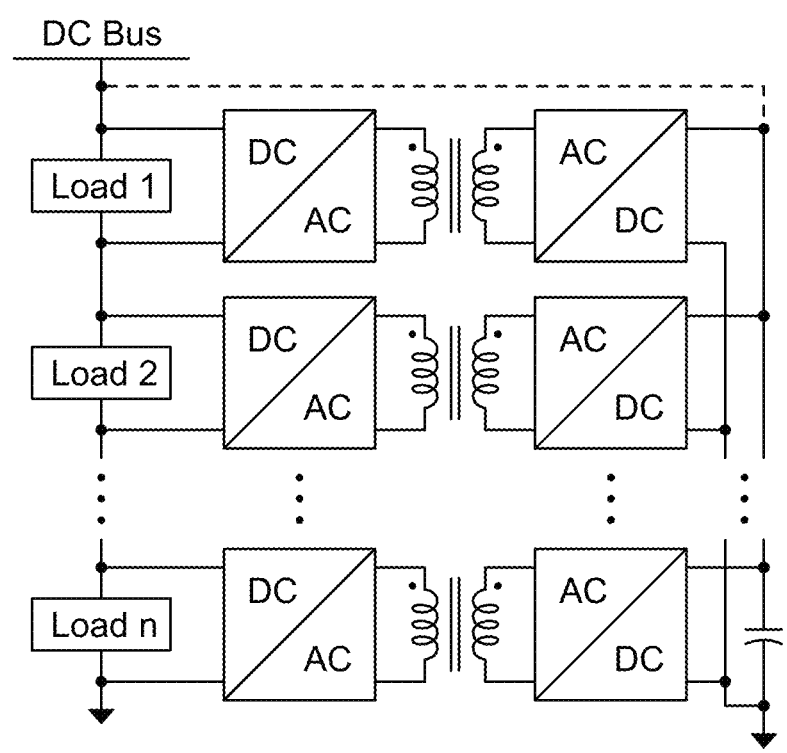

An alternative DPP approach is to employ multiple isolated DC-DC converters and connect each series-stacked voltage domain to a common DC bus, as depicted in FIG. 10(c). The DC-coupled DPP architecture can transfer power directly between two arbitrary loads. Compared to ladder-structure based DPP options, this architecture is more scalable and can offer better dynamic performance. However, the DC-coupled DPP topology requires multiple magnetics as well as high component count, which will increase the cost and total converter size. Moreover, the differential power needs to go through at least two "DC-AC-DC" stages from one port to another, resulting in additional power conversion stress and losses.

Figure 10D:
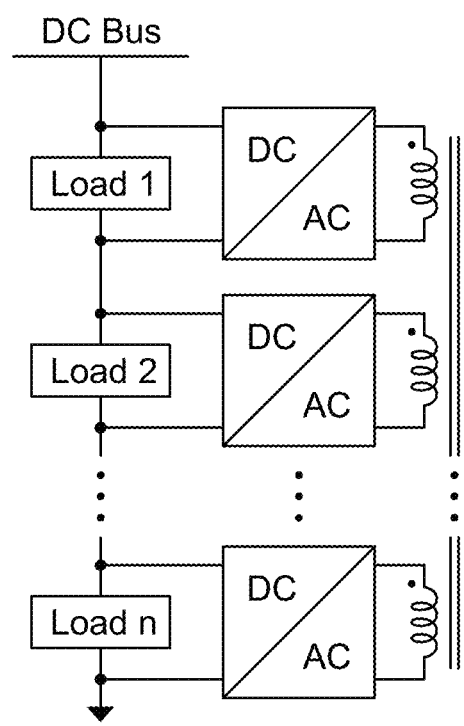

As shown in FIG. 10(d), the disclosed MAC-DPP architecture connects each voltage domain to a multi-winding transformer through a DC-AC unit. The differential power flow is coupled by the centralized transformer, and each DC-AC unit can be implemented as a half-bridge stage with a DC blocking capacitor, or other options such as but not limited to full-bridge-based topologies or Class-E-based topologies. The power transferred between two different loads is galvanic isolated and is bi-directional. The table in FIG. 10(e) lists the detailed comparison of different DPP architectures assuming half-bridge implementation for all DC-AC units. The advantages of the proposed MAC-DPP architecture include:

Fewer "DC-AC-DC" power conversion stages: The MAC-DPP architecture directly transfers power between two arbitrary ports with one single "DC-AC-DC" conversion stage. Other DPP solutions usually need two or more "DC-AC-DC" stages when delivering power between two arbitrary loads. The reduced power conversion stress improves the system dynamic performance and reduces the losses.

Reduced component count: In a MAC-DPP architecture, one voltage domain is connected to one DC-AC unit, and n voltage domains only need n DC-AC units. The MAC-DPP architecture is highly modular. It has almost the lowest component count among existing DPP options, leading to reduced cost and improved power density.

Smaller magnetic size: Compared to the DC-coupled DPP converter that needs multiple transformers, the MAC-DPP architecture has only one magnetic core. In principle, the magnetic core area of a multi-winding transformer is determined by the highest volt-second-per-turn of all windings instead of the winding count. In a MAC-DPP architecture with fully symmetric configuration, each DC-AC unit has an identical voltage rating, and all windings have identical volt-second-per-turns, which can stay the same as winding count increases. Therefore, the core area of a multi-winding transformer in the MAC-DPP is roughly the same as that of a two-winding transformer in other isolated DPP options. Only the window area increases as the winding count increases. Theoretically, the MAC-DPP architecture can reduce the magnetic core area by n times compared to other isolated DPP implementations (n is the number of series-stacked voltage domains).

Figure 11:
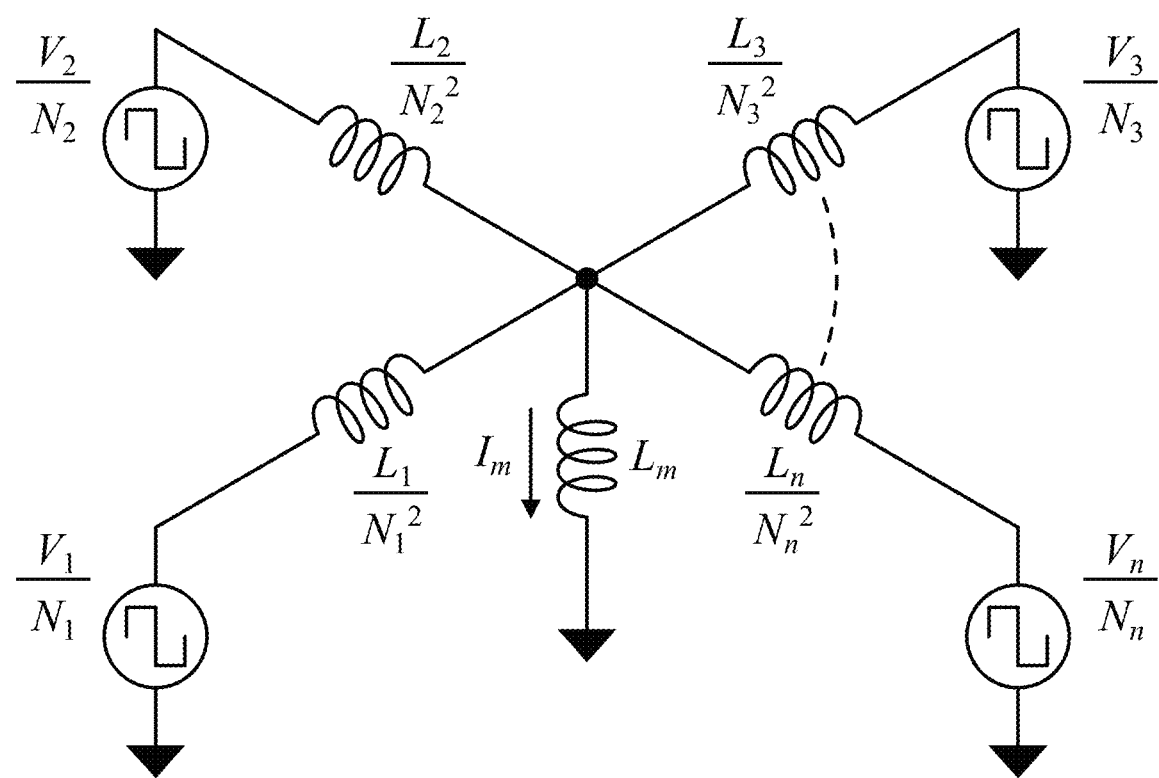
FIG. 11 depicts a lumped circuit model of a multi-winding transformer in the multi-port AC-coupled converter according to an embodiment of the present invention.

One challenge of designing the MAC-DPP converter is to build a high-performance low volume multi-winding transformer. The basic requirement is to maintain normal operation of all the windings without saturating the magnetic core. Generally, the rule that the magnetic core area is determined by the maximum volt-second-per-turn in a two-winding transformer can be extended to the multi-winding cases, and the minimum core area can be obtained by analyzing the highest magnetizing current in the worst-case scenario. FIG. 11 shows the normalized equivalent lumped circuit model of the multi-winding transformer in a multiport AC coupled converter. The DC-AC units at each port (e.g., half-bridge stages with DC blocking capacitors) are modeled as square wave voltage sources driving an n port inductor network. $V_i$ is the square wave voltage amplitude and $N_i$ is the winding turn. $L_i$ includes the leakage inductance as well as external inductance of port #1. The current that flows through the equivalent magnetizing inductance in one switching period can be obtained by applying superposition:

$$I_m = \sum_{i=1}^{n} \frac{V_i}{N_i L_{eqi}} \left( \frac{T}{4} - \left| t - \frac{T}{2}\left(1 - \frac{\phi_i}{\pi}\right) \right| \right) \times K_i \quad (1)$$

in which T is the switching period and $\phi_i$ is the phase-shift. $L_{eqi}$ is the equivalent inductance seen from the $i^{th}$ port and the $K_i$ is the current shunting ratio of port #i, which can be expressed as functions of the inductance values:

$$\begin{cases} L_{eqi} = \left( \sum_{k \neq i} \frac{N_k^2}{L_k} + \frac{1}{L_m} \right)^{-1} + \frac{L_i}{N_i^2}, \\ K_i = \frac{\left( \sum_{k \neq i} \frac{N_k^2}{L_k} \right)^{-1}}{\left( \sum_{k \neq i} \frac{N_k^2}{L_k} \right)^{-1} + L_m} \end{cases} \quad (2)$$

Figure 12:
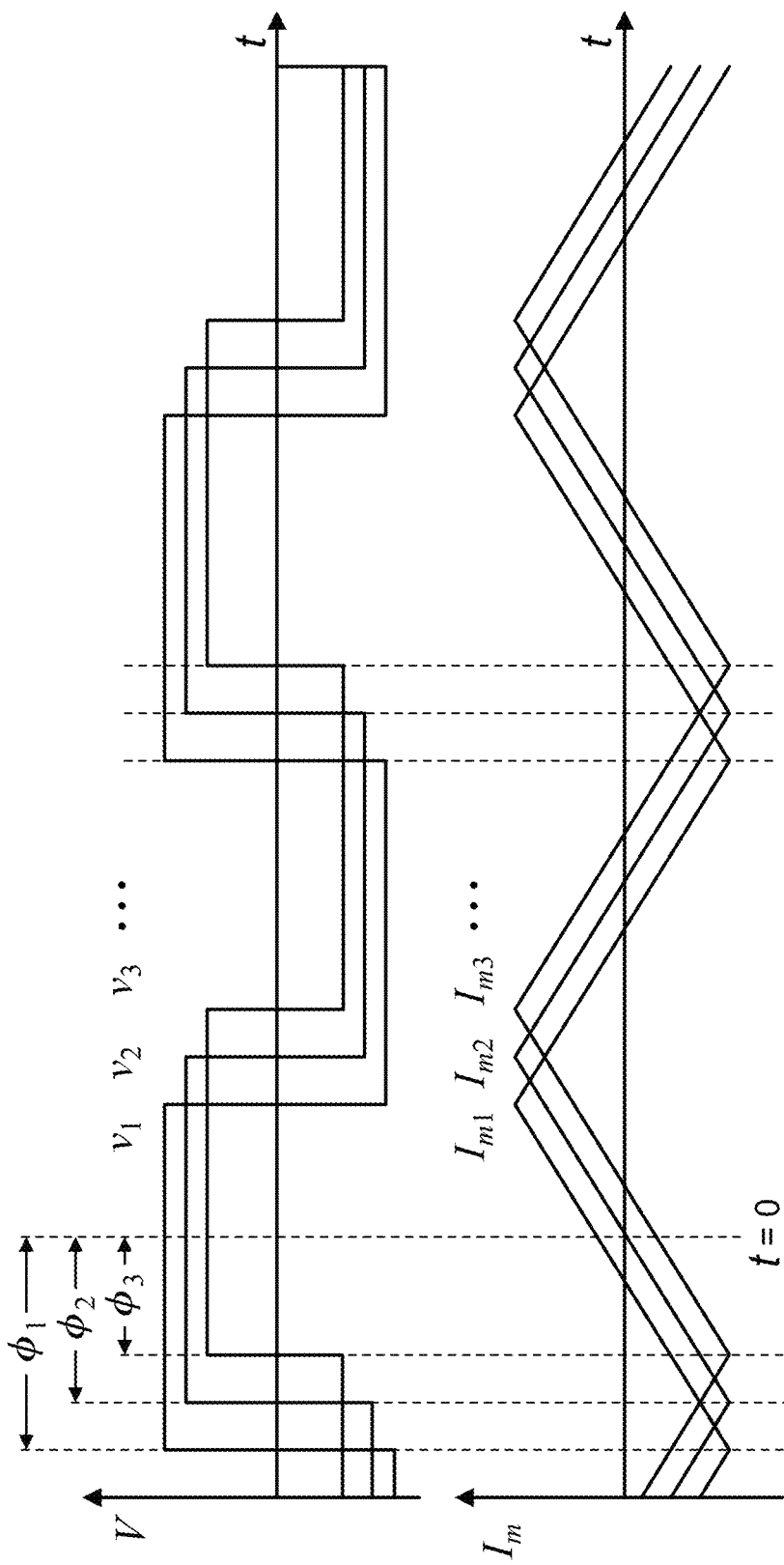
FIG. 12 depicts voltage and current waveforms when applying superposition to n DC-AC units according to an embodiment of the present invention.

Each square wave voltage source generates a triangular magnetizing current in $L_m$ as illustrated in Equation (1). FIG. 12 demonstrates the magnetic currents induced by different voltage sources considering the phase-shifts. For each voltage source, the induced magnetic current will reach the peak at the time of $$\frac{T}{2}\left(1 - \frac{\phi_i}{\pi}\right),$$

and the total magnetic current will reach the maximum when all the sources are in phase. In a symmetric multi-port AC-coupled (MAC) converter design, each winding has identical $V_i/N_i$ and $L_i/N_i^2$. Denoting them as $V_0$ (volt-per-turn) and Lo separately, the maximum magnetic current is:

$$I_{m\_max} = \sum_{i=1}^{n} \frac{K_i V_i}{N_i L_{eqi}} \times \frac{T}{4} = \frac{V_0}{\frac{L_0}{n} + L^m} \times \frac{T}{4} \approx \frac{V_0 T}{4 L_m} \quad (3)$$

The maximum magnetic current is almost irrelevant with the winding count n, and the maximum magnetic flux ($\Phi_{m\_max} = L_m I_{m\_max} = V_0 T/4$) is only determined by the volt-second-per-turn ($V_0 T$). Accordingly, the minimum core area ($A_{min}$) of the multi-winding transformer in a symmetric MAC converter configuration is:

$$A_{min} = \frac{\Phi_{m\_max}}{B_{max}} \approx \frac{V_0 T}{4 B_{max}} \quad (4)$$

As a result, the minimum core area of a multi-winding transformer is roughly the same as that of a two-winding transformer, if their volt-second-per-turn are the same. This is the fundamental reason why the proposed MAC-DPP architecture can achieve much higher power density and better magnetic utilization than other isolated DPP implementations. Compared to other non-isolated DPP options, the MAC-DPP architecture offers reduced power conversion stress (fewer "DC-AC-DC" stages) and lower component count.

Figure 13:
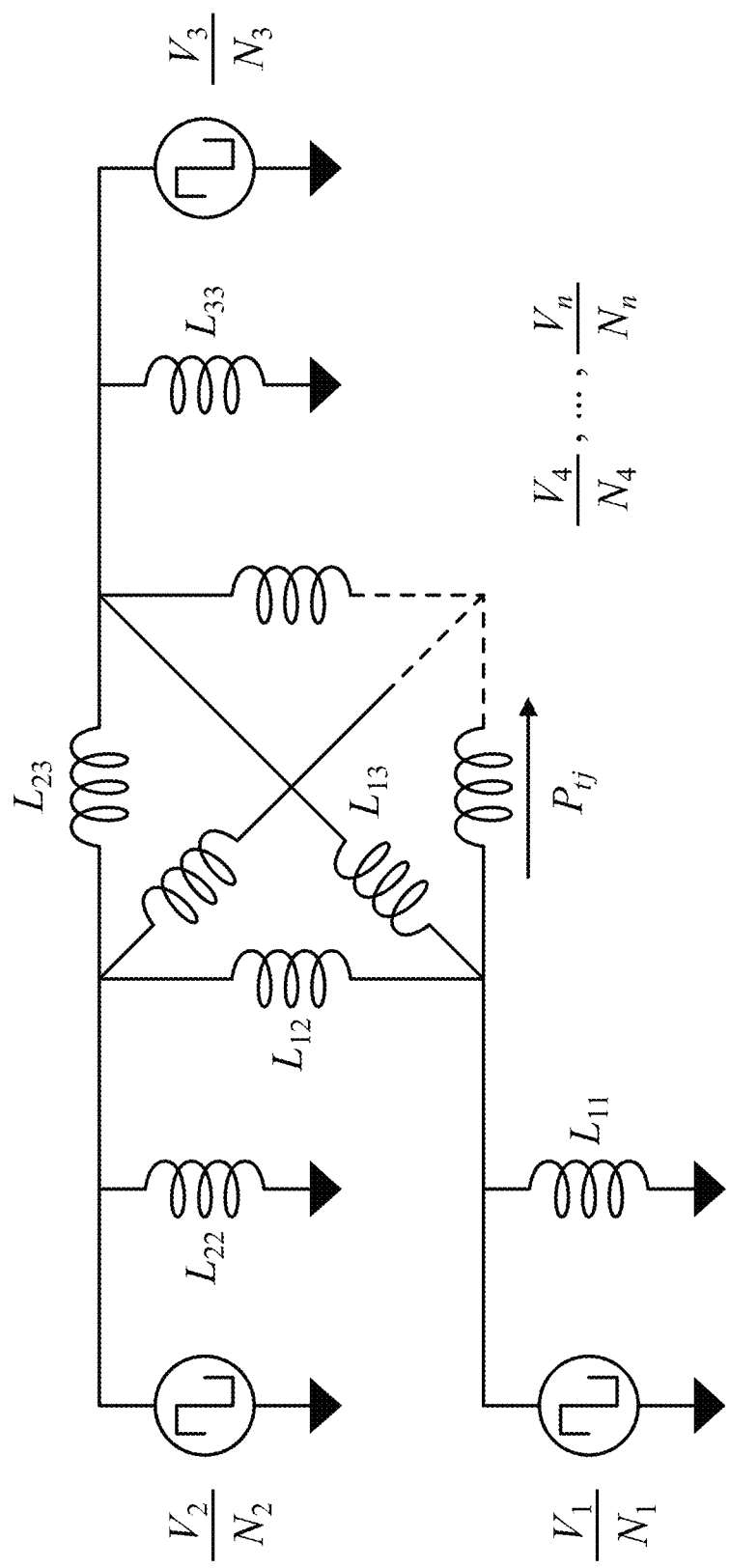
FIG. 13 depicts modeling the multi-winding transformer in the MAC-DPP converter according to an embodiment of the present invention.

The MAC-DPP converter is a multi-input-multi-output system. To maintain stable port voltage with unbalanced load power, accurate differential power flow control is needed. FIG. 13 shows the equivalent delta model modified from the star-model in FIG. 11. The power flow that transfers through each link inductor ($L_{ij}$) can be calculated in the same way as that in a dual active bridge (DAB) converter. The total power that feeds into the passive network from the $i^{th}$ port is:

$$P_i = \sum_{j=1}^{n} \frac{V_i V_j}{2\pi f_s N_i N_j L_{ij}} \phi_{ij} \left(1 - \frac{|\phi_{ij}|}{\pi}\right) \quad (5)$$

As indicated in Equation (5), the input differential power of one port ($P_i$) is related with the phase-shifts of all ports $\{\phi_1, \phi_2, \ldots, \phi_n\}$. The closely-coupled power flow brings challenges to the port voltage regulation, especially in the case where a large number of loads are stacked in series. A few different control methods for multi-active-bridge (MAB) converters can be adopted in this MAC-DPP architecture, particularly noting time-sharing control and phase-shift control.

Figure 14:
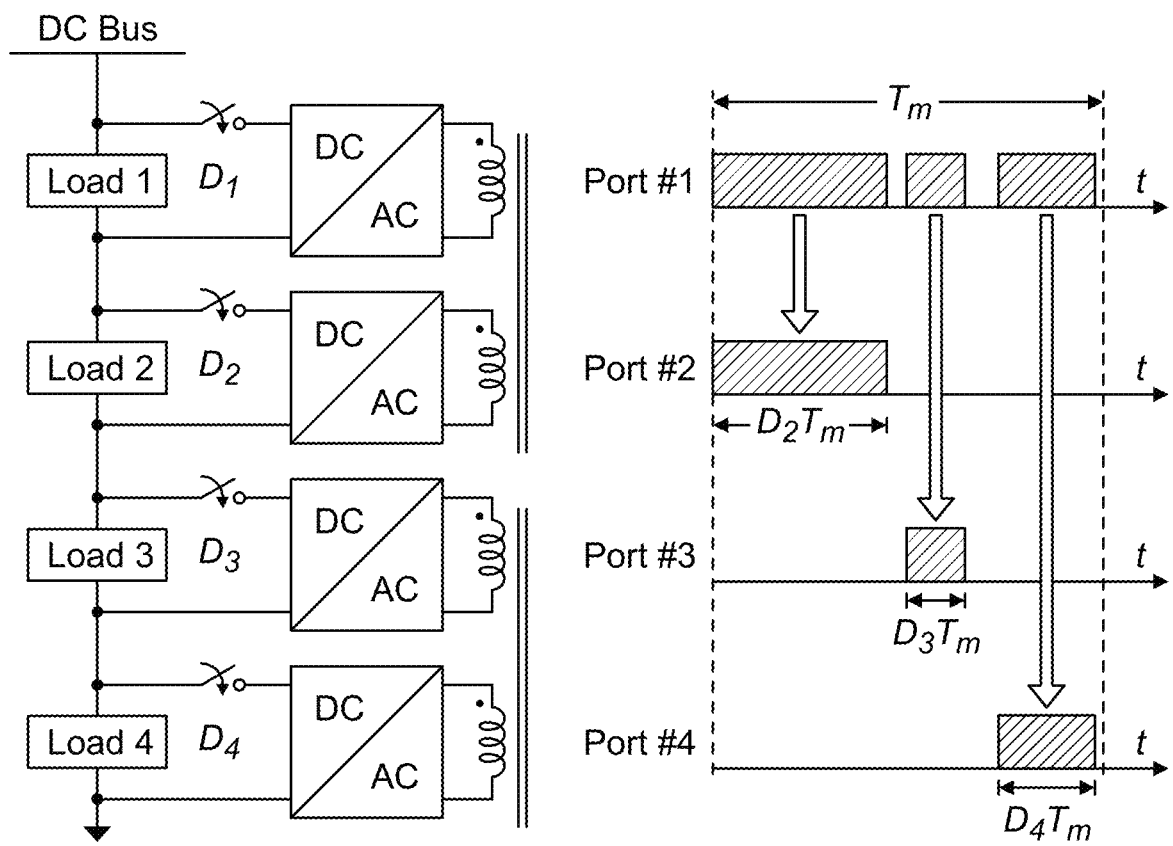
FIG. 14 depicts time-sharing control of an example four port MAC-DPP architecture according to an embodiment of the present invention.

FIG. 14 shows the principles of the time-sharing control. Each port of the MAC-DPP converter is enabled for a specific proportion of time during one modulation cycle ($T_m$), which usually contains numerous switching periods. Only two ports are enabled at one time instance. They are denoted as active ports. Other ports are inactive and do not transfer power. In this case, the MAC-DPP converter delivers power similar to a dual-active-bridge converter. The switching frequency and the relative phase-shift between two active ports ($\phi_{ij}$) can be adjusted to achieve the maximum port to port power delivering efficiency. The amount of the input differential power at the $i^{th}$ port is controlled by modulating its active duty ratio in one modulation cycle (Di). With time-sharing control, the MAC-DPP converter can always operate at the phase-shift of the optimal efficiency and reduce losses during the idling period (i.e. when no port is enabled), which will benefit the overall system efficiency. Time-sharing control preferably applies to cases where the load power is lightly unbalanced with small differential power.

Figure 15:
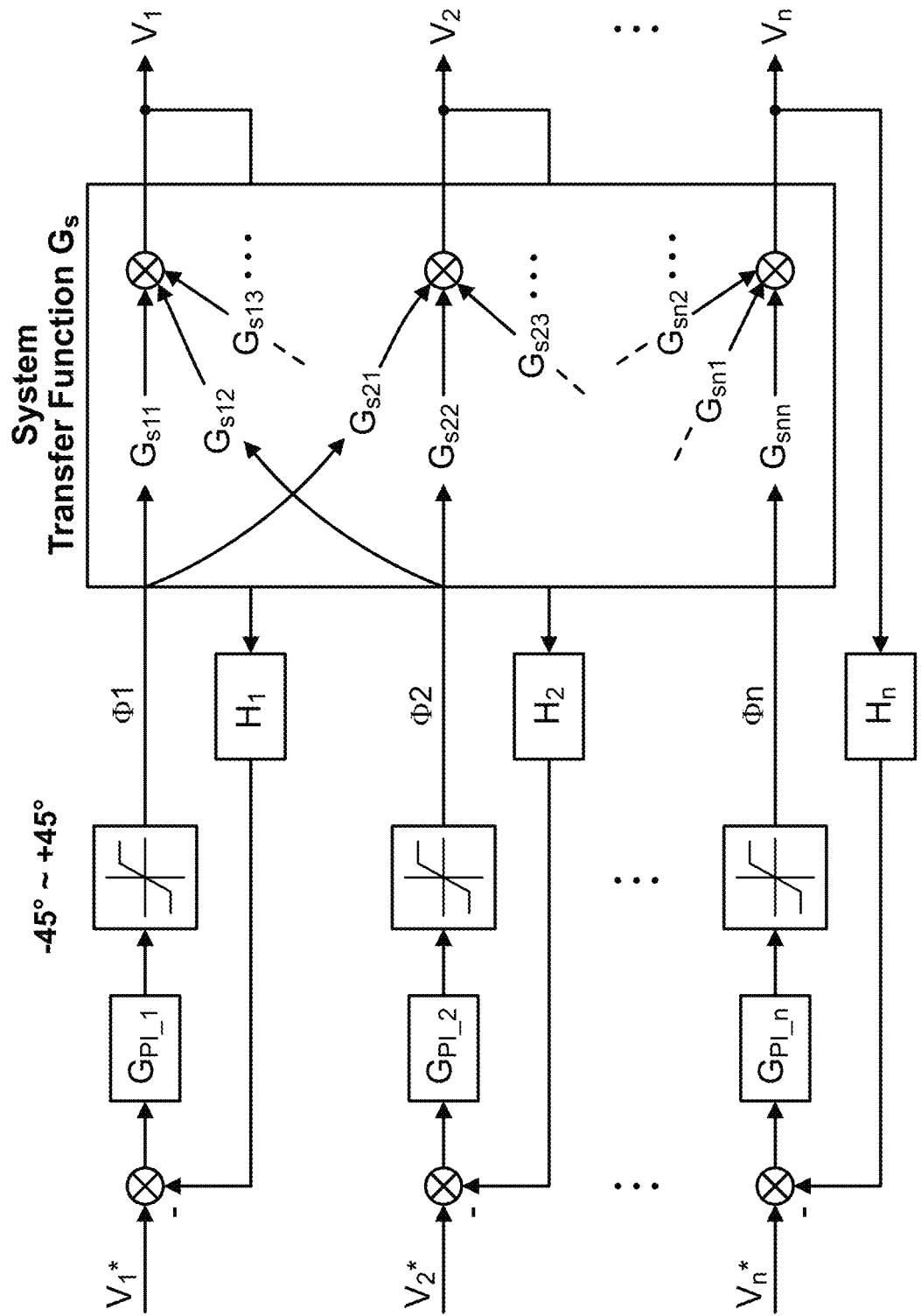
FIG. 15 depicts block diagrams of a distributed phase shift control strategy according to an embodiment of the present invention.

Different from time-sharing control, phase-shift control has all the ports enabled simultaneously, and the power flow can be manipulated by changing the phase-shift of each port. Phase-shift control is capable of delivering large differential power at heavily unbalanced load, but it might run into voltage oscillation because of the closely-coupled power flow. A systematic modeling approach can be used to identify the small signal model for the MAC-DPP converter with an arbitrary number of ports. The modeling approach accurately captures the impacts of power losses, and the system transfer function matrix ($G_s$) that describes the dynamics from any control phase-shift ($\phi_i$) to port voltage ($v_j$) is derived. To regulate the load voltage, a feedback loop can be implemented at each port to adjust its own phase-shift based on the locally measured port voltage, as depicted in FIG. 15. However, the non-diagonal elements ($G_{sij(i \neq j)}$) of the transfer function matrix indicates the interaction between different control loops. To decouple the control loops, an inverse matrix of the system transfer function could be applied, but this method places heavy computation burden on the controller, making it difficult to be extended to the cases with a large number of ports. As such, disclosed herein is a distributed phase-shift control strategy which considers the interactions between different feedback loops as disturbances. Based on the derived system transfer function, the loop gain of each individual port voltage regulator is:

$$G_{Li}(s) = G_{PI_i}(s) \times G_{sii}(s) \times H_i(s) \quad (6)$$

Here $G_{PI_i}(s)$ is the PI controller parameters. $G_{sii}(s)$ is the diagonal elements of the system transfer function matrix. $H_i(s)$ is the transfer function of the sampling circuitry. The explicitly derived loop gain can be used to analyze the dynamic performance of the system. Through carefully designing the phase margin of each loop gain, the oscillation caused by the interactions between different feedback loops can be avoided.

A well-designed storage server usually has equally-allocated storage tasks among many HDDs (e.g., RAID systems). Each HDD has similar reading/writing load. If many HDDs are connected in parallel in one series-stacked voltage domain, the power consumptions of multiple voltage domains are usually very close to each other with very low differential power. Time-sharing control can be applied in this scenario to improve the system efficiency. Under the circumstances where there is large differential power (e.g., hot-swapping, startup, etc.), the MAC-DPP converter can shift to phase-shift control to ensure rapid and stable port voltage regulation.

To experimentally validate the MAC-DPP architecture in data center rack-level power delivery, a 10-port MAC-DPP converter of 300 W power rating is built and tested. A 50-HDD data storage server is set up for testing the operation of the MAC-DPP converter in normal operation and hot-swapping.

Figure 16A:
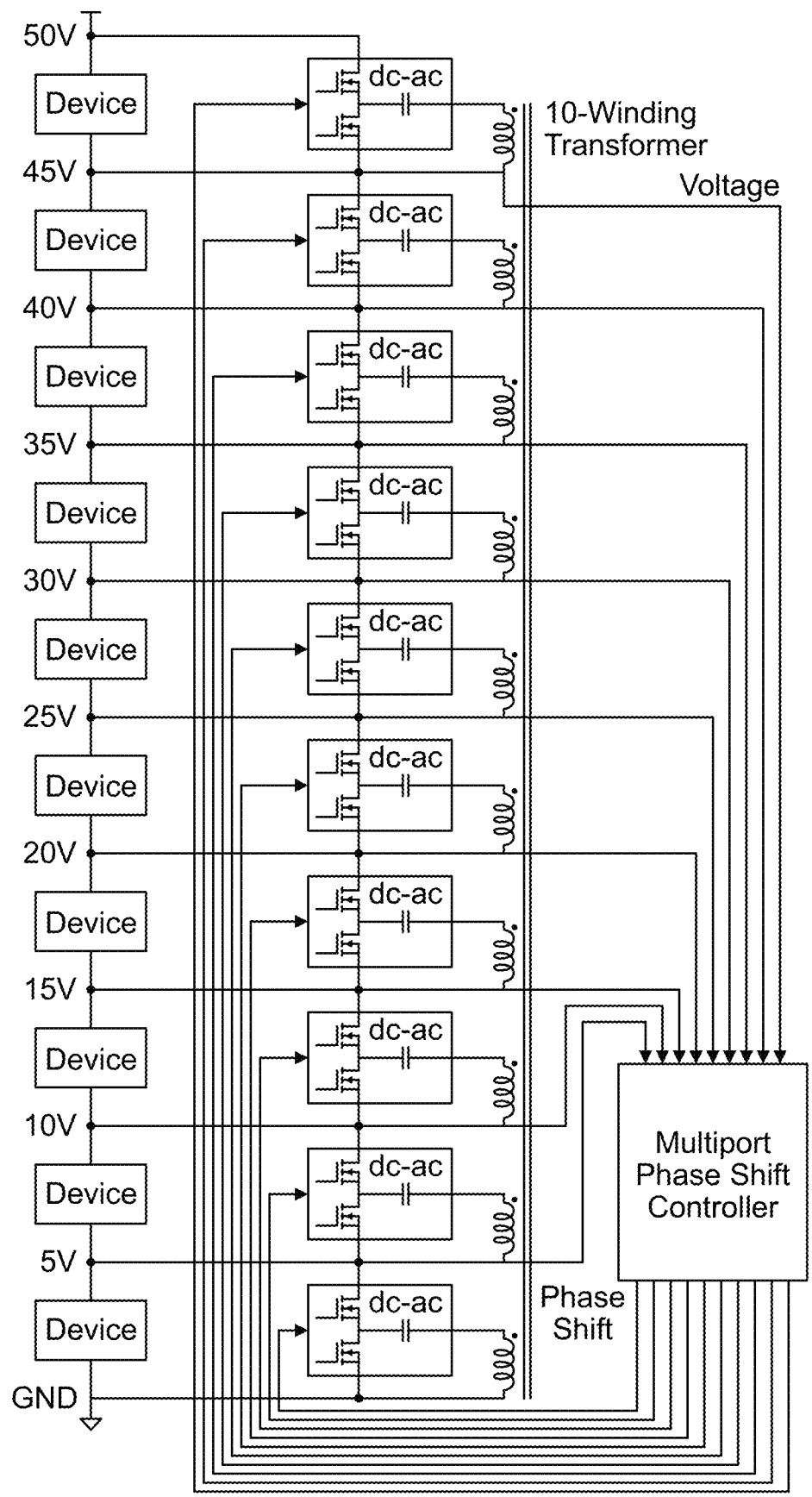
FIG. 16(*a*) depicts a topology of a 10-port MAC-DPP converter according to an embodiment of the present invention.
Figure 16B:
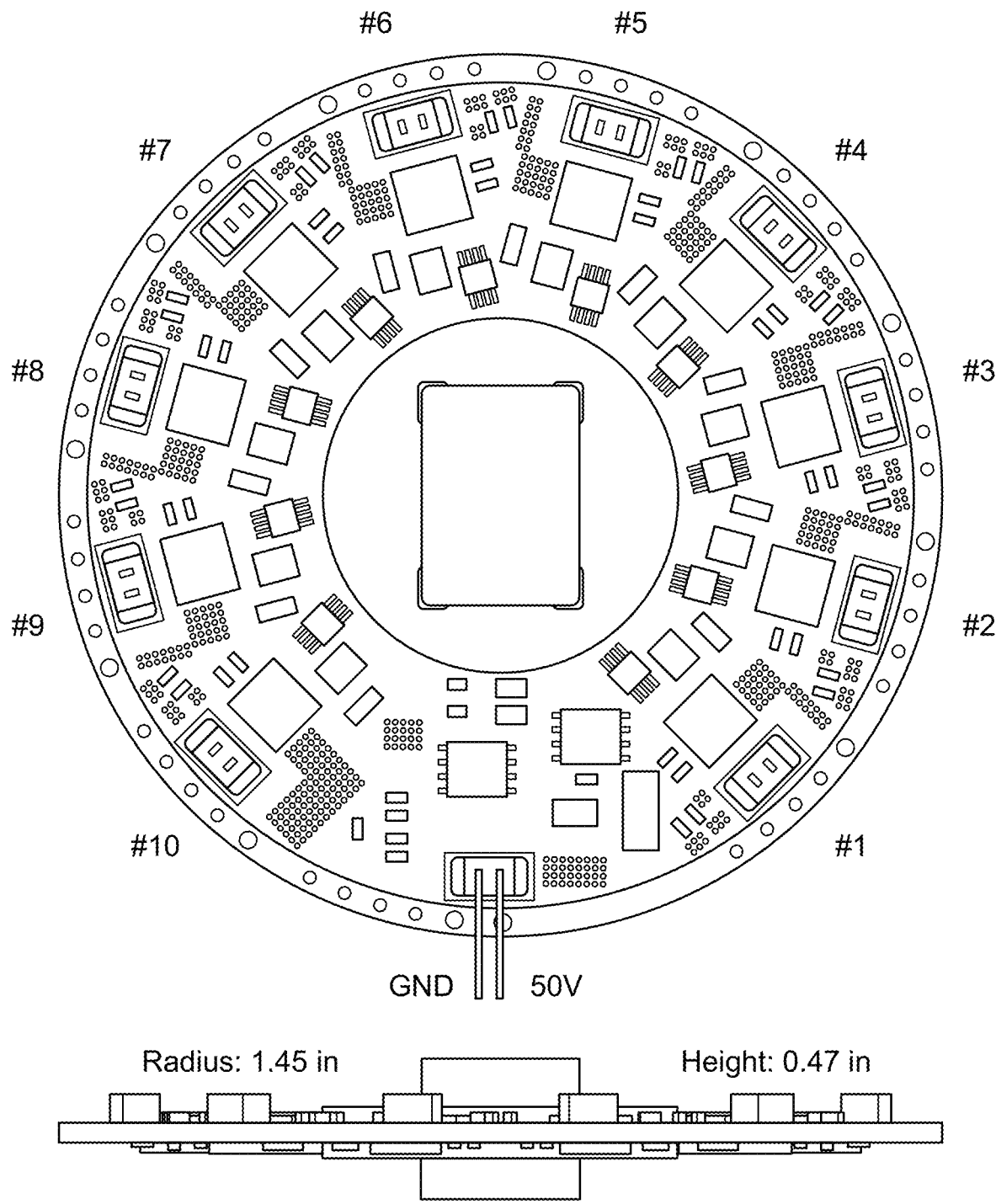

FIGS. 16(a)-(b) show the circuit topology and hardware prototype of a 10-port MAC-DPP converter. The DC-AC units are implemented as half-bridges with DC blocking capacitors, connected to a 10-winding transformer. The 50 V DC bus is split into 10 series-stacked 5 V voltage domains to support numerous 2.5-inch HDDs. The MAC-DPP converter is designed to process over 30 W differential power for each port. Therefore, each voltage domain can support 6 HDDs of 30 W peak power (5 W×6 during spinning up) in case of the worst hot-swapping scenario where the HDDs of an entire voltage domain are removed, and the entire 10-port MAC-DPP architecture can support 60 HDDs with over 300 W peak power rating. The MAC-DPP prototype is 1.45" in radius and 0.47" in height, so the power density of the prototype is over 100 W/in$^3$.

Figure 17:
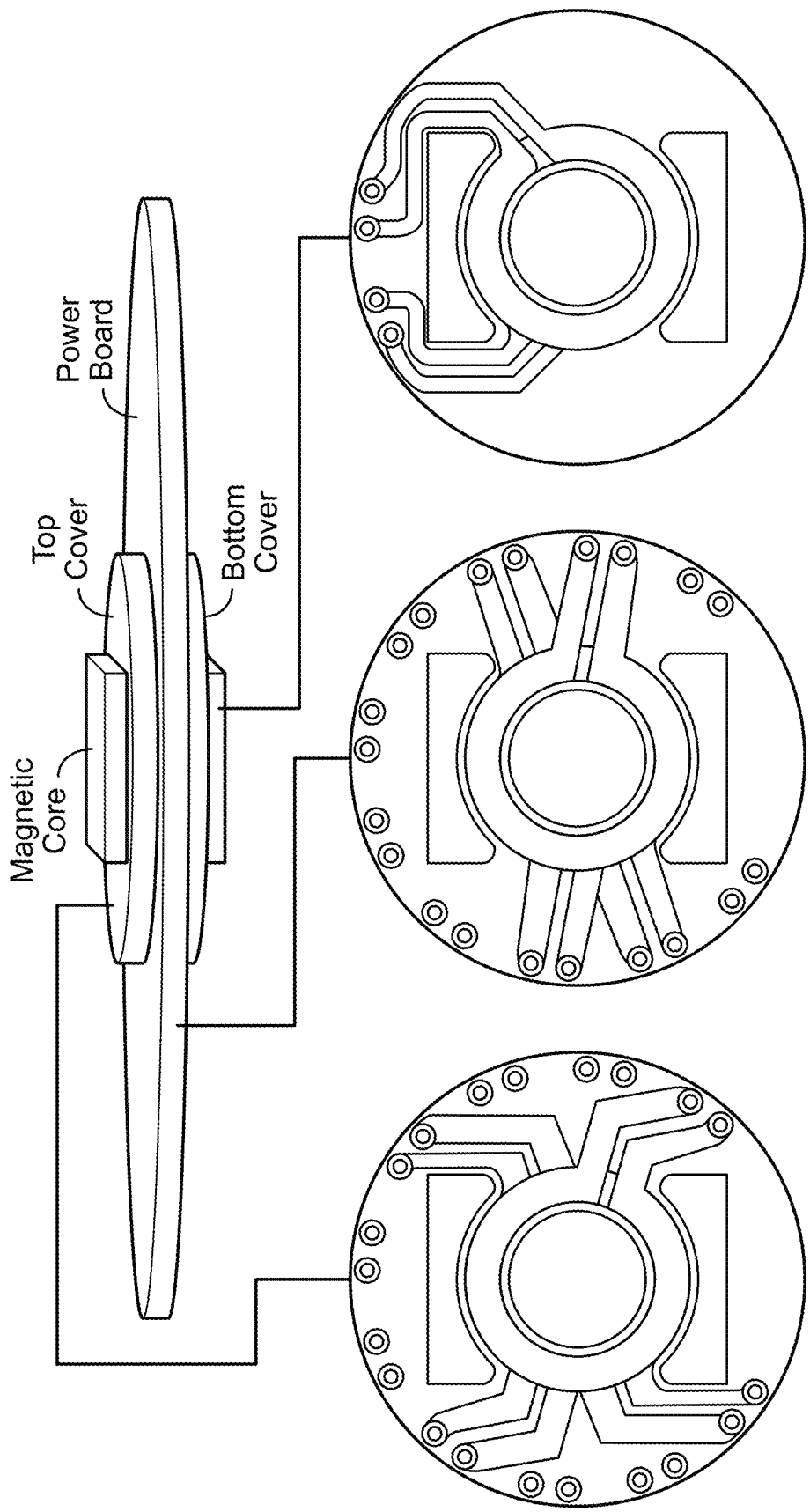
FIG. 17 depicts the structure of the 10-winding planar transformer according to an embodiment of the present invention.

FIG. 17 shows the structure of the 10-winding planar transformer. Three 4-layer PCBs and two EQ20-N97 magnetic cores are stacked together. Ten windings are distributed on the three PCBs, and each winding has one single turn. The windings on the top cover and bottom cover are connected to the power board through vias. The cross-section area of the central magnetic core is only 0.17" in radius, which is the similar size as that in a two-winding transformer of the same volt-second-per-turn (5V at 100 kHz). A conventional isolated DPP design would require ten similar magnetic cores, while the MAC-DPP architecture only needs one.

Figure 18:
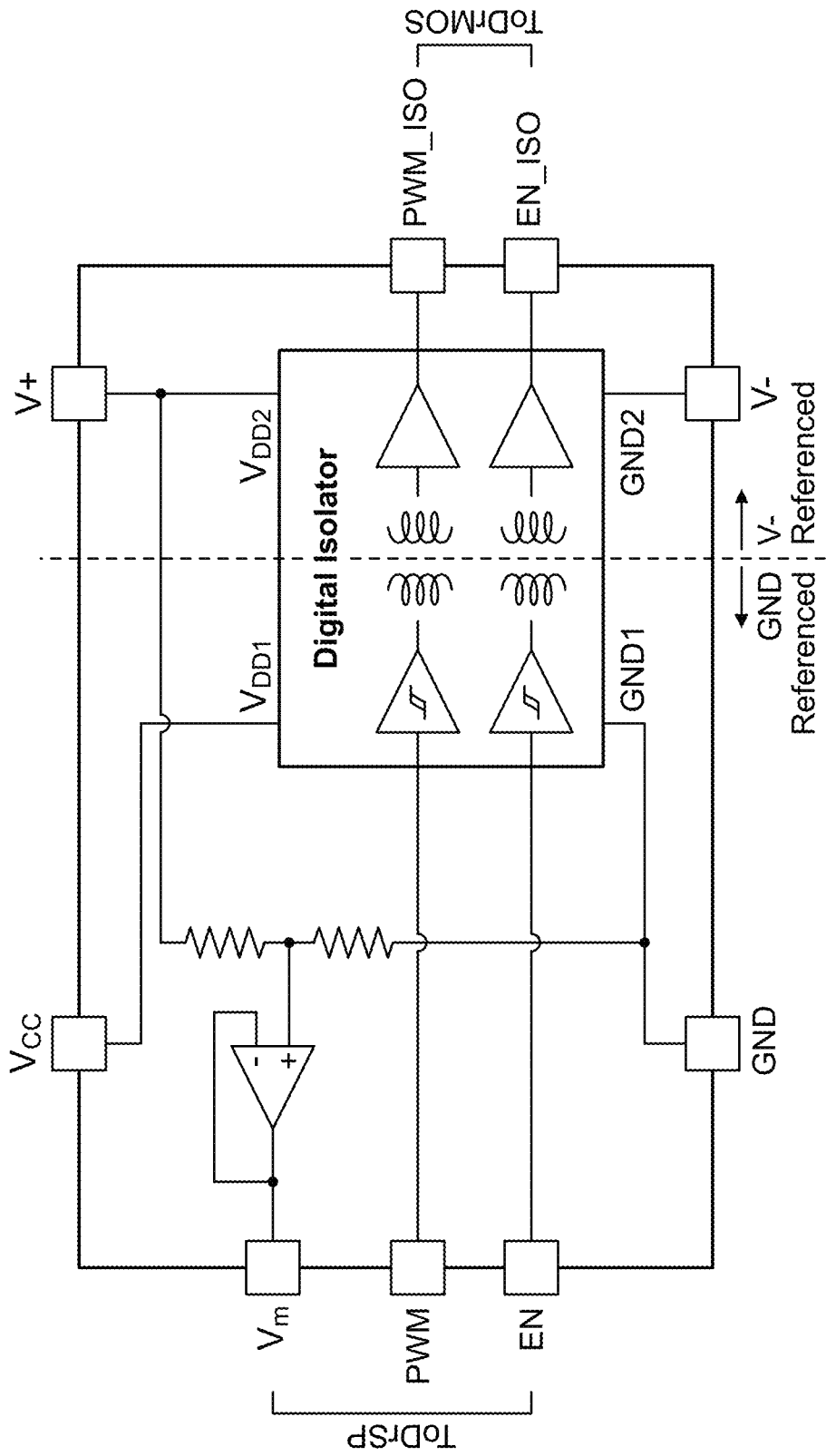
FIG. 18 depicts a modular implementation of the isolated control circuitry and voltage sampling circuit at each port according to an embodiment of the present invention.

The voltage sampling circuits and the isolated control signals including PWM signals and the enable signals are implemented modularly for each port as depicted in FIG. 18. In each module, a two-channel isolator is applied, and its secondary side is powered by the corresponding 5 V voltage domain directly. No additional isolated supply is needed. The voltage sampling circuit utilizes a resistive divider with a buffer to scale down the upper node voltage (V+) and send it back to the DSP. Distributed phase-shift control is implemented in the DSP, generating the control signals with different phase-shifts, as indicated in FIG. 16(a). The centralized multi-port phase-shift controller (DSP) can also be implemented as separate control modules, which, together with the voltage sampling circuits, can be further integrated into the half-bridge power stage, enabling fully integrated modular building blocks for the MAC-DPP architecture.

Figure 19:
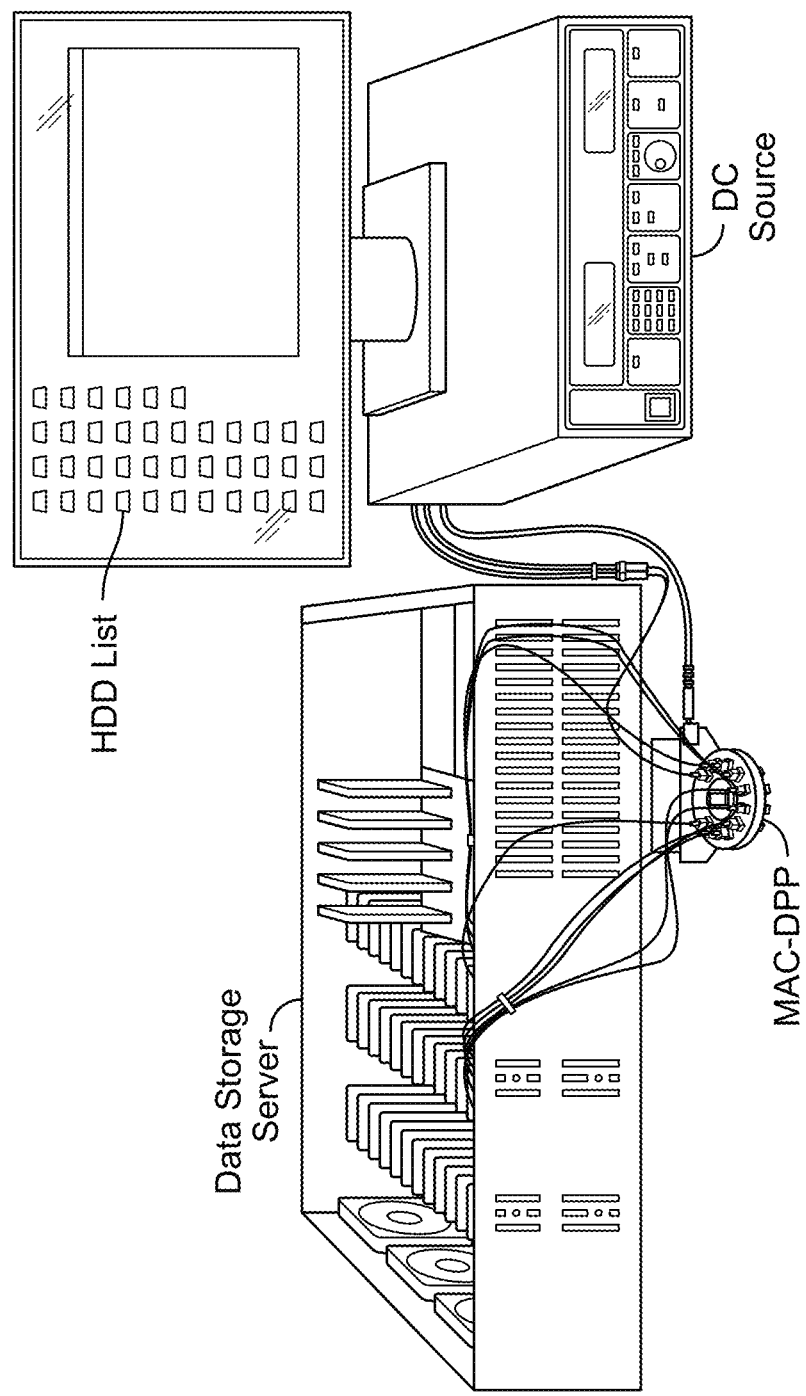
FIG. 19 depicts a 12 TB HDD test bench modified from a server according to an embodiment of the present invention.
Figure 20:
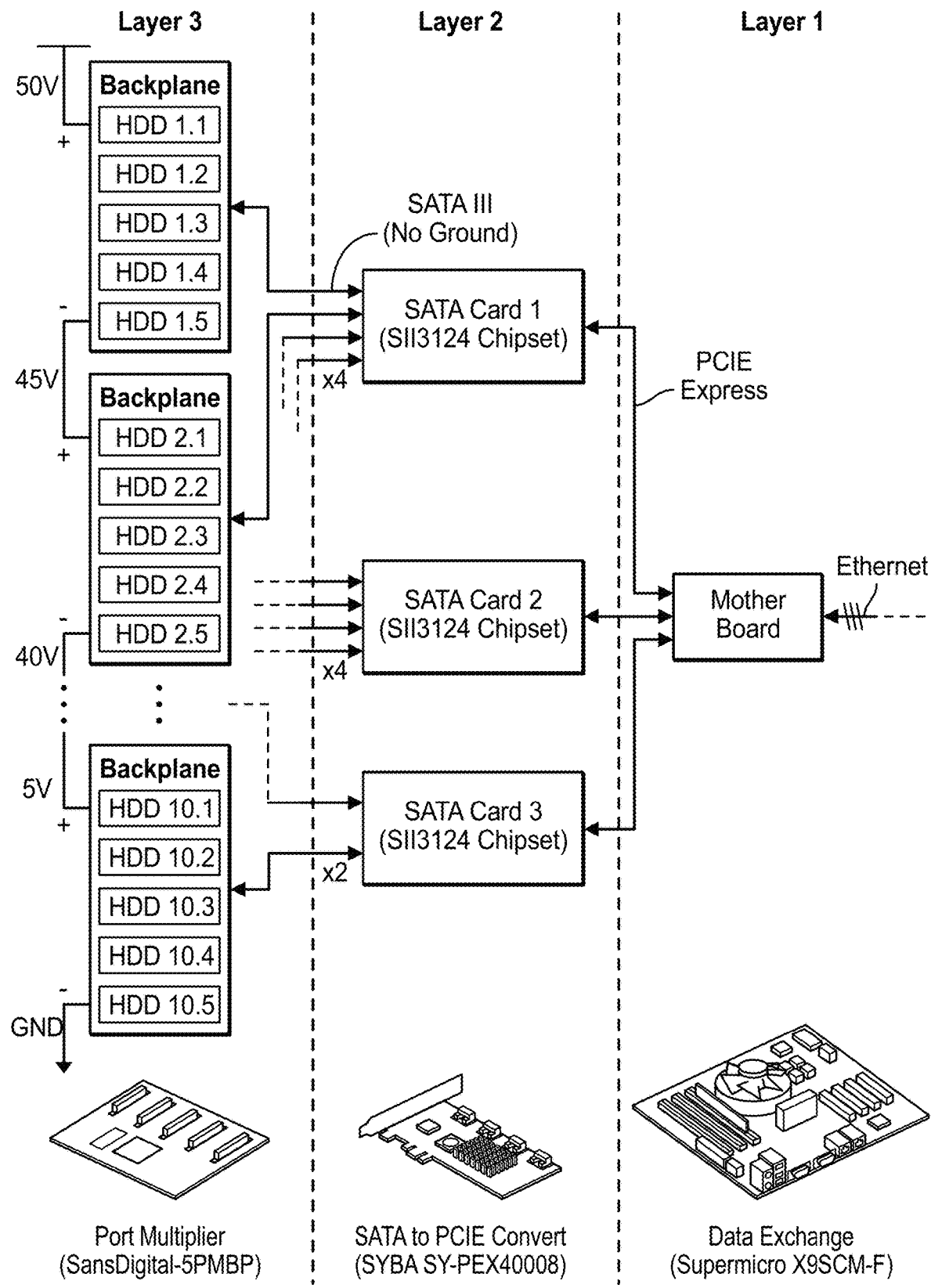
FIG. 20 depicts a data link infrastructure of a series-stacked HDD test bench according to an embodiment of the present invention.

FIG. 19 shows the 50-HDD 12 TB storage server testbench. A linux based operating system (Ubuntu) is installed to test the full reading, writing, and hot-swapping capability of the HDD array. A DC voltage source (QPX-600D) is applied to mimic the 50 V DC bus on rack. FIG. 20 shows the detailed implementation of the high-speed data transfer infrastructure across series-stacked voltage domains. The communication infrastructure includes three layers. The 50 HDDs are divided into 10 groups, and each group contains five HDDs in parallel on a SATA III port multiplier (i.e. backplane). Ten backplanes in different voltage domains transfer data to the SATA extension card through differential signal with dc blocking capacitors. Actually, standard SATA/SAS protocol is based on differential signal. By removing the common ground wires and adding blocking capacitor to SATA/SAS differential signal links, the isolated signal transfer across voltage domains are achieved without major modification to standard protocols. Different SATA to PCIE extension cards are on the same voltage domain. They are directly connected to the motherboard through the PCIE Express slots. The 3-layer data link infrastructure is highly scalable, and it can be extended to support larger scale of HDD array with more series-stacked voltage domains. In applications where high data rate is needed, the isolated SATA transmission can also be replaced with optic fibers, which can offer higher communication bandwidth.

Figure 21:
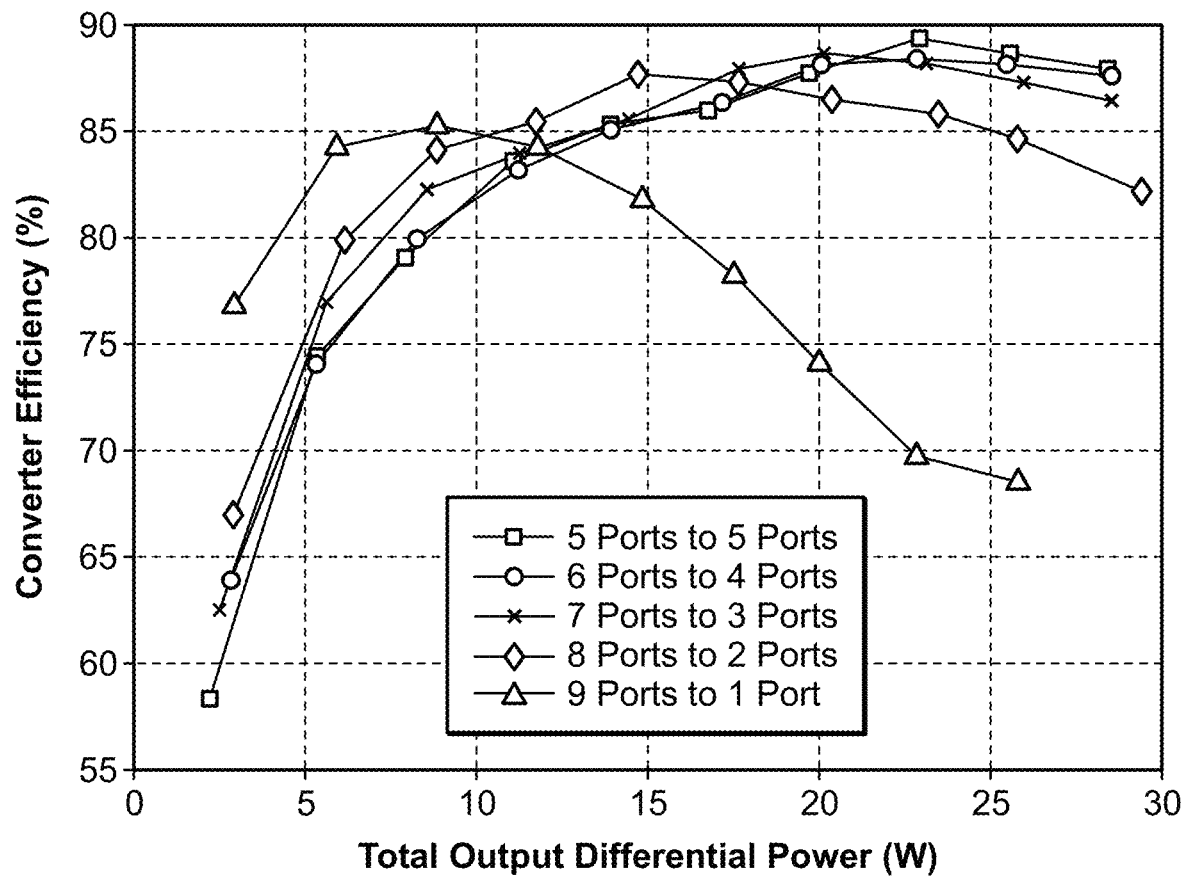
FIG. 21 depicts a graph of port to port power conversion efficiency according to an embodiment of the present invention.
Figure 22:
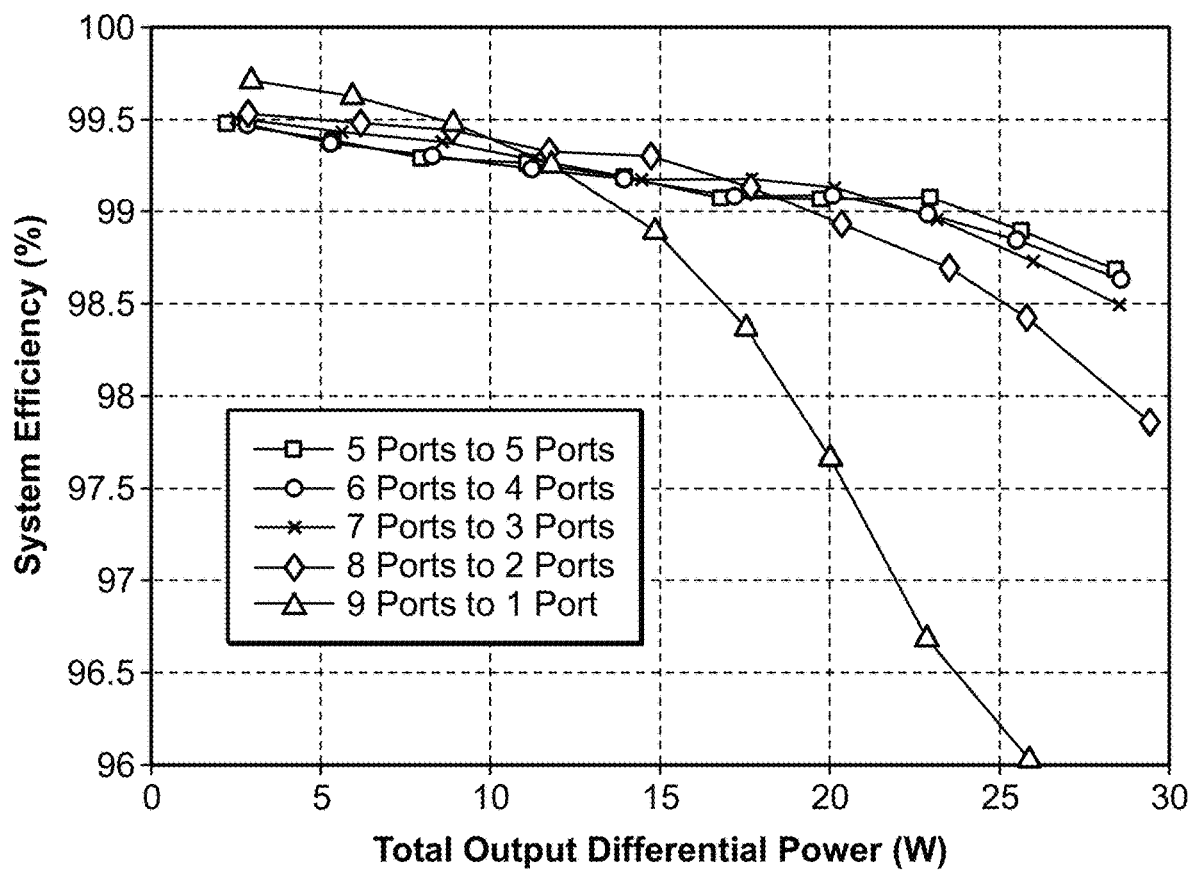
FIG. 22 depicts a graph a system power conversion efficiency according to an embodiment of the present invention.

In the experiment with heavily unbalanced loads, distributed phase-shift control was adopted to regulate the voltage for the proposed MAC-DPP architecture. In this case, multiple ports are inputting or outputting the differential power at the same time. The MAC-DPP converter efficiency was defined as the total output differential power divided by the total input differential power, and the system efficiency of a MAC-DPP system was defined as the total power consumed by the load (e.g., HDDs), over the total power sourced from the DC bus. Both the converter efficiency and system efficiency were tested using ten electronic loads with 300 W total load power, and the overall output differential power varies from 0 W to 30 W. Since the HDDs on each voltage domain usually have similar power consumption, the tested data points will cover a majority of the operating conditions (20% power mismatch among different voltage domains) as well as the worst hot-swapping scenario (removing 30 W full load HDDs of an entire voltage domain). FIG. 21 shows the measured converter efficiency in different power transfer scenarios. The maximum port-to-port converter efficiency is about 90% when it is delivering 23 W differential power from 5 ports to 5 ports. The converter efficiency drops very fast when delivering power from 9 ports to 1 port because of the dramatically increased current conduction loss at one port. As indicated in FIG. 22, the MAC-DPP system can achieve 99.7% peak system efficiency when processing 7 W differential power, and the system efficiency maintains over 99% across a majority of the operation scenarios when the power mismatch among different voltage domains is within 10% (i.e. 15 W total differential power). Compared to existing solutions, the disclosed MAC-DPP converter can realize extremely high system power efficiency with very small converter size, and can significantly improve the computing power per unit volume in data center.

Figure 23:
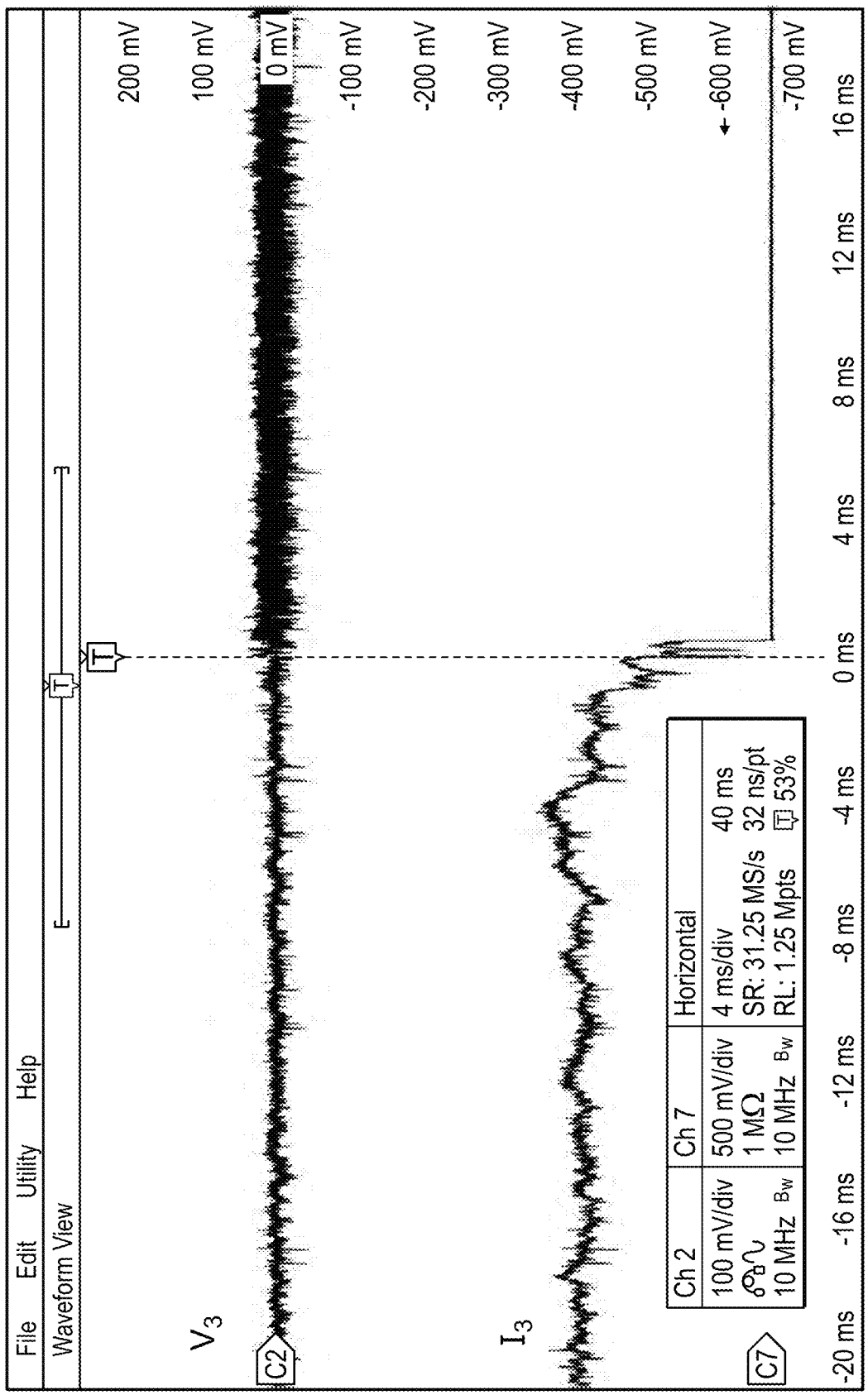
FIG. 23 depicts a graph of transient response when hot-swapping an entire voltage domain of the HDD server test bench according to an embodiment of the present invention.

Voltage stability is of great importance for HDD's robust operation. A typical requirement for a 2.5" HDD is to regulate the voltage within 5% of the nominal value (5 V). FIG. 23 shows the port voltage and load current waveforms at the $3^{rd}$ port during a hot-swapping test on the HDD server testbench. A 2.5 mF output capacitor was included at each port. In the test, all five HDDs of the same voltage domain were removed abruptly when they were performing reading/writing tasks. The voltage transition during the hot-swapping was very smooth. After hot-swapping, since the MAC-DPP converter processes more differential power, the voltage ripple at port #3 increases (still within the allowed range for 2.5" HDDs).

Figure 24:
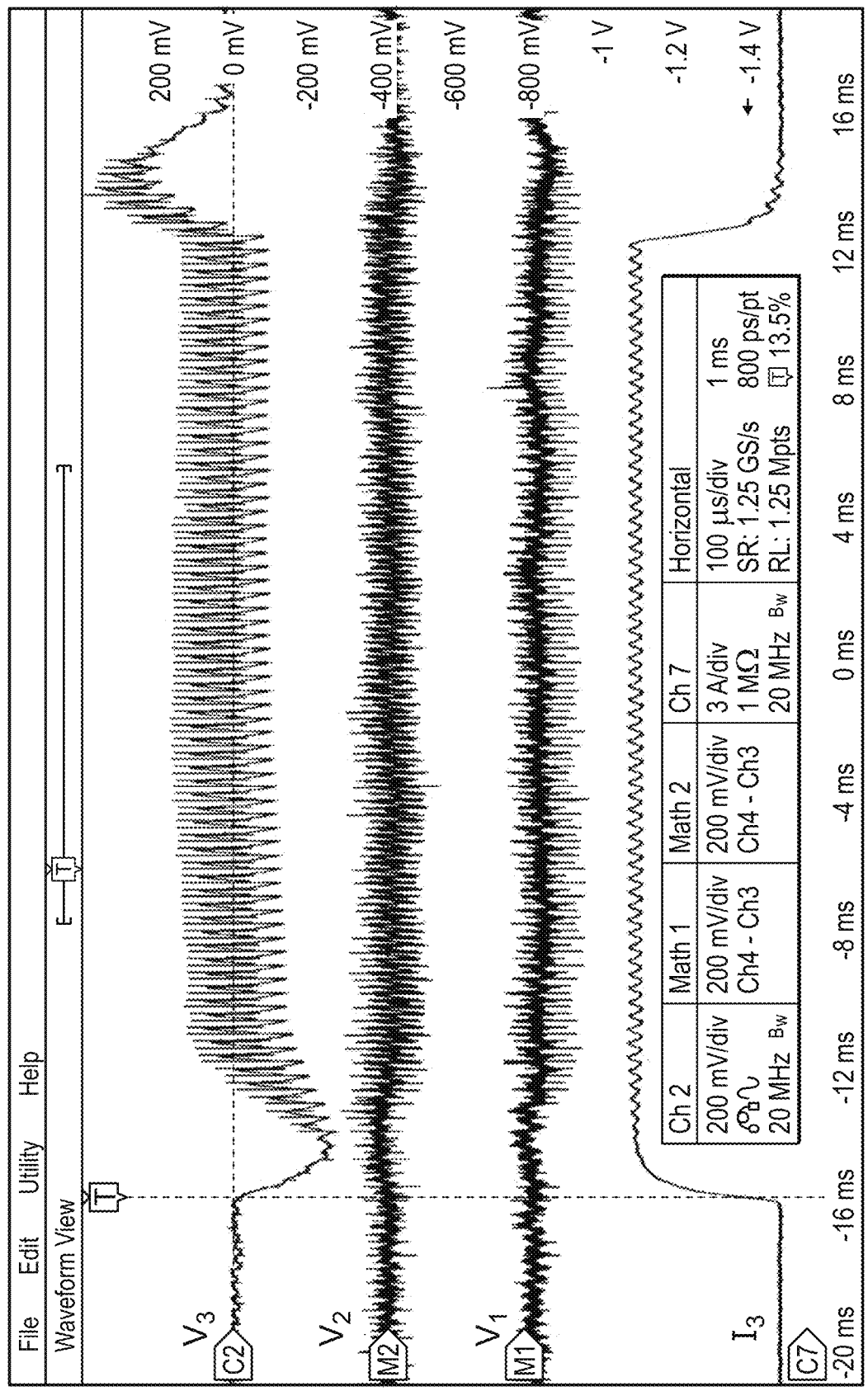
FIG. 24 depicts a graph of transient response of a 30 W step load change at a port according to an embodiment of the present invention.

Since the MAC-DPP converter is designed to support 30 W peak power at each voltage domain, the transient response of the prototype was tested in an extreme case where 30 W full load was plugged in and removed at one port (i.e. worst hot-swapping scenario). In the test, each series-stacked voltage domain was connected to an electronic load. All the load currents kept at 1 A except for the current at port #3, which jumped up from 1 A to 7 A and then returned back to 1 A, as shown in FIG. 24. With the distributed phase-shift control strategy, the MAC-DPP converter can successfully limit the overshoot of the "hot-swapping" port voltage to 250 mV with only 100 µs settling time, fulfilling the voltage requirements for typical 2.5" HDDs. FIG. 24 also indicates that the interactions between ports will lead to voltage fluctuation on the other ports (e.g., $V_1$ & $V_2$), but they can be effectively controlled by the proposed control strategy as well. These hot-swapping experiments verified that the designed MAC-DPP prototype is capable of maintaining smooth operation of a 300 W data storage server against the worst-case hot-swapping scenarios.

Figure 25A:
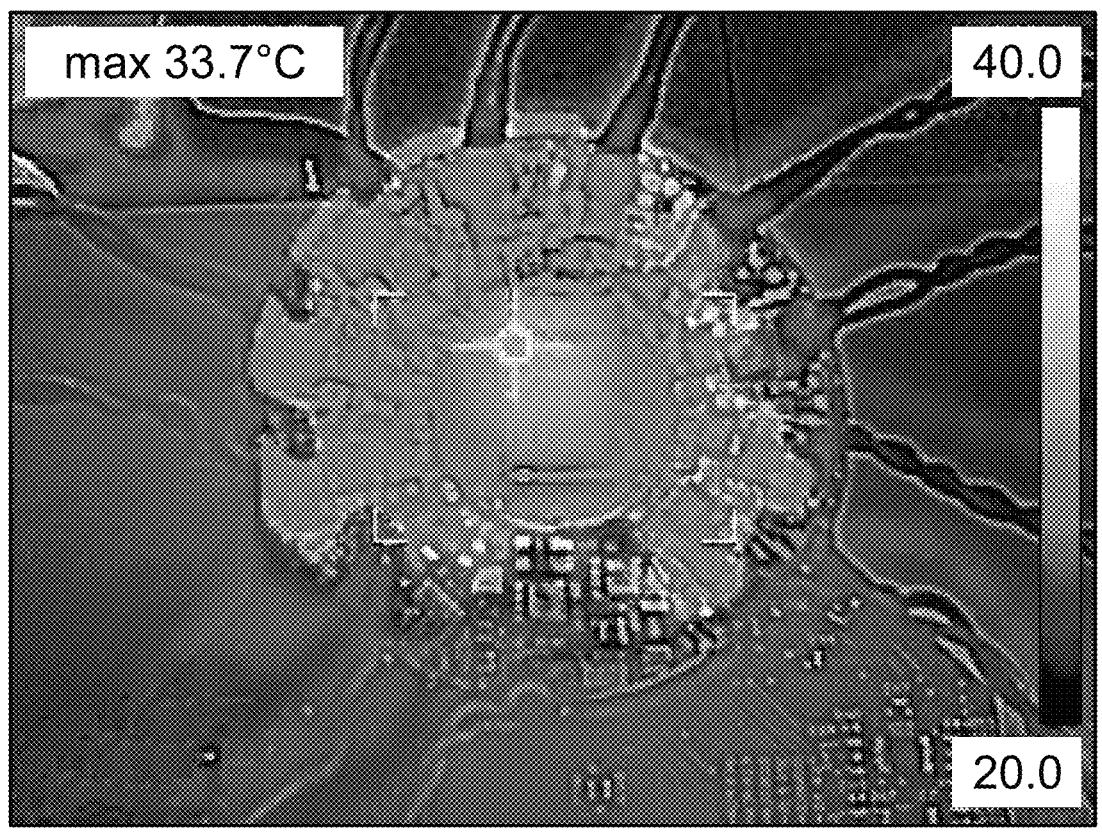
FIG. 25(*a*) depicts a thermal image of the MAC-DPP prototype in a balanced load according to an embodiment of the present invention.
Figure 25B:
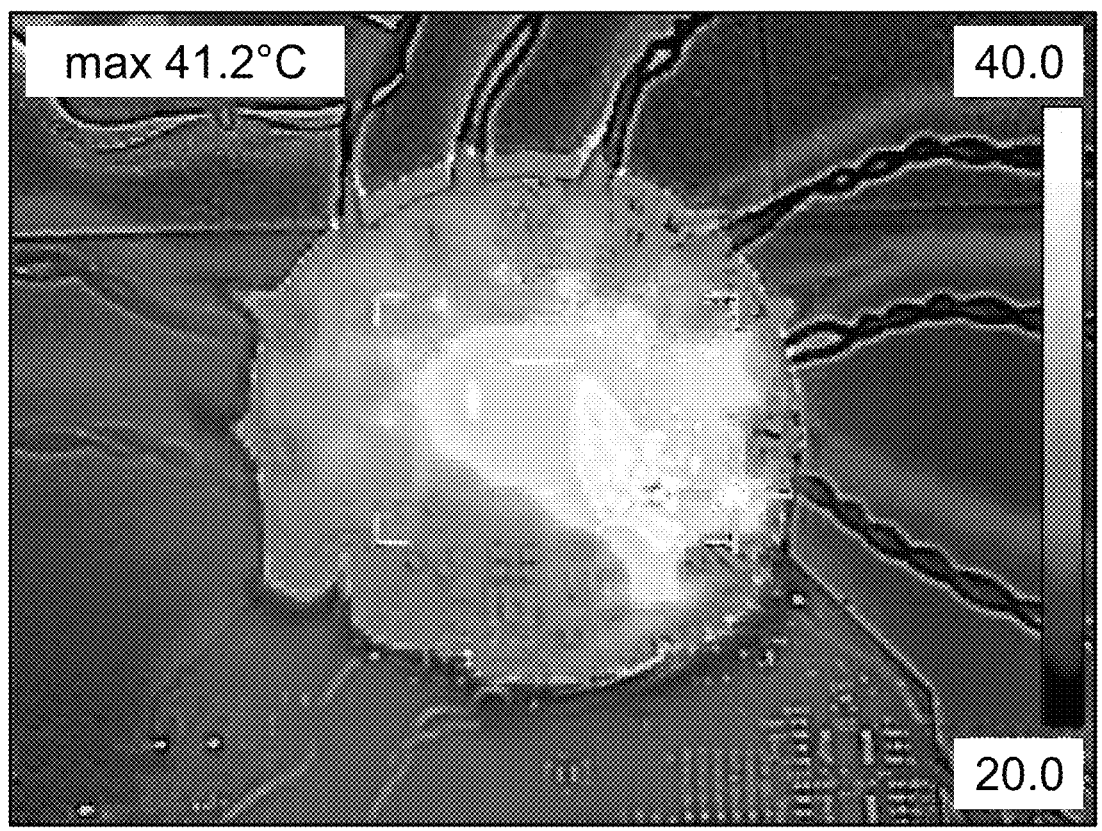

FIGS. 25(a)-(b) show the thermal images of the MAC-DPP converter operating at different operating conditions on the HDD server testbench. Both the thermal images are taken under the natural air cooling of 25° C. ambient temperature without the air flow. If all the HDDs are doing similar reading/writing tasks, very little differential power needs to be processed by the MAC-DPP converter. Almost no temperature rise was observed. When all five HDDs of an entire voltage domain are removed, the hot-swapping port will deliver about 10 W differential power to the other 9 ports. Since the current at the hot-swapping port is roughly the summation of currents at the other 9 ports, its conduction loss is significantly higher than others. Therefore, a significant temperature rise was observed at one port (port #1 in this case) as shown in FIG. 25(b).

As such, disclosed herein is a MAC-DPP architecture for series-stacked storage servers in data centers. The MAC-DPP architecture offers a low component count, a single "DC-AC-DC" conversion stage, and almost the smallest magnetic size. The multi-winding transformer is implemented as a PCB transformer. Hybrid time-sharing control and phase-shift control is adopted in the MAC-DPP design for the HDD storage systems. A 300 W 10-port MAC-DPP prototype is designed and tested in a 50-HDD data storage server testbench. The HDD server can maintain normal reading/writing operation when hot-swapping the HDDs of an entire voltage domain. The MAC-DPP prototype was also tested in an extreme case where 30 W full load was hot-swapped at one port. The transient response of the MAC-DPP system meets the requirements of typical HDDs, and the system efficiency for a 300 W storage server can remain above 99% for a majority of operating conditions. The MAC-DPP architecture is a very promising solution for powering highly modular energy systems, such as series-stacked HDD arrays, battery cells, and PV modules.

Multiport-Wireless-Coupled (MWC) Battery Balancer with High Frequency Online Electrochemical Impedance Spectroscopy Electrochemical energy storage has become increasingly important as the rapid growing of electric vehicles and renewable energy systems. Individual battery cells are usually connected in series into battery packs which can offer high output voltage and high power capacity. After repeated charging and discharging, the battery cells inevitably have different state of charge (SOC) and state of health (SOH). Charge imbalance eventually leads to shorter life-cycle and reduced total battery capacity. Battery balancers play important roles in monitoring battery conditions and extending the battery lifetime. In order to perform effective battery balancing and energy management, it is beneficial to identify the SOC and SOH for each battery cell. The SOC helps to identify the cells needed to be charged or discharged for the battery balancer. The SOH helps to predict the remaining useful life of the cells.

Figure 26:
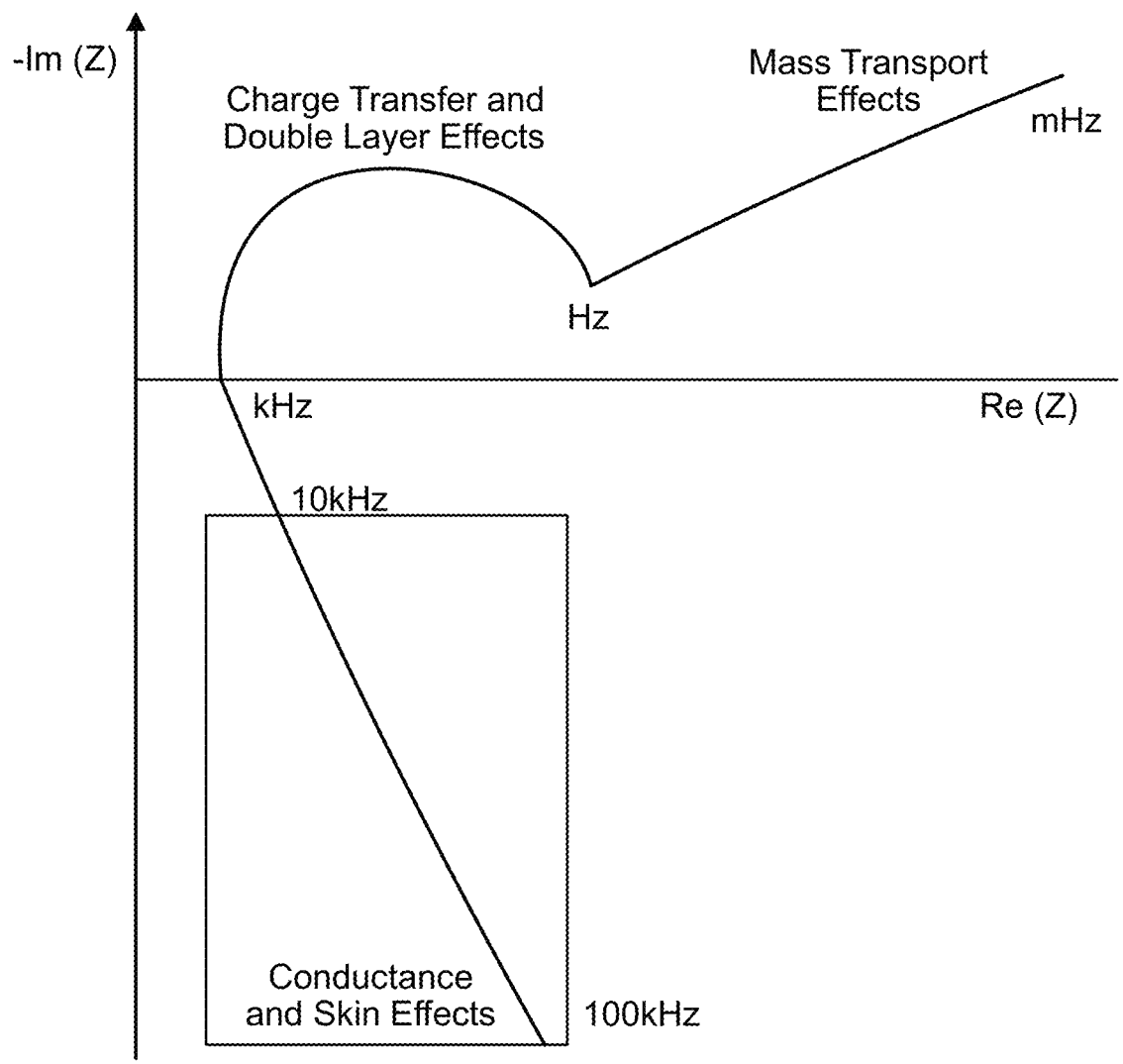
FIG. 26 depicts a graph of an EIS Nyquist plot of an electrochemical battery cell according to an embodiment of the present invention.

Impedance based estimation methods, e.g., electrochemical impedance spectroscopy (EIS), are promising approaches to infer the battery SOC and SOH. It is known that some of the battery balancers work as a voltage equalizer by measuring the battery voltage to estimate the SOC and balance the batteries. However, the tiny voltage differences in the discharge period make it difficult to measure an accurate battery voltage for SOC estimation. The different loading conditions also highly affect the battery voltages, limiting the accuracy of the SOC estimation. Electrochemical impedance spectroscopy (EIS) is a widely-used impedance based estimation method to analyze the battery internal processes from the external measurements, i.e., the battery voltage and current. By using EIS, the various electrochemical phenomena of battery can be observed and analyzed in the frequency domain. As shown in FIG. 26, the mass-transport effects can be observed at a low frequency (mHz-Hz), the charge transfer in the electrochemical double layer can be observed in a frequency range from Hz to kHz (medium frequency), and the conductance effects (physical capacitance and inductance) can be observed in the kHz and higher frequencies. In cases of small batteries, e.g., the lithium batteries, much higher frequencies (10-100 kHz) are necessary to show the conductance characteristic.

Figure 27A:
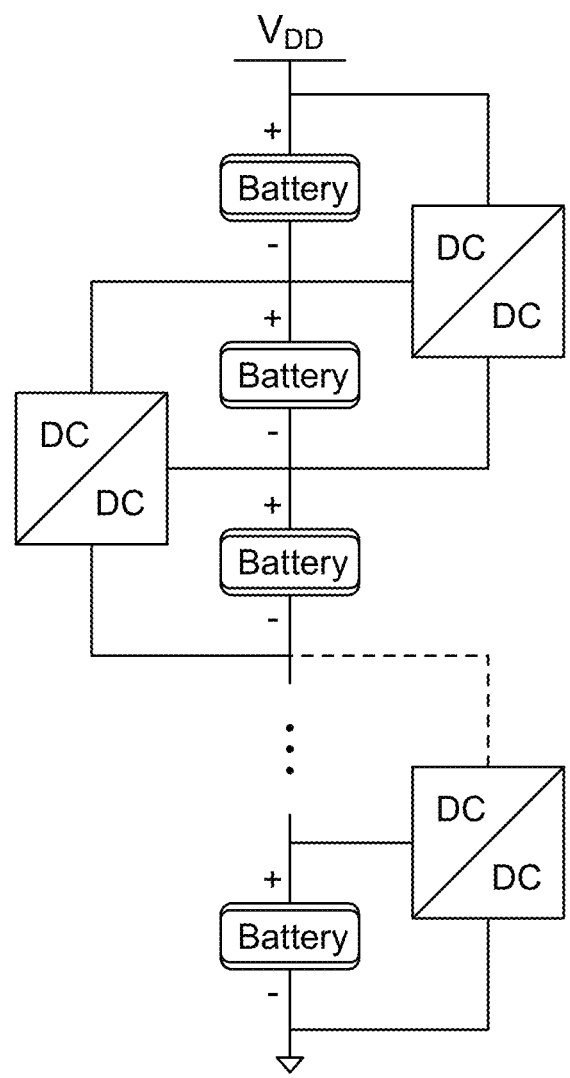
FIG. 27(*a*) depicts a load to load battery balancer topology.
Figure 27B:
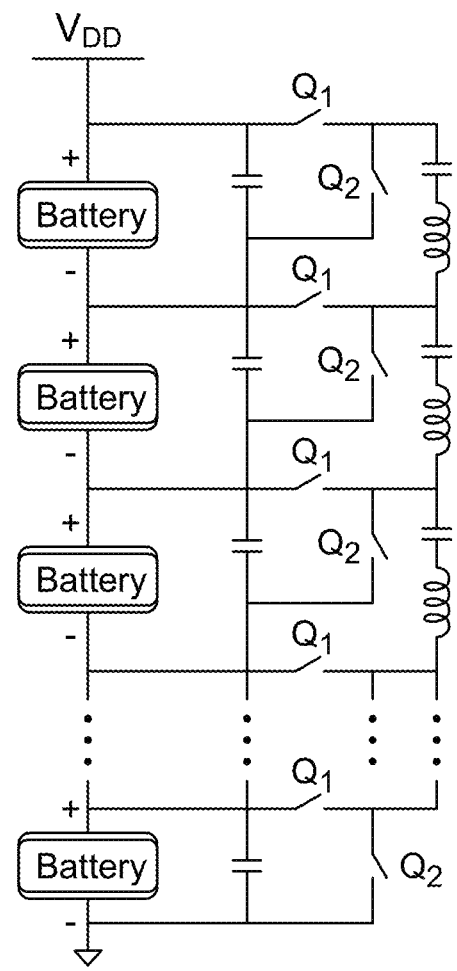
Figure 27C:
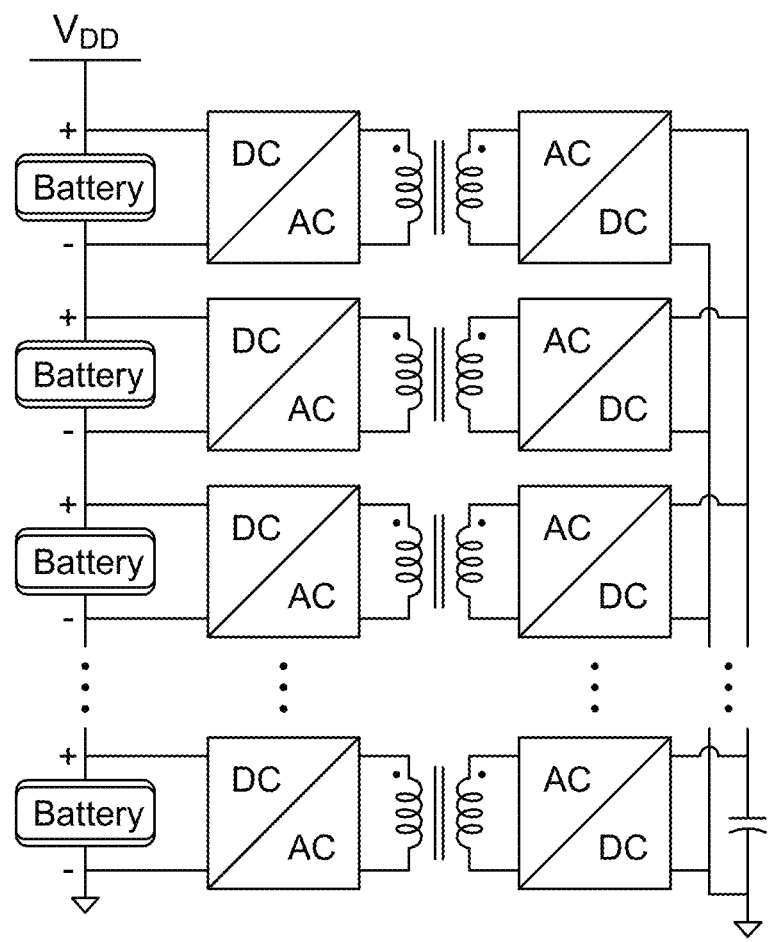

Existing active battery balancers are usually implemented as multi-port DC-link systems which utilizes DC-link capacitors to transfer energy (FIGS. 27(a)-(c)). In these balancers, the power flow between two battery cells needs to be processed by more than one "DC-AC-DC" power conversion stage. Studies on multi-port AC-coupled converters exist, which can process the differential power of the two battery cells only through one dc-dc conversion stage, but not for frequencies above MHz. It is known that operating in the MHz range can help to eliminate the magnetic core, reduce the coil size, and improve the power density, but the electromagnetic field analysis and power flow control become challenging. Without a magnetic core, the coupling coefficient of the coils in the MHz multiport transformer is usually much lower than that of a typical transformer. The transformer works more like the inductive coupling coils in wireless power transfer, namely the multiport wireless-coupled (MWC) transformer.

Figure 27D:
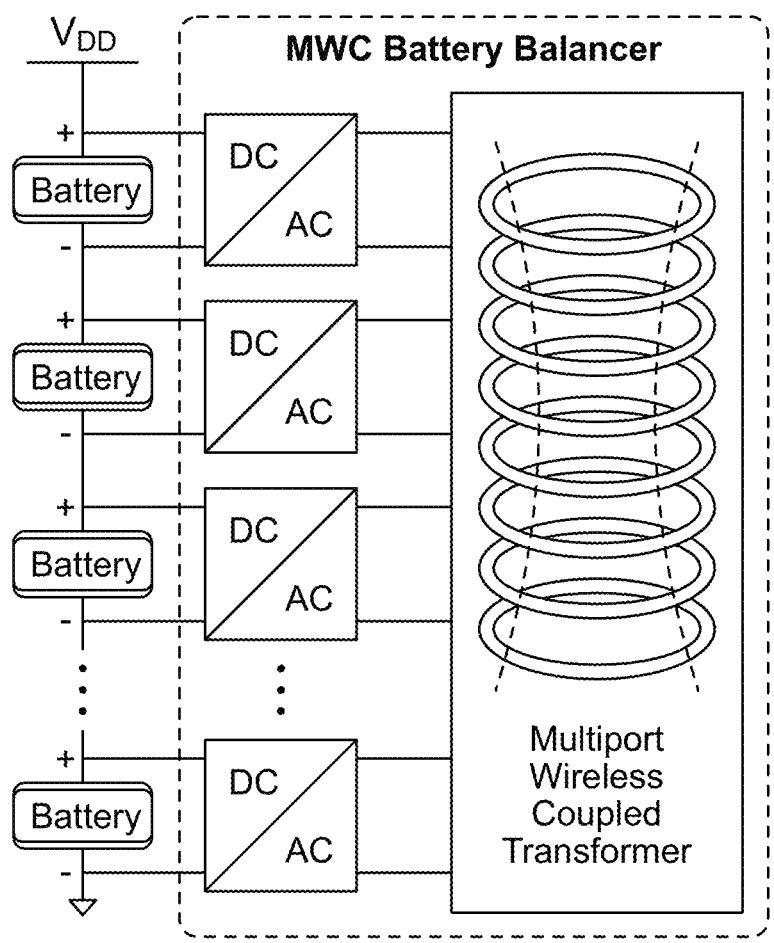

Multi-MHz operation offers smaller size and the capability of performing high frequency EIS. There are opportunities to design a multi-MHz battery balancer to support the EIS measurement from low frequencies (mHz) to high frequencies (100 kHz or higher). Disclosed herein is a 13.56 MHz multiport wireless-coupled (MWC) battery balancer with the capability of performing EIS up to 500 kHz. The MHz MWC balancer architecture includes multiple high frequency current mode Class-D inverters and a MWC transformer with a single "DC-AC-DC" conversion stage between two arbitrary ports, as shown in FIG. 27(d). By phase shifting the DC-AC inverters, a small-signal perturbation is created to conduct the battery EIS measurement without using extra perturbation circuitry. The multi-MHz operating frequency helps to achieve the 500 kHz EIS frequency (higher than many state-of-the-art EIS machines). The MHz frequency also helps to eliminate the magnetic core and improve the power density. A 13.56 MHz MWC battery balancer with a four-port MWC transformer is built and tested to verify the disclosed approach.

FIGS. 27(a)-(c) show the block diagrams of a few battery balancer designs in existing works. The cell-to-cell balancing is achieved by processing the differential power among batteries. The battery balancers are usually implemented as multiport DC-link systems which utilizes DC-link capacitors to transfer energy. The power flow between two battery cells needs to be processed by more than one "DC-AC-DC" power conversion stages. The disclosed multiport ac-coupled battery balancer, as shown in FIG. 27(d), can process the differential power between two arbitrary ports through a single "DC-AC-DC" power conversion stage, which helps to improve the efficiency and reduce the component count of the battery balancer.

Compared to other dc-coupled balancer architectures, the AC-coupled battery balancer architecture can provide lower conversion stress, smaller magnetic size, and lower component count. By increasing the frequency to multi-MHz, the magnetic core can be eliminated or be replaced by a very thin magnetic sheet, which will further reduce the transformer size and improve the converter power density. Furthermore, by eliminating the solid magnetic-core, the MHz multiport battery balancer can be implemented on a flexible printed circuit board, for instance Kapton PCB as a nonlimiting example. Because of the non-ideal coupling coefficient, the transformer works more like a multi-winding inductive coupling coil in wireless power transfer applications.

The MWC architecture shown in FIG. 27(d) can be interpreted as a multi-input-multi-output (MIMO) system connecting many sources and loads together through a single wireless-coupled linkage. In battery management application, the DC-AC converters function as current sources, which drive the multi-port wireless-coupled transformer with sinusoidal current at the operation frequency. The power flow in the MWC transformer can be controlled through phase modulation.

Figure 28:
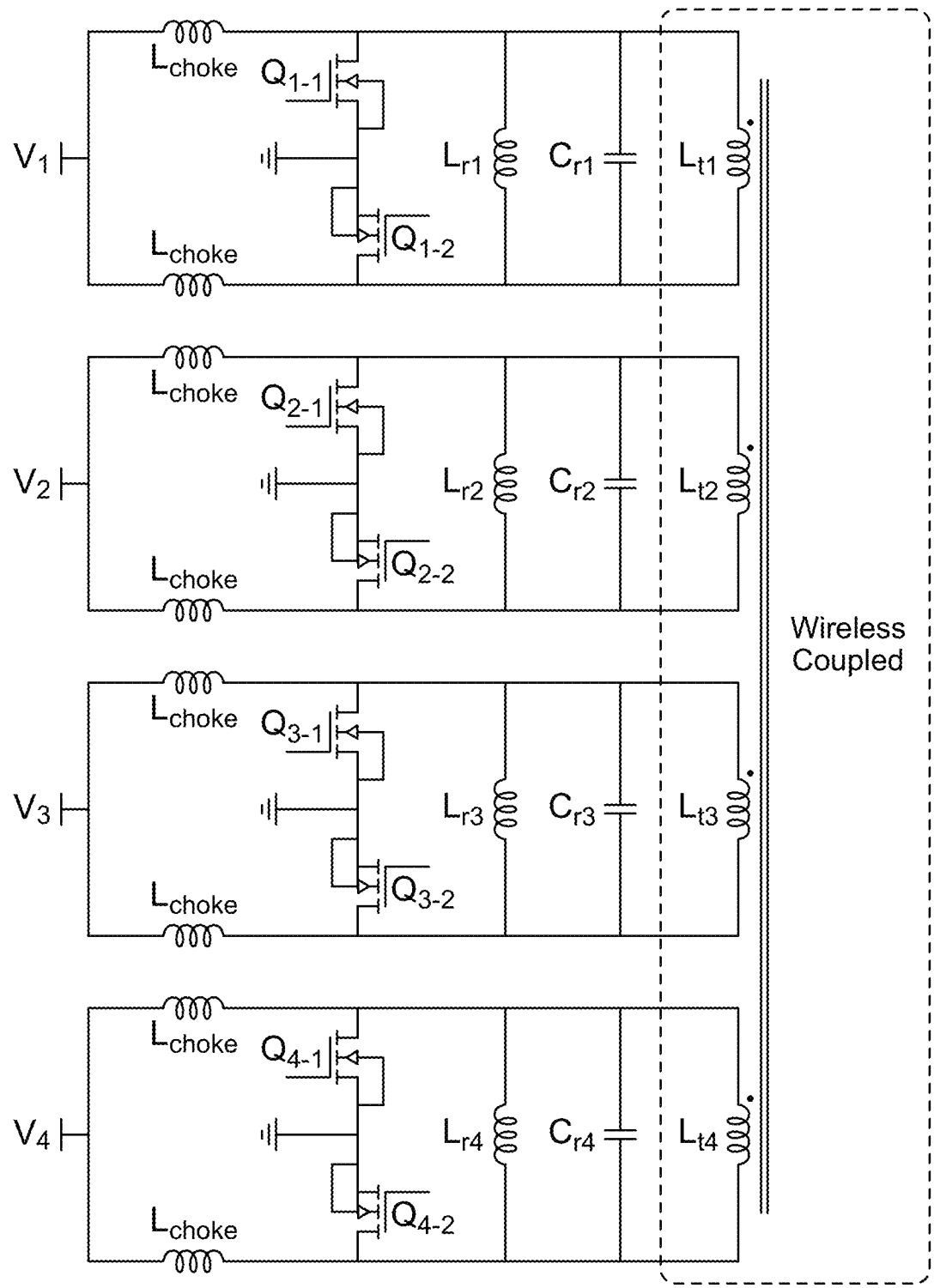
FIG. 28 depicts an example implementation of a MWC battery balancer according to an embodiment of the present invention.
Figure 29A:
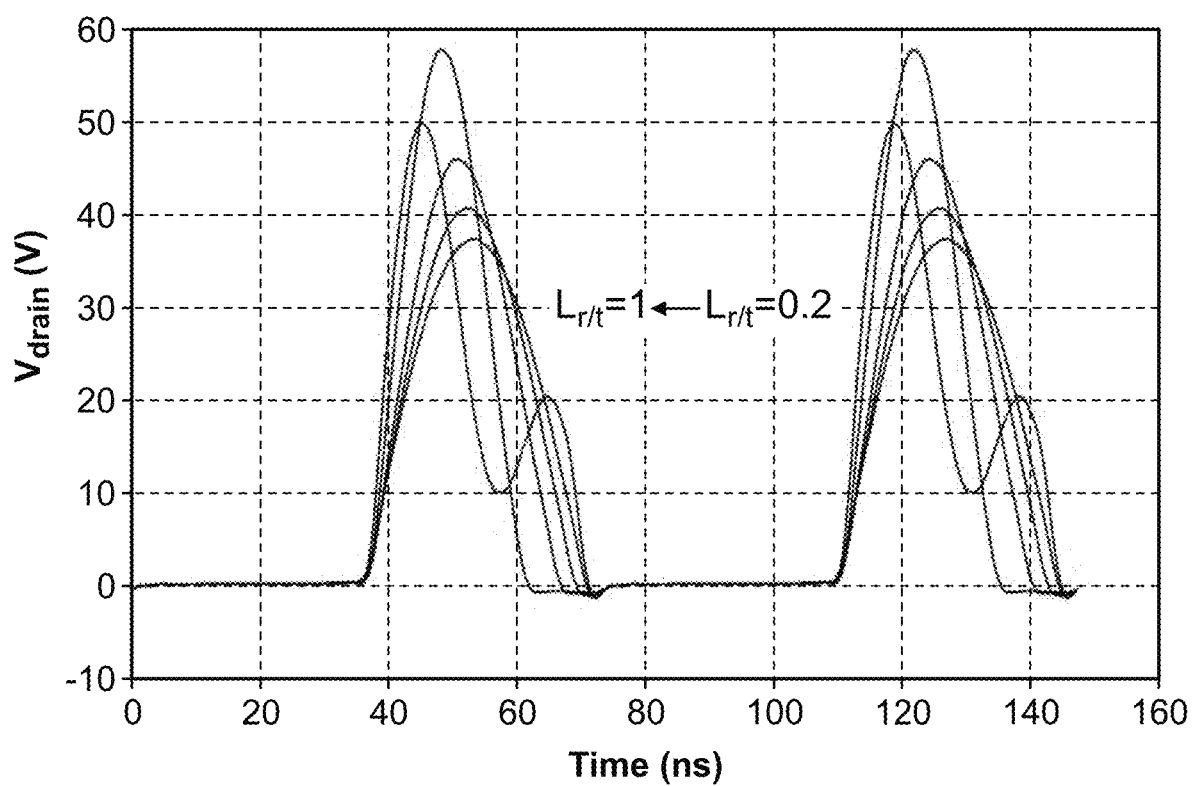
FIG. 29(*a*) depicts simulated waveforms of switch drain-source voltages of CM Class-D inverters according to an embodiment of the present invention.
Figure 29B:
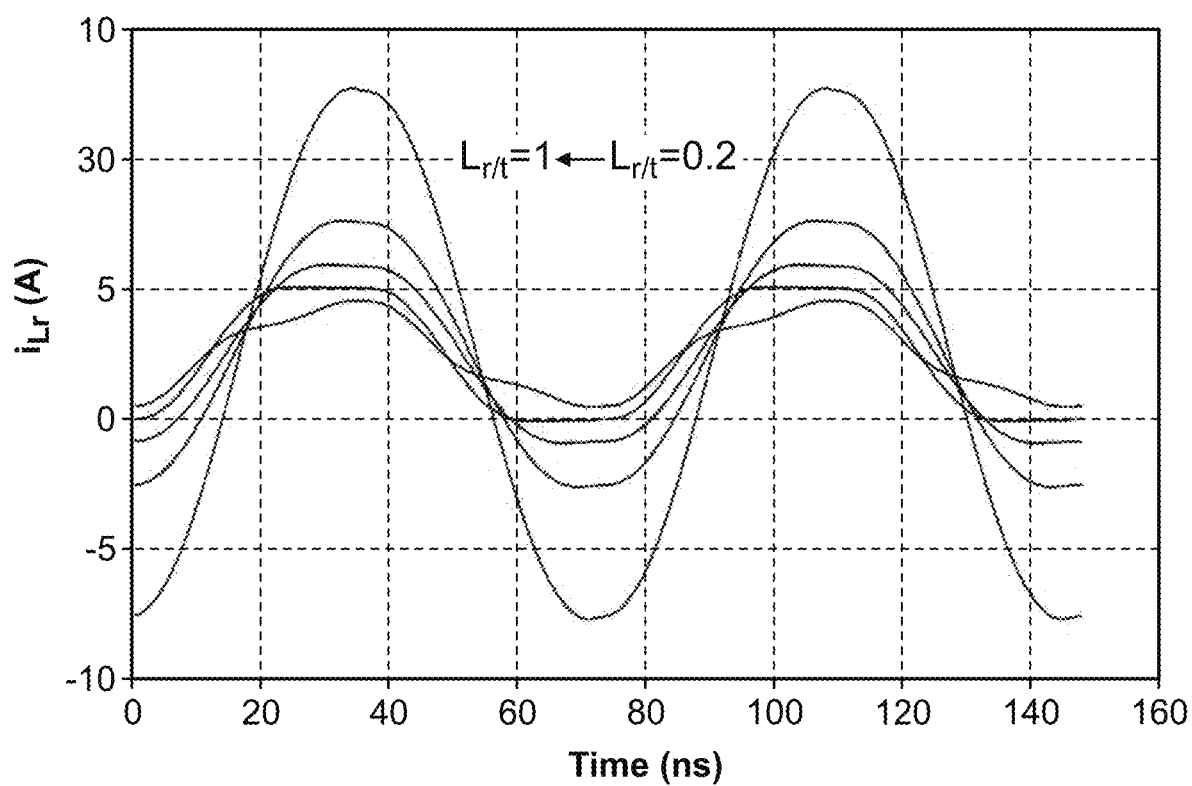

FIG. 28 shows an example topology of the MHz MWC battery balancer. Four active current-mode Class-D inverters are wirelessly coupled through a high frequency MWC transformer. Push-pull current-mode (CM) Class D inverters are adopted for the DC-AC inverters due to their ground-referenced switches. Other high frequency or very high frequency inverter topologies, such as but not limited to Class-E, Class-EF, Class-Φ, are also applicable. In a CM Class-D inverter, the quality factor of the LC parallel resonant tank should be carefully designed to achieve low voltage/current harmonics and small circulating current. FIGS. 29(a)-(b) show the simulated waveforms of the CM Class D inverter under a varying resonance tank inductance/capacitance. Here $L_{r/t}$ is the ratio between the resonant inductance $L_r$ and the transformer coil inductance Lt, and it is swept from 0.2 to 1 in the simulation. The coupling coefficients between the four coils are assumed to be identical (k=0.9) to simplify the analysis here. It can be seen that the higher $L_{r/t}$ (the higher $L_r$), the higher voltage/current distortion because of the lower quality factors of the resonant tank, and the lower $L_{r/t}$, the higher circulating current on $L_r$ because of the lower impedance of the resonant tank. Based on the simulated waveforms, the inductance ratio $L_{r/t}$ can be chosen between 0.2 and 1 to avoid the high voltage/current distortion and high circulating current. And the capacitors $C_{r1}$-$C_{r4}$ are designed to resonate with inductors $L_{r1}$-$L_{r4}$ at the operation frequency.

Figures 30, 31:
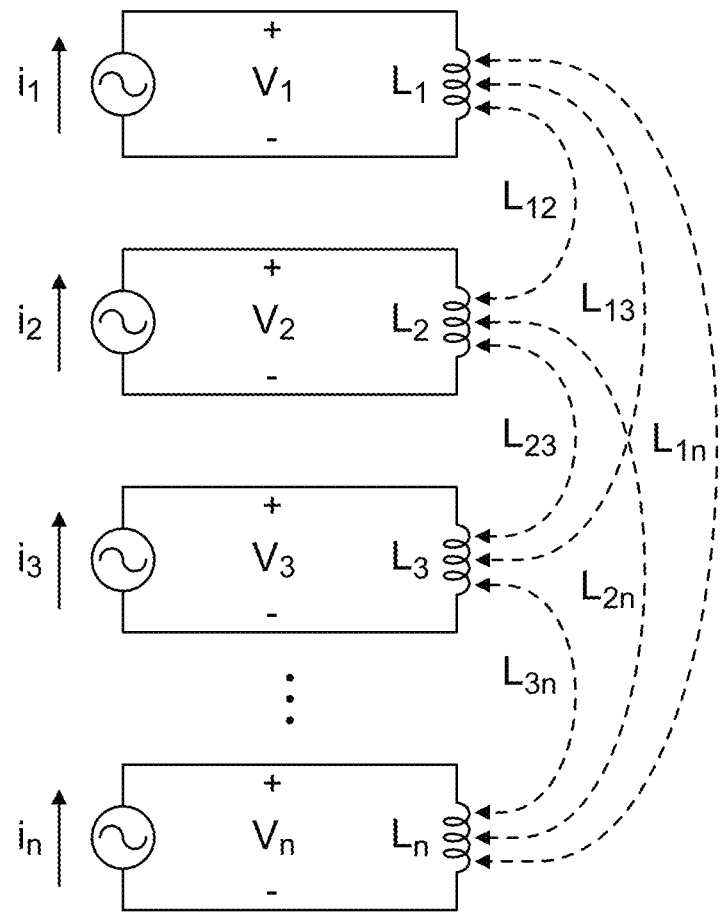
FIG. 30 depicts a lumped circuit model of a MWC transformer according to an embodiment of the present invention.
FIG. 31 depicts a table of required mutual inductance for a 10 W rated power according to an embodiment of the present invention.

It is known that an n-port cantilever model would capture the full behavior of an n-port multi-winding transformer by representing a n×n impedance matrix. However, due to its topological complexity, the full-order cantilever model is not suitable to modeling and control of the MIMO power flow in a MWC architecture. An alternative way to model the n-port MWC transformer is to simplify the cantilever model into an inductive coupled model, where all ports are driven by sinusoidal current source inverters. FIG. 30 shows the model of a MWC transformer. The coupling between any two arbitrary coils is described by their mutual inductance. Here $L_i$ is the self-inductance of the $i^{th}$ coil and $L_{i,j}$ is the mutual inductance between the $i^{th}$ and $j^{th}$ coils. Based on this cantilever model, the impedance matrix of the MWC transformer can be expressed as follows:

$$\begin{bmatrix} V_1 \\ V_2 \\ \vdots \\ V_n \end{bmatrix} = \begin{bmatrix} j\omega L_{1,1} & j\omega L_{1,2} & \cdots & j\omega L_{1,n} \\ j\omega L_{2,1} & j\omega L_{2,2} & \cdots & j\omega L_{2,n} \\ \vdots & \vdots & \cdots & \vdots \\ j\omega L_{n,1} & j\omega L_{n,2} & \cdots & j\omega L_{n,n} \end{bmatrix} \begin{bmatrix} i_1 \\ i_2 \\ \vdots \\ i_n \end{bmatrix} \quad (7)$$

Note $L_{i,j}$ equals to $L_{j,i}$ in the matrix. Based on the inductive coupled model in FIG. 30 and the impedance matrix in Equation (7), the active power feeding into port k is:

$$P_k = V_k \times i^*_k = \frac{1}{2} \Sigma_{q=1, q \neq k}^n \omega_{k,q} I_k I_q \sin \theta_{qk} \quad (8)$$

Here $i^*_k$ is the conjugate current of $i_k$. $I_k$ and $I_q$ are the magnitudes of the currents at port k and q, respectively. $\theta_{qk}$ is the phase difference between the currents of port k and q. Equation (8) indicates that the multi-way bidirectional power flow in the multiport wireless-coupled transformer can be controlled by modulating the magnitudes and phases of all ports.

As mentioned above, the coupling coefficient of the MHz MWC transformer is usually much lower than that of a typical transformer, which affects the efficiency and power transfer capability of the battery balancer. According to Equation (8), the power flow at a specific port k is determined by the mutual inductance between two arbitrary ports, the current amplitudes of each port, and the current phase differences between port k and all other ports. Therefore, the mutual inductance of the MWC transformer should be large enough to meet the required power transfer capability of the battery balancer. For example, in a four-port MWC battery balancer design, the expected power flow from one Port (e.g., Port #1) to the other Port (e.g., Port #2) is about 10 W (PO, and Port #3 and Port #4 are open circuited to emulate the working scenario when these ports were not used. The required mutual inductance between Port #1 and Port #2 ($L_{12}$) can be calculated by using Equation (8), as shown in the table in FIG. 31. Here the input and output currents of the Port #1 and Port #2, $I_1$ and $I_2$, are 1 A, and the phase difference $L_{12}$ is 90°, respectively. It can be seen that for delivering 10 W from Port #1 to Port #2 the mutual inductance $L_{12}$ should be no less than 230 nH.

Figures 32, 33:
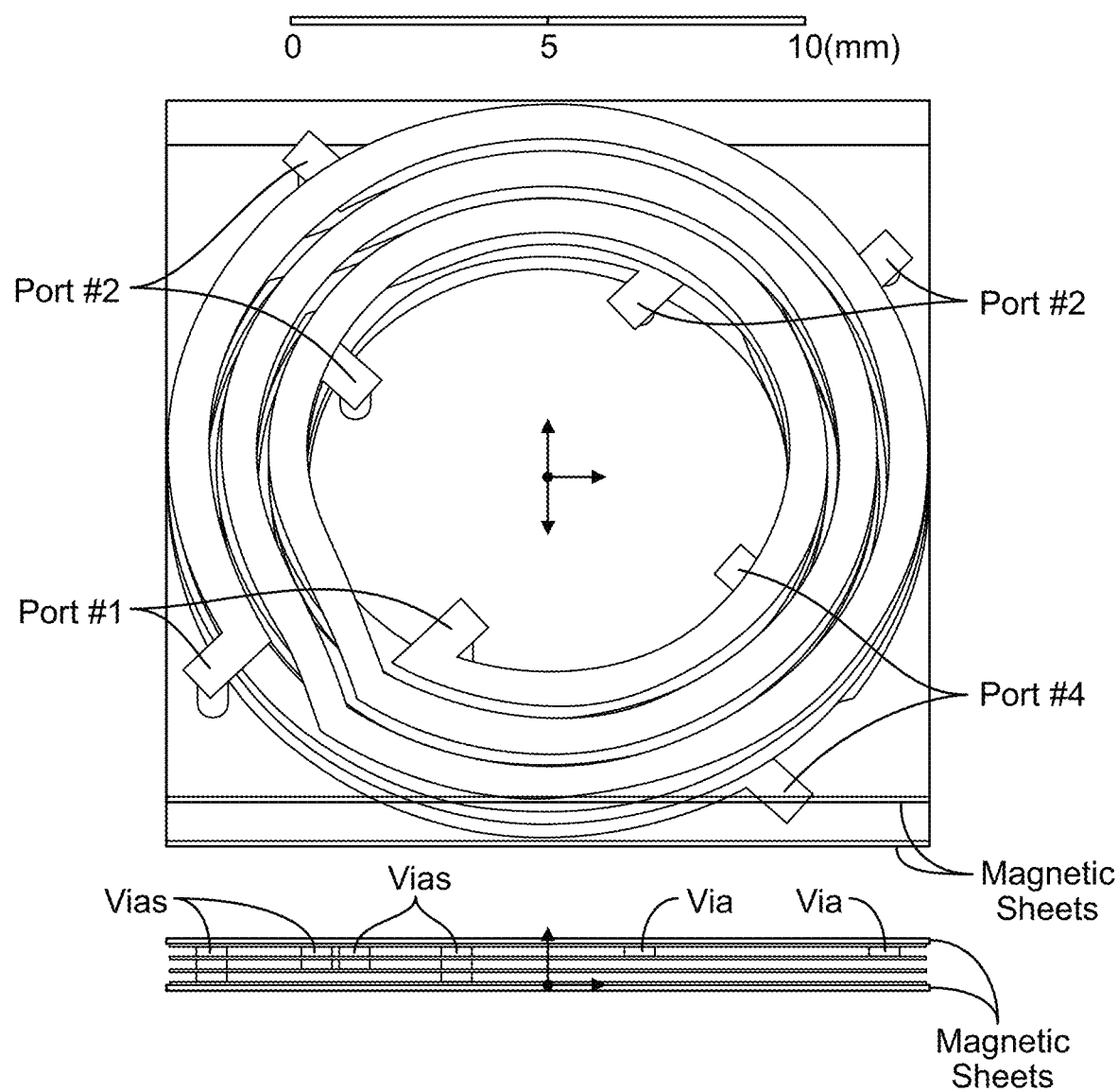
FIG. 32 depicts a 3D finite element model of an example four port 13.56 MHz MWC transformer according to an embodiment of the present invention.
FIG. 33 depicts a table of parameters of the four port MWC transformer according to an embodiment of the present invention.

Therefore, the MWC transformer should be carefully designed to achieve the required mutual inductance and the optimized coil ESR at the operation frequency, e.g., 13.56 MHz. FIG. 32 shows a finite element model of an example four-port MWC transformer with a 15 mm outer diameter. It includes four coils, eight vias, and two magnetic sheets attached on top and bottom of the coil stack. The transformer can be implemented on flexible Kapton printed circuit board. To achieve the enough mutual inductance with a limited size (Outer diameter=15 mm), a magnetic sheet from TDK, i.e., IBF15-100DD125X125, is used to shield the electromagnetic field. The thickness of the magnetic sheet is 0.1 mm and its relative permeability is about 150 at 13.56 MHz. By designing the number of turns (n), the trace width (w), and the trace gap (g), the coil parameters of the transformer are selected as listed in the table in FIG. 33. A three-turn coil with the aforementioned magnetic sheets can meet the required mutual inductance in FIG. 31. Note higher coil turns may cause a decreasing quality factor of the transformer. The impedance matrix of the MWC transformer with and without the soft magnetic sheets, $Z_{cored}$ and $Z_{air}$ are listed in Equations (9) and (10), respectively. As expected, adding the soft magnetic sheets can significantly increase the inductance and coupling coefficient, and increase the mutual inductances between coils.

$$Z_{cored} = \begin{Bmatrix} 29.5j\Omega & 27.4j\Omega & 26.2j\Omega & 25.4j\Omega \\ 27.4j\Omega & 28.4j\Omega & 26.9j\Omega & 26.7j\Omega \\ 26.2j\Omega & 26.9j\Omega & 28.3j\Omega & 27.2j\Omega \\ 25.4j\Omega & 26.7j\Omega & 27.2j\Omega & 28.9j\Omega \end{Bmatrix} \quad (9)$$

$$Z_{air} = \begin{bmatrix} 12.5j\Omega & 10.9j\Omega & 9.92j\Omega & 9.11j\Omega \\ 10.9j\Omega & 12.3j\Omega & 10.9j\Omega & 9.92j\Omega \\ 9.92j\Omega & 10.9j\Omega & 12.3j\Omega & 10.9j\Omega \\ 9.11j\Omega & 9.92j\Omega & 10.9j\Omega & 12.3j\Omega \end{bmatrix} \quad (10)$$

FIG. 34 shows the simulated current distribution on the four coils of the MWC transformer. The current of each coil is evenly distributed on the surface of the coil trace. The current difference among different ports are caused by the different mutual inductances among coils.

Figure 35:
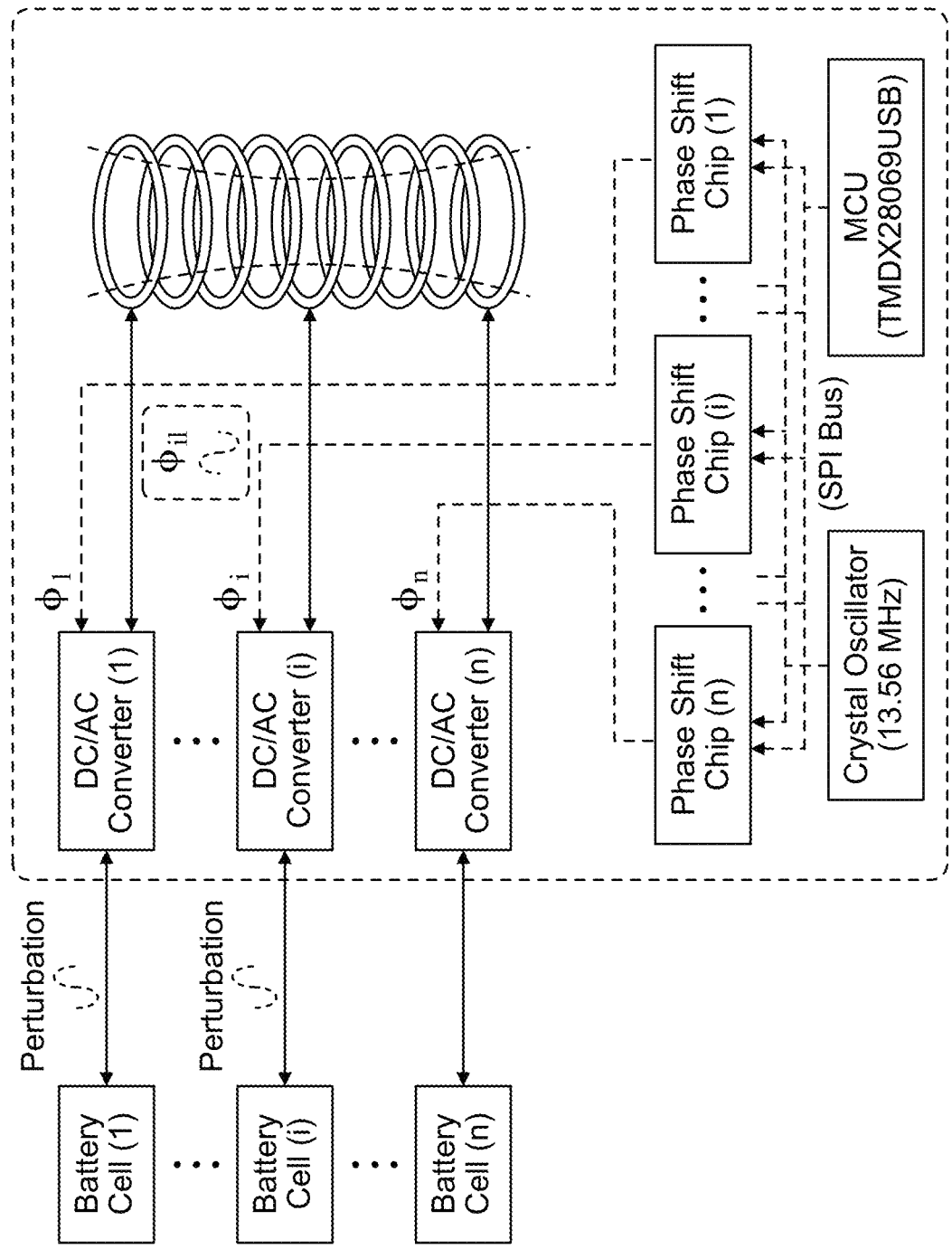
FIG. 35 depicts a block diagram of the EIS function units in the MWC battery balancer according to an embodiment of the present invention.

One of the unique features of the 13.56 MHz battery balancer system is that the proposed MWC circuit can be reused to perform online electrochemical impedance spectroscopy while perform battery balancing. By modulating the phase shift at a lower frequency, a sinusoidal perturbation can be generated to conduct the battery EIS measurement without using extra power circuitry. The operation principles of the perturbation generation in the disclosed battery balancer is shown in FIG. 35. For example, suppose battery cell #1 and battery cell #i are the targets for EIS measurement. By sweeping the difference between $\phi_1$ and $\phi_i$ properly, a sinusoidal current can be synthesized at a range of frequencies. A commercial phase delay chip "DS1023-25" is used to implement the phase-shift control in the balancer, though other chips may be used in other embodiments. A lookup table of the phase-shift values is built in a micro controller "TMDX28069USB" to generate the sinusoidal perturbation at different frequencies. The desired phase-shift values are sent to the multiple phase delay chips by the SPI bus.

A high frequency phase perturbation circuit for EIS measurement was also developed. The schematic of this circuit is shown in FIG. 36. The circuit includes a crystal oscillator, a buffer, a phase perturbation circuit, and a buffer/gate driver. The oscillator provides a 13.56 MHz signal and the buffer amplifies the signal to drive the phase perturbation circuit. A switch network comprising $R_p$, $C_p$, $C_p$, $Q_s$ enables the phase perturbation circuit to offer two delay options. By switching between the two delay options at a modulation frequency (e.g., 100 kHz), online EIS can be performed at the modulation frequency. The perturbation frequency is determined by the switching frequency of $Q_s$ and the duty cycle of the $Q_s$ control signal, which is to be implemented even at very high frequencies.

The table in FIG. 37 compares the disclosed MWC architecture against a few existing works for battery online EIS. Most of the existing works require an external power supply and additional instrumentation circuits to perform the online EIS. The bandwidth of the EIS is also usually limited to 10 kHz or lower. By contrast, the disclosed MHz MWC balancer can control the power flow between multiple arbitrary ports for battery balancing and generate the high frequency perturbation for EIS. The MHz frequency of the battery balancer helps to perform wide bandwidth EIS from a few mHz to 500 kHz.

FIG. 38 shows a prototype four-port wireless-coupled battery balancer with multiport phase-shift control and online electrochemical impedance spectroscopy. It includes four current-mode Class D inverters with a parallel resonant tank, a four-port MWC transformer with the flexible magnetic sheets attached on top and bottom layers, and the phase-shift control and gate drive circuits. The operation frequency is 13.56 MHz and the power rating of each port is 10 W. Eight GaN transistors, GS61004B, are used as the switches of the four CM Class D inverters. The battery balancer is built on a flexible printed circuit board with two flexible magnetic sheets on top and bottom. The entire balancer system is flexible. The phase-shift and driving circuits work for both the power flow control of the battery balancing and the perturbation generation of the battery EIS. The 13.56 MHz oscillator provides the reference signal for the perturbation generation circuit and the GaN driving circuit at the same time. The table in FIG. 39 lists the parameters of the prototype MWC battery balancer. The inductance and capacitance of the resonant tank in the CM Class-D inverters are determined based on the analysis presented above.

FIGS. 40(a)-(c) show three different battery cells that were used in the EIS measurement. FIG. 40(a) shows three 3.7 V lithium-ion battery cells series connected into a battery pack with 11.1 V battery voltage. FIG. 40(b) shows three lithium-polymer battery cells connected in series in a battery pack. FIG. 40(c) shows eight 1.2 V AA-NIMH cells connected in series to build a high voltage (9.6 V) AANIMH battery cell for the EIS testing.

Figure 41A:
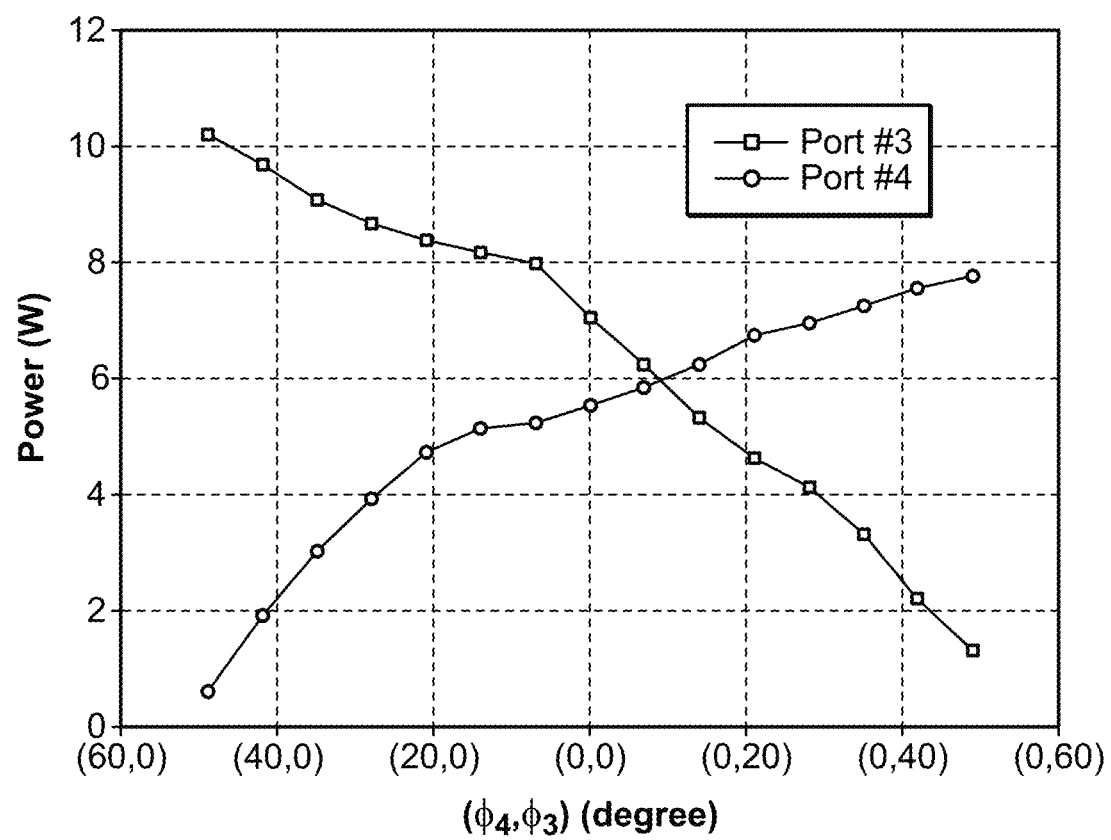
FIG. 41(a) depicts a graph of power flow control of the battery balancer according to an embodiment of the present invention.
Figure 41B:
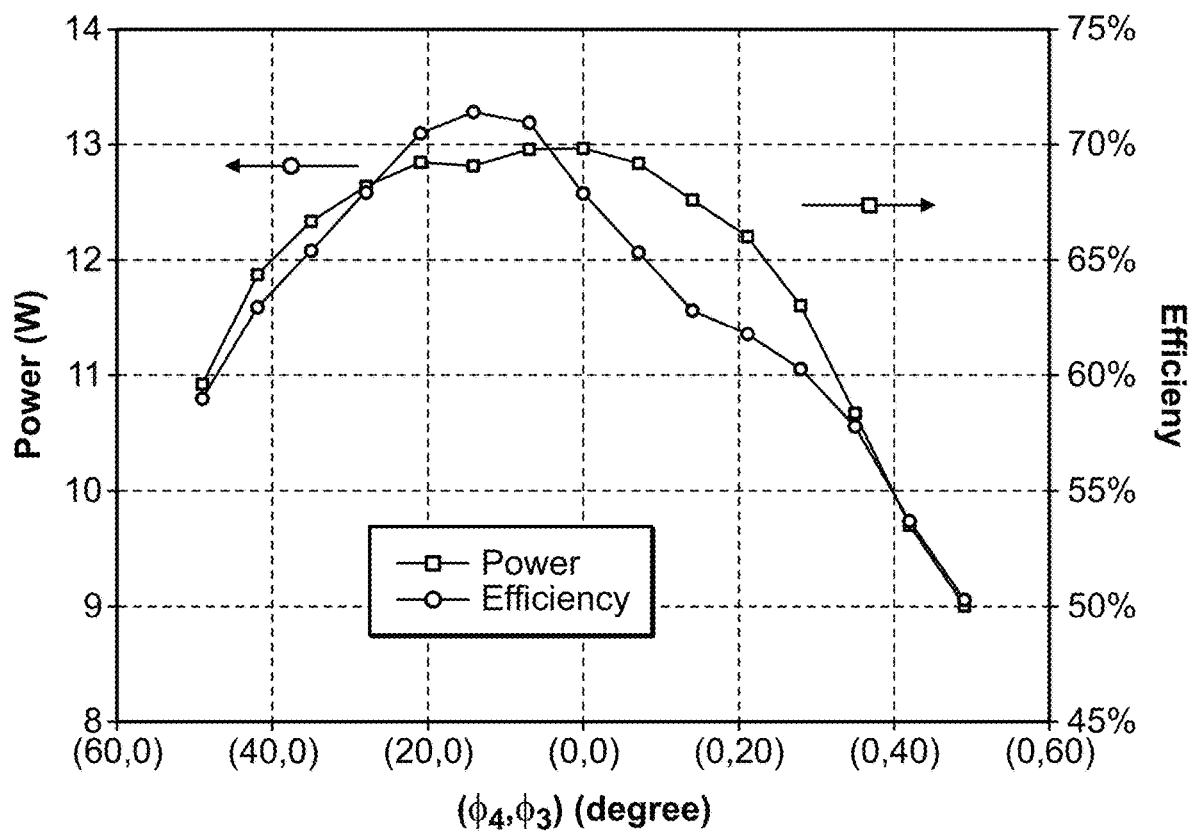
FIG. 41(b) depicts a graph of end-to-end efficiency of the battery balancer under the power flow control according to an embodiment of the present invention.

FIGS. 41(a)-(b) show the power flow control and end to end efficiency of the battery balancer, respectively. The port-to-port power is controlled by modulating the phase-shift between ports. Here the current phases of the MWC transformer are controlled by adjusting the phase of the gate driving signals of the CM Class-D inverters. In this experiment, Port #1 and Port #2 are configured as the sources, Port #3 and Port #4 are configured as loads, the phases of Port #1 and Port #2 are identical and fixed at 0°, and the phases of Port #3 and Port #4 are controlled to validate the power flow control and battery balancing operation. Here the voltages of Port #1 and Port #2 are set as 11.1 V and the voltages of Port #3 and Port #4 are set as 10 V to emulate the battery balancing scenario. As shown in FIG. 41(a), the higher phase-shift $\phi_3$ ($\phi_4$), the higher power transferred to Port #3 (Port #4). For example, when $\phi_4=42°$ and $\phi_3=0°$, the load power at Port #4 is 9.7 W and the load power at Port #3 is 1.9 W. The load powers of Port #4 and Port #3 get close when their phases are approaching each other. FIG. 41(b) shows the total load power of Port #3 and Port #4, and the end to end efficiency of the battery balancer. The peak end to end efficiency is about 70% and the main power loss is contributed by the MWC transformer due to its high coil ESRs and core loss (about 0.6Ω with the magnetic sheets). The ESRs can be further reduced by optimizing the coil diameters and adopting better magnetic materials. Note the disclosed MWC converter architecture can be also applied to multi-input-multi-output (MIMO) wireless power transfer (WPT) systems with similar modeling and design methods.

Figure 42:
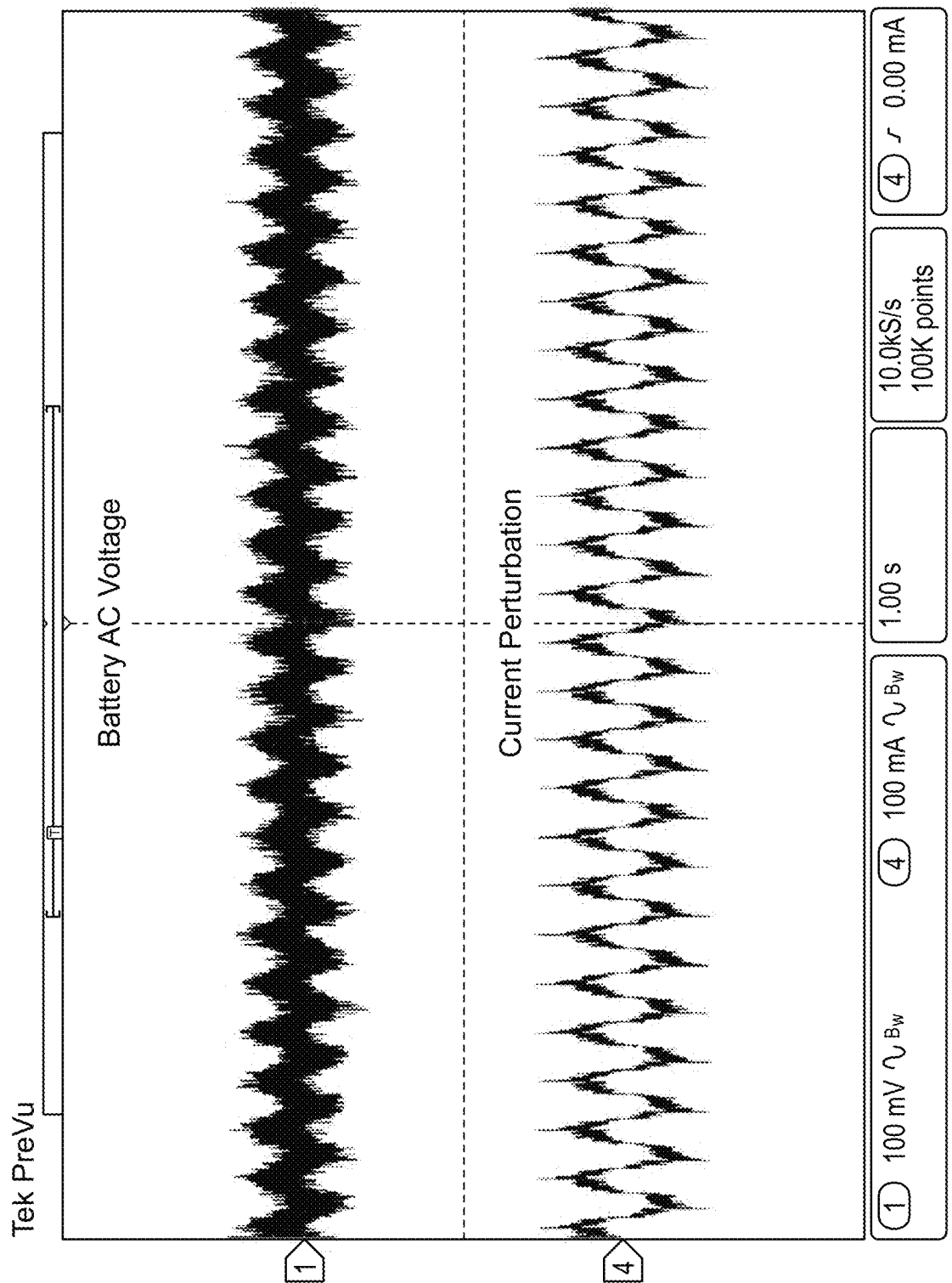
FIG. 42 depicts a graph of current perturbation and battery AC voltage at 2.5 Hz according to an embodiment of the present invention.
Figure 43:
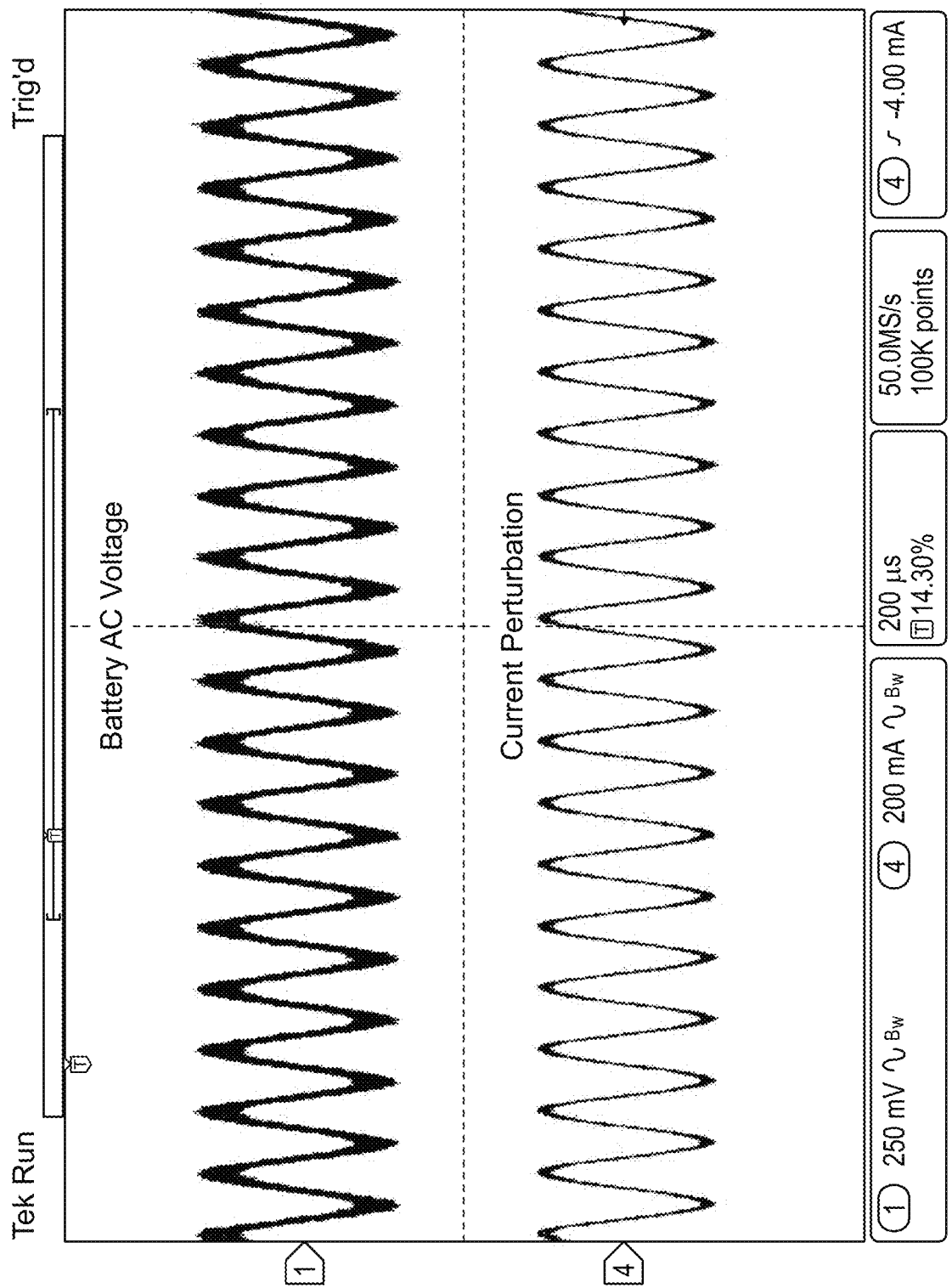
FIG. 43 depicts a graph of current perturbation and battery AC voltage at 10 kHz according to an embodiment of the present invention.
Figure 44:
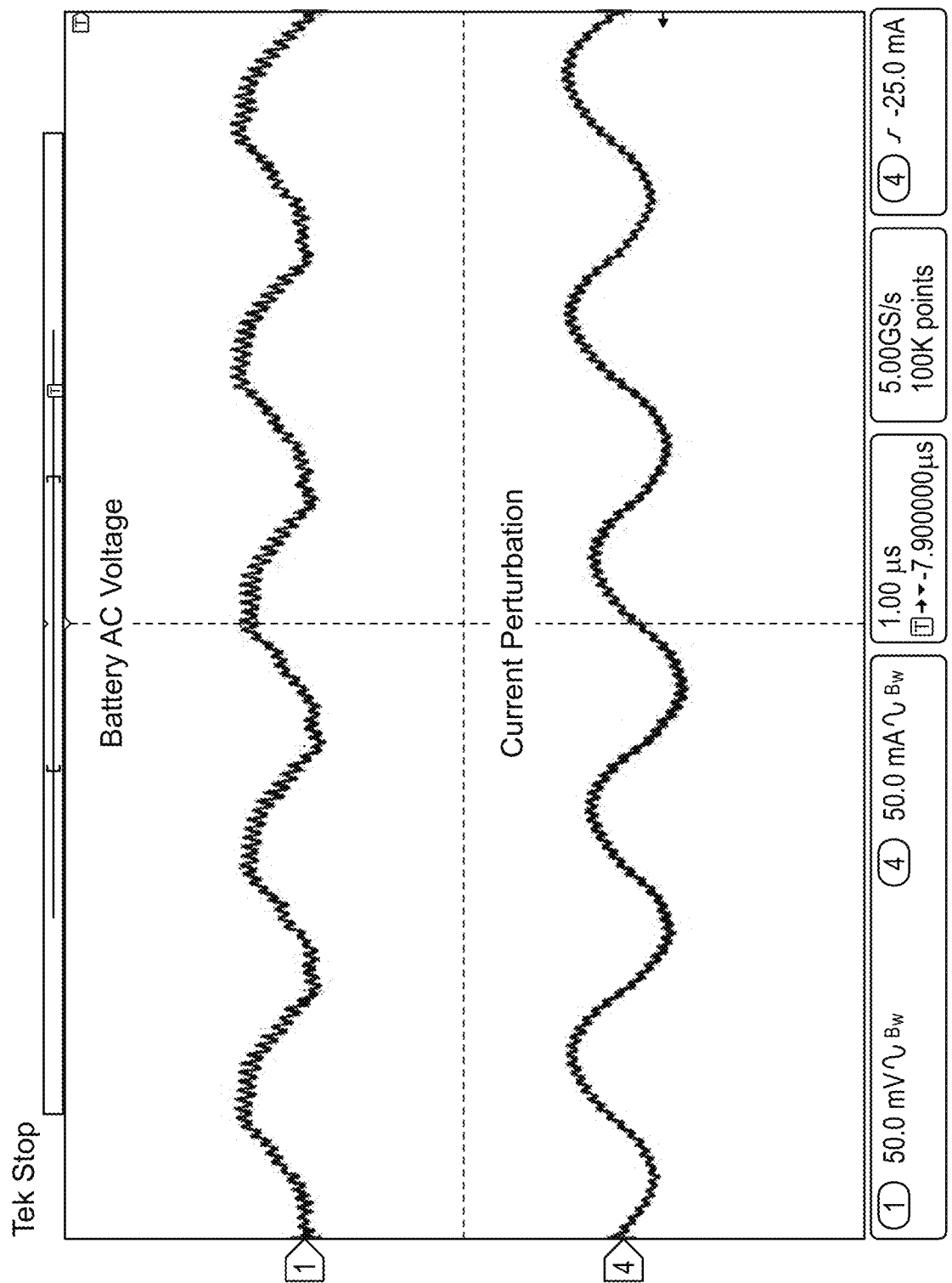
FIG. 44 depicts a graph of current perturbation and battery AC voltage at 500 kHz according to an embodiment of the present invention.

To validate the EIS capability of the disclosed MWC battery balancer, the EIS experiments are conducted based on the three battery cells (FIGS. 40(a)-(c)), i.e., a lithium-ion battery pack, a lithium-polymer battery pack, and a AA-NIMH battery pack, respectively. FIG. 42, FIG. 43, and FIG. 44 show the waveforms of 2.5 Hz, 10 kHz, and 500 kHz current perturbations generated by the MWC battery balancer, respectively. By applying fast Fourier transformation (FFT) to the measured waveforms, the fundamental components of the voltage and current can be identified and yield the cell impedance.

Figure 45A:
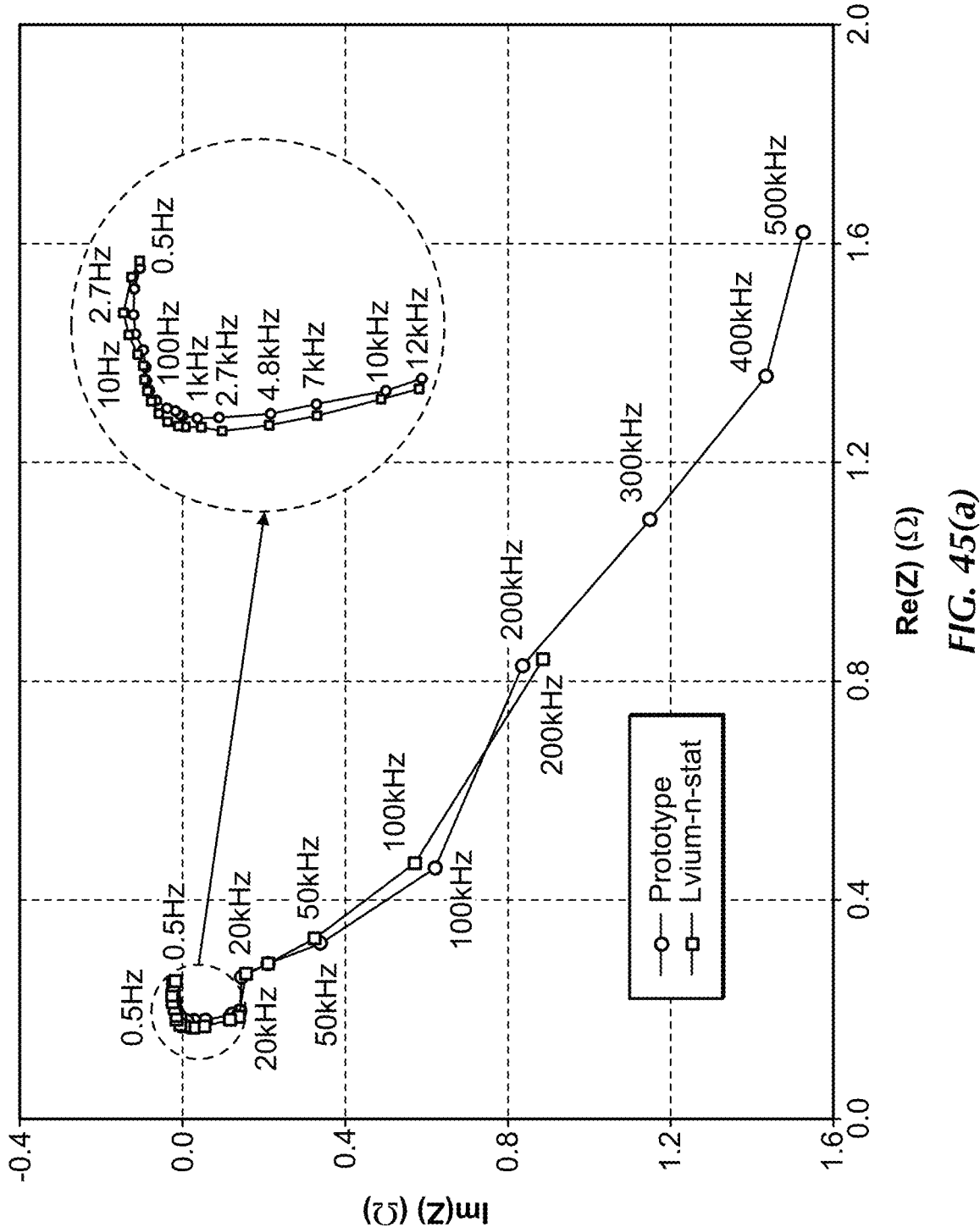
FIG. 45(a) depicts a graph of EIS measurement results with a lithium ion battery pack according to an embodiment of the present invention.
Figure 45B:
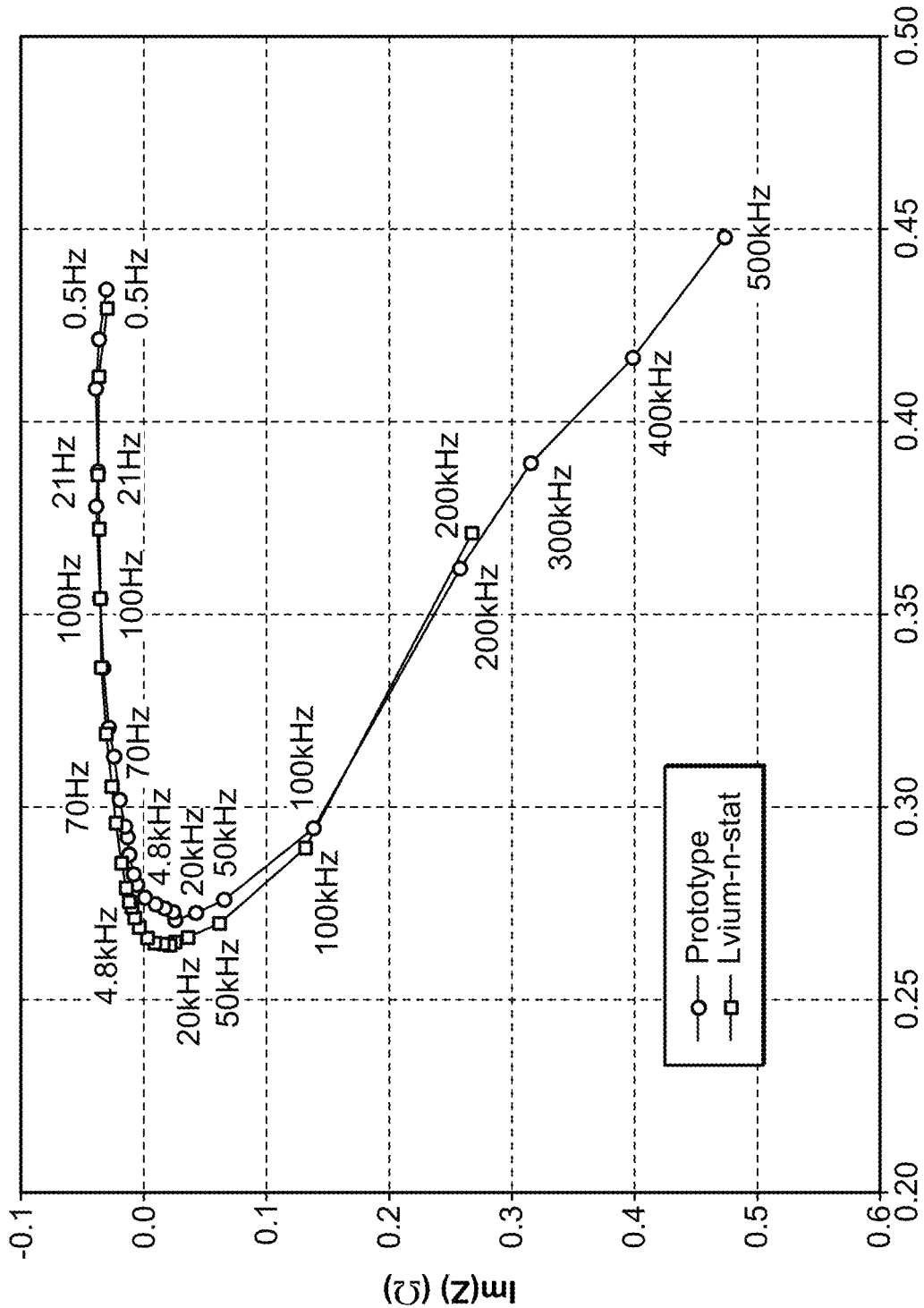
FIG. 45(b) depicts a graph of EIS measurement results with a lithium polymer battery pack according to an embodiment of the present invention.
Figure 45C:
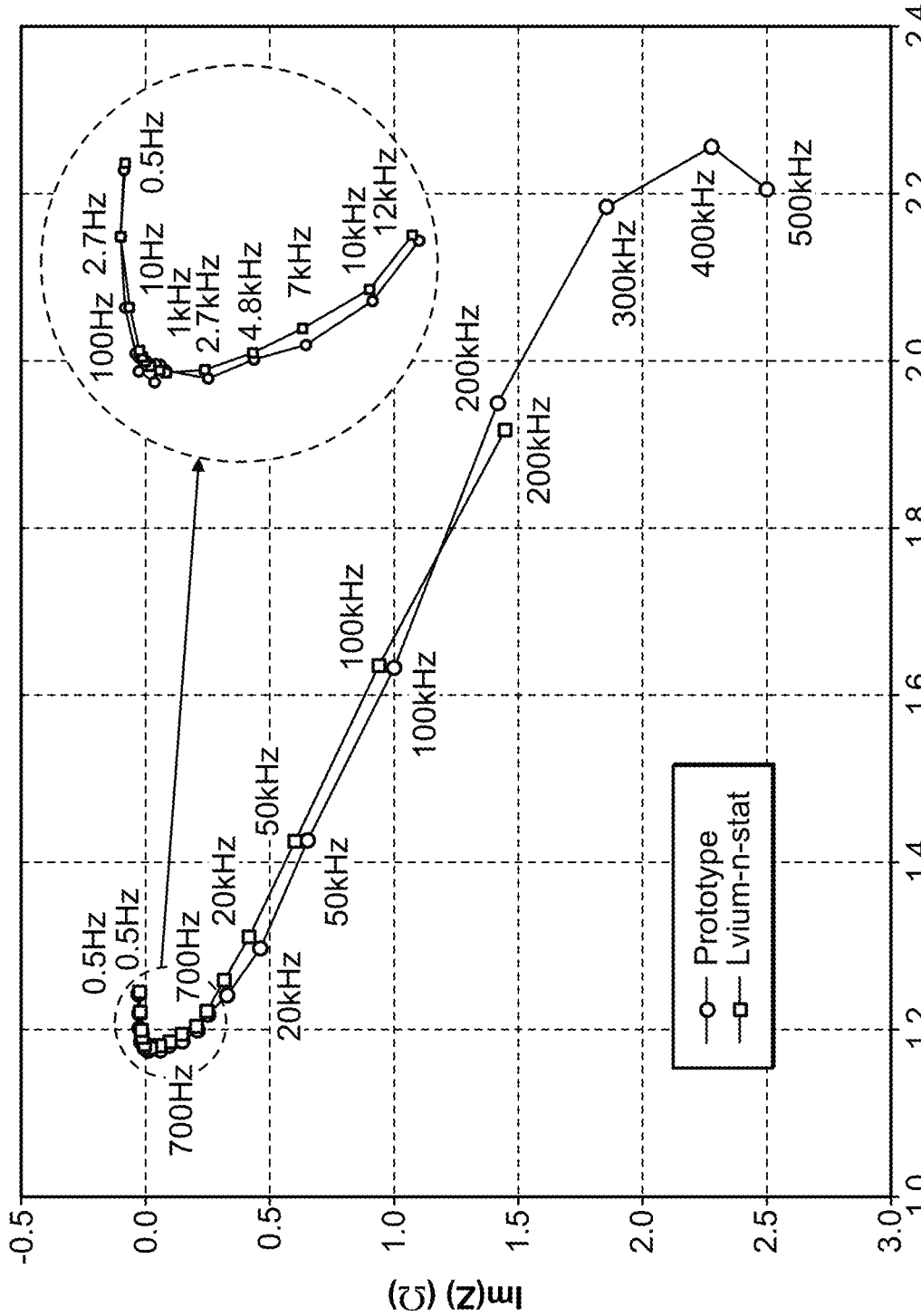
FIG. 45(c) depicts a graph of EIS measurement results with a AA-NIMH battery pack according to an embodiment of the present invention.

The EIS results measured by the MWC balancer were compared to a commercial EIS instrument, Ivium-n-Stat. In the experiment, the prototype MWC balancer ran 25 perturbations ranging from 500 mHz to 500 kHz on the lithium-ion battery pack, the lithium polymer battery pack, and the AA-NIMH battery pack, respectively. The Ivium-n-Stat ran 22 perturbations ranging from 500 mHz to 200 kHz on the same batteries. The maximum EIS measurement frequency of the prototype is 500 kHz. The maximum EIS measurement frequency of Ivium-n-Stat is 250 kHz. FIGS. 45(a)-(c) compare the Nyquist plots of the three batteries measured by the MWC balancer and the Ivium-n-Stat, where a good match was found. Note the battery packs used in the EIS experiment were built with series connected battery cells and the impedance of the connecting wires of the cells dominated the measured impedance at the high frequency segment of the Nyquist plots.

As such, disclosed herein is a multi-MHz MWC battery balancer with online EIS measurement capability. The MHz MWC balancer architecture includes multiple high frequency DC-AC inverters and a MWC transformer. There is only one "DC-AC-DC" conversion stage between two arbitrary ports, allowing the MWC balancer to achieve lower component count and higher power density than many other battery balancer architectures. The MHz operation of the battery balancer enables online EIS measurement for up to 500 kHz as well as battery balancing without using extra power circuitry. The high frequency also helps to eliminate the magnetic core and reduce the coil size of the MWC transformer. A 13.56 MHz MWC balancer with a four-port MWC transformer is built and tested to verify the proposed approach. The EIS measurement results match well with the results measured by commercial EIS equipment.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A power conversion circuit comprising:
   a common DC bus;
   a plurality of DC-AC conversion units coupled to the common DC bus, the plurality of DC-AC conversion units connected to each other in series;
   at least one other DC-AC conversion unit coupled to the common DC bus; and
   a multi-winding transformer comprising a magnetic core and a plurality of windings, each of the plurality of DC-AC conversion units being coupled to a corresponding winding on a first side of the multi-winding transformer and the at least one other DC-AC conversion unit being coupled to a corresponding winding on a second side of the multi-winding transformer, the second side being opposite the first side.

2. The power conversion circuit of claim 1 wherein the series connected DC-AC conversion units evenly divide a voltage of the DC bus.

3. The power conversion circuit of claim 1 wherein the DC-AC conversion units are each connected to one or more devices.

4. The power conversion circuit of claim 1 wherein the at least one other DC-AC conversion unit is standalone.

5. The power conversion circuit of claim 1 wherein each DC-AC conversion unit is a half-bridge inverter comprising at least two switches and one capacitor.

6. The power conversion circuit of claim 5 wherein each half-bridge inverter operates at about a 50% duty ratio.

7. The power conversion circuit of claim 1 wherein each DC-AC conversion unit is a full-bridge inverter comprising at least four switches.

8. The power conversion circuit of claim 1 wherein the multi-winding transformer is a printed circuit board (PCB) transformer comprising a plurality of layers of conductors in planar shapes.

9. The power conversion circuit of claim 8 wherein each layer is a single turn layer.

10. The power conversion circuit of claim 1 wherein the windings of the multi-winding transformer have identical turns.

11. The power conversion circuit of claim 1 wherein each DC-AC conversion unit is operated at about the same frequency.

12. The power conversion circuit of claim 1 wherein each DC-AC conversion unit is phase-shifted against each other DC-AC conversion unit.

13. The power conversion circuit of claim 1 further comprising a controller configured to regulate a voltage of each DC-AC conversion unit.

14. The power conversion circuit of claim 1 wherein each DC-AC conversion unit is connected to one or more of a data center server, a battery, a solar panel, and a computer hard drive.

15. The power conversion circuit of claim 1 wherein each DC-AC conversion unit is configured to interface with a DC voltage of one of 5V, 12V, 24V, or 48V.

16. A method for operating a power conversion circuit, the circuit including a plurality of DC-AC conversion units coupled to a common DC bus, the plurality of DC-AC conversion units connected to each other in series, at least one other DC-AC conversion unit coupled to the common DC bus, and a multi-winding transformer including a magnetic core and a plurality of windings, each of the plurality of DC-AC conversion units being coupled to a corresponding winding on a first side of the multi-winding transformer and the at least one other DC-AC conversion unit being coupled to a corresponding winding on a second side of the multi-winding transformer, the second side being opposite the first side, the method comprising:
   measuring a voltage of one or more intermediate nodes between the DC-AC conversion units of the plurality of DC-AC conversion units; and
   adjusting a gate signal of switches of the plurality of DC-AC conversion units to regulate the voltage of the intermediate nodes.

17. The method of claim 16 wherein the series-connected DC-AC conversion units evenly divide a voltage of the DC bus.

18. The method of claim 16 further comprising operating each of the plurality of DC-AC conversion units at about a 50% duty ratio.

19. The method of claim 16 further comprising operating each DC-AC conversion unit at about the same frequency.

20. The method of claim 16 further comprising phase-shifting each DC-AC conversion unit against each other DC-AC conversion unit.

21. The method of claim 16 further comprising regulating the voltage of each DC-AC conversion unit via a controller.

22. A power conversion circuit comprising:
   a common DC bus;
   a plurality of DC-AC conversion units coupled to the common DC bus, the plurality of DC-AC conversion units connected to each other in series;
   at least one other DC-AC conversion unit coupled to the common DC bus;
   a multi-winding transformer comprising a magnetic core and a plurality of windings, each of the plurality of DC-AC conversion units being coupled to a corresponding winding on a first side of the multi-winding transformer and the at least one other DC-AC conversion unit being coupled to a corresponding winding on a second side of the multi-winding transformer, the second side being opposite the first side; and
   a controller configured to:
      measure a voltage of one or more intermediate nodes, each intermediate node being operably coupled to two adjacent DC-AC conversion units of the plurality of DC-AC conversion units, the two adjacent DC-AC conversion units both being on either the first side or the second side of the multi-winding transformer; and
      adjust a gate signal of switches of the plurality of DC-AC conversion units to regulate the voltage of the one or more intermediate nodes.

23. The power conversion circuit of claim 22 wherein the series-connected DC-AC conversion units evenly divide a voltage of the DC bus.

24. The power conversion circuit of claim 22 wherein the DC-AC conversion units are each connected to one or more devices.

25. The power conversion circuit of claim 22 wherein the at least one other DC-AC conversion unit is standalone.

26. The power conversion circuit of claim 22 wherein each DC-AC conversion unit is a half-bridge inverter comprising at least two switches and one capacitor.

27. The power conversion circuit of claim 26 wherein the controller is further configured to operate each half-bridge inverter at about a 50% duty ratio.

28. The power conversion circuit of claim 22 wherein each DC-AC conversion unit is a full-bridge inverter comprising at least four switches.

29. The power conversion circuit of claim 22 wherein the multi-winding transformer is a printed circuit board (PCB) transformer comprising a plurality of layers of conductors in planar shapes.

30. The power conversion circuit of claim 29 wherein each layer is a single turn layer.

31. The power conversion circuit of claim 22 wherein the windings of the multi-winding transformer have identical turns.

32. The power conversion circuit of claim 22 wherein the controller is further configured to operate each DC-AC conversion unit at about the same frequency.

33. The power conversion circuit of claim 22 wherein the controller is further configured to phase-shift each DC-AC conversion unit against each other DC-AC conversion unit.

34. The power conversion circuit of claim 22 wherein each DC-AC conversion unit is connected to one or more of a data center server, a battery, a solar panel, and a computer hard drive.

35. The power conversion circuit of claim 22 wherein each DC-AC conversion unit is configured to interface with a DC voltage of one of 5V, 12V, 24V, or 48V.

36. A multi-input multi-output (MIMO) power conversion circuit comprising:
a plurality of DC buses;
a plurality of DC-AC conversion units coupled to a first DC bus of the plurality of DC buses, the plurality of DC-AC conversion units connected to each other in series;
at least one other DC-AC conversion unit coupled to a second DC bus of the plurality of DC buses; and
a multi-port wireless-coupled transformer comprising a magnetic core and a plurality of ports, each of the plurality of DC-AC conversion units being coupled to a corresponding port on a first side of the multi-port wireless-coupled transformer and the at least one other DC-AC conversion unit being coupled to a corresponding port on a second side of the multi-port wireless-coupled transformer, the second side being opposite the first side.

37. The MIMO power conversion circuit of claim 36 wherein the series connected DC-AC conversion units evenly divide a voltage each DC bus.

38. The MIMO power conversion circuit of claim 36 wherein the DC-AC conversion units are each connected to one or more devices.

39. The MIMO power conversion circuit of claim 36 wherein each DC-AC conversion unit is a half-bridge inverter comprising at least two switches and one capacitor.

40. The MIMO power conversion circuit of claim 39 wherein each half-bridge inverter operates at about a 50% duty ratio.

41. The MIMO power conversion circuit of claim 36 wherein each DC-AC conversion unit is a full-bridge inverter comprising at least four switches.

42. The MIMO power conversion circuit of claim 36 further comprising a controller configured to regulate a voltage of each DC-AC conversion unit.

43. The MIMO power conversion circuit of claim 36 wherein each DC-AC conversion unit is connected to one or more of a data center server, a battery, a solar panel, and a computer hard drive.

44. The MIMO power conversion circuit of claim 36 wherein each DC-AC conversion unit is configured to interface with a DC voltage of one of 5V, 12V, 24V, or 48V.

* * * * *